US010983967B2

United States Patent
Tsirogiannis et al.

(10) Patent No.: US 10,983,967 B2
(45) Date of Patent: Apr. 20, 2021

(54) CREATION OF A CUMULATIVE SCHEMA BASED ON AN INFERRED SCHEMA AND STATISTICS

(71) Applicant: Amazon Technologies, Inc., Seattle, WA (US)

(72) Inventors: Dimitris Tsirogiannis, San Mateo, CA (US); Nathan A. Binkert, Redwood City, CA (US); Stavros Harizopoulos, San Francisco, CA (US); Mehul A. Shah, Saratoga, CA (US); Benjamin A. Sowell, Mountain View, CA (US); Bryan D. Kaplan, Mountain View, CA (US); Kevin R. Meyer, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 760 days.

(21) Appl. No.: 15/478,177

(22) Filed: Apr. 3, 2017

(65) Prior Publication Data

US 2017/0206256 A1    Jul. 20, 2017

Related U.S. Application Data

(63) Continuation of application No. 14/213,941, filed on Mar. 14, 2014, now Pat. No. 9,613,068.

(Continued)

(51) Int. Cl.
*G06F 16/21* (2019.01)
*G06F 16/22* (2019.01)
(Continued)

(52) U.S. Cl.
CPC ............ *G06F 16/211* (2019.01); *G06F 16/22* (2019.01); *G06F 16/235* (2019.01); *G06F 16/254* (2019.01); *G06F 16/86* (2019.01)

(58) Field of Classification Search
CPC .... G06F 16/211; G06F 16/212; G06F 16/213; G06F 16/22; G06F 16/86; G06F 16/235; G06F 16/254
(Continued)

(56) References Cited

U.S. PATENT DOCUMENTS 6,785,689 B1 * 8/2004 Daniel .................... G06F 16/25
707/754
7,007,033 B1 * 2/2006 Rothschiller ....... G06F 17/2247
(Continued)

FOREIGN PATENT DOCUMENTS

CN          1760871       4/2006
JP        2003-157249     5/2003

OTHER PUBLICATIONS

International Search Report and Written Opinion from PCT/US2014/029484, dated Sep. 12, 2014, pp. 1-14.
(Continued)

*Primary Examiner* — Hares Jami
(74) *Attorney, Agent, or Firm* — Robert C. Kowert; Kowert, Hood, Munyon, Rankin & Goetzel, P.C.

(57) ABSTRACT

A data transformation system includes a schema inference module and an export module. The schema inference module is configured to dynamically create a cumulative schema for objects retrieved from a first data source. Each of the retrieved objects includes (i) data and (ii) metadata describing the data. Dynamically creating the cumulative schema includes, for each object of the retrieved objects, (i) inferring a schema from the object and (ii) selectively updating the cumulative schema to describe the object according to the inferred schema. The export module is configured to output the data of the retrieved objects to a data destination system according to the cumulative schema.

20 Claims, 30 Drawing Sheets

Related U.S. Application Data

(60) Provisional application No. 61/800,432, filed on Mar. 15, 2013.

(51) Int. Cl.
  *G06F 16/84* (2019.01)
  *G06F 16/23* (2019.01)
  *G06F 16/25* (2019.01)

(58) Field of Classification Search
  USPC .................................................. 707/600–606
  See application file for complete search history.

(56) References Cited

U.S. PATENT DOCUMENTS

| | | | |
|---|---|---|---|
| 7,096,224 | B2 | 8/2006 | Murthy et al. |
| 7,627,589 | B2* | 12/2009 | Cheslow ............ G06F 17/2247 |
| 9,117,005 | B2* | 8/2015 | Lim ................... G06F 16/8365 |
| 9,613,068 | B2 | 4/2017 | Tsirogiannis et al. |
| 2002/0188711 | A1* | 12/2002 | Meyer .................. G06F 3/0605 709/223 |
| 2003/0154216 | A1* | 8/2003 | Arnold ................ G06F 16/211 |
| 2003/0233618 | A1* | 12/2003 | Wan ........................ G06F 16/81 715/241 |
| 2004/0044835 | A1* | 3/2004 | Gongwer ............... H03M 5/00 711/103 |
| 2004/0148278 | A1 | 7/2004 | Milo et al. |
| 2004/0243555 | A1* | 12/2004 | Bolsius ............... G06F 16/2462 |
| 2005/0160078 | A1 | 7/2005 | Benson et al. |
| 2006/0020619 | A1 | 1/2006 | Netz et al. |
| 2006/0085451 | A1* | 4/2006 | Pal ......................... G06F 16/86 |
| 2006/0167880 | A1 | 7/2006 | Meijer et al. |
| 2007/0122118 | A1 | 5/2007 | Seo et al. |
| 2008/0141182 | A1 | 6/2008 | Barsness et al. |
| 2008/0201295 | A1* | 8/2008 | Praveena .......... G06F 16/24552 |
| 2009/0024590 | A1 | 1/2009 | Sturge et al. |
| 2009/0132621 | A1 | 5/2009 | Jensen et al. |
| 2009/0240712 | A1* | 9/2009 | Murthy ................... G06F 16/84 |
| 2011/0231397 | A1 | 9/2011 | Van Megchelen |
| 2013/0024207 | A1* | 1/2013 | Anderson .............. G16H 10/60 705/3 |
| 2013/0339399 | A1* | 12/2013 | Dorris ................... G06F 16/213 707/803 |
| 2014/0207826 | A1* | 7/2014 | Gao ........................ G06F 16/84 707/803 |

OTHER PUBLICATIONS

Extended European Search Report for PCT/US2014/029484, dated Oct. 13, 2016, Amazon Technologies, Inc., pp. 1-11.

Haw Su-Cheng, et al., "Bridging XML and Relational Databases: Mapping Choices and Performance Evaluation", IETE Technical Review, vol. 27, Issue 4, Jul.-Aug. 2010, pp. 308-317.

Mike Stonebraker, et al., "C-Store: A Column-oriented DBMS", Proceedings of the 31st VLDB Conference, 2005, pp. 553-564.

Office Action from China Application No. 201480021193.7, dated Feb. 2, 2018, English translation and Chinese Version. Amazon Technologies Inc., pp. 1-33.

Petter Nasholm "Extracting Data from NoSQL Database A Step towards Interactive Visual Analysis of NoSQL", dated Jan. 31, 2012, Retrieved from the internet: URL:http://citeseerx.ist.psu.edu/viewdoc/download/doi-10.1.1.842.8759&rep=1&type=pdf.

Office Action from European Application No. 14764749.9, dated Apr. 18, 2018, pp. 1-10.

Office Action from Japanese Application No. 2016/503110, dated Jul. 18, 2017 (English translation and Japanese version), Amazon Technologies, Inc., pp. 1-8.

Office action from European Application No. 14764749.9-1213, dated Dec. 17, 2020, pp. 1-7.

Peter N Sholm, "Extracting Data from NoSQL Database A Step towards Interactive Visual Analysis of NoSQL", dated Jan. 31, 2012, pp. 1-72.

* cited by examiner

FIG. 13D

```
select "user.lang", count(*)
from tweets
group by 1
order by 2
desc;
```

| user.lang | count |
|---|---|
| en | 172560 |
| ja | 323486 |
| es | 290822 |
| pt | 221467 |
| (NULL) | 100101 |
| ko | 37338 |
| nl | 23859 |
| fr | 32519 |
| ru | 3216 |
| tr | 20296 |

Showing 1 to 10 of 24 entries

FIG. 13E

CREATION OF A CUMULATIVE SCHEMA BASED ON AN INFERRED SCHEMA AND STATISTICS

CROSS-REFERENCE TO RELATED APPLICATIONS

This application is a continuation of U.S. patent application Ser. No. 14/213,941, filed Mar. 14, 2014, now U.S. Pat. No. 9,613,068, which claims the benefit of U.S. Provisional Application No. 61/800,432, filed on Mar. 15, 2013, which are hereby incorporated by reference herein in their entirety.

FIELD

The present disclosure relates to a scalable interactive database platform and more specifically to a scalable interactive database platform for semi-structured data that incorporates storage and computation.

BACKGROUND

The background description provided herein is for the purpose of generally presenting the context of the disclosure. Work of the presently named inventors, to the extent it is described in this background section, as well as aspects of the background description that may not otherwise qualify as prior art at the time of filing, are neither expressly nor impliedly admitted as prior art against the present disclosure.

Traditional database systems feature a query execution engine that is tightly integrated with the underlying storage back-end, which typically consists of block-addressable persistent storage devices with no compute capabilities. These devices (hard disk drives and/or solid state drives) are characterized by (a) access times that differ significantly depending on whether the data is accessed sequentially or randomly, (b) access units that have a fixed minimum size, set at the granularity of a block, and (c) significantly slower (orders of magnitude) access time than main memory. These characteristics, along with the assumption that the storage back-end does not have any non-trivial compute capabilities have had an important impact on the design of database systems, from storage management to query execution to query optimization.

Databases originally served as operational stores managing the day-to-day activities of businesses. As database technology improved both in performance and cost, businesses saw a need to keep an increasing amount of operational history and business state for later analysis. Such analyses help businesses gain insight into their processes and optimize them, thereby providing a competitive advantage and increasing profit.

Data warehousing arose out of this need. Business data is often well-structured, fitting easily into relational tables. Data warehouses are essentially scalable relational database systems offering a structured query language (SQL) for offline analysis of this business data, and optimized for read-mostly workloads. For example, data warehouses include traditional systems like Teradata and newer vendors such as Vertica, Greenplum, and Aster Data. They provide a SQL interface, indexes, and fast columnar access.

Typically, data warehouses are loaded periodically, e.g., nightly or weekly, with data ingested from various sources and operational systems. The process of cleaning, curating, and unifying this data into a single schema and loading it into a warehouse is known as extract, transform, load (ETL).

As the variety of sources and data increases, the complexity of the ETL process also increases. Successfully implementing ETL, including defining appropriate schemas and matching input data to the predetermined schemas, can take professionals weeks to months, and changes can be hard or impossible to implement. There are a number of tools, such as Abinitio, Informatica, and Pentaho, in the market to assist with the ETL process. However, the ETL process generally remains cumbersome, brittle, and expensive.

The data analytics market has exploded with a number of business intelligence and visualization tools that make it easy for business users to perform ad hoc, iterative analyses of data in warehouses. Business intelligence tools build multidimensional aggregates of warehouse data and allow users to navigate through and view various slices and projections of this data. For example, a business user might want to see total monthly sales by product category, region, and store. Then, they might want to dig deeper to weekly sales for specific categories or roll-up to see sales for the entire country. Multidimensional aggregates may also be referred to as online analytical processing (OLAP) cubes. A number of business intelligence (BI) tools, such as Business Objects and Cognos, enable such analyses, and support a language called Multidimensional Expressions (MDX) for querying cubes. There are also a number of visualization tools, such as MicroStrategy, Tableau, and Spotfire, that allow business users to intuitively navigate these cubes and data warehouses.

More recently, the type of data that businesses want to analyze has changed. As traditional brick and mortar businesses go online and new online businesses form, these businesses need to analyze the types of data that leading companies, such as Google and Yahoo, are inundated with. These include data types such as web pages, logs of page views, click streams, RSS (Rich Site Summary) feeds, application logs, application server logs, system logs, transaction logs, sensor data, social network feeds, news feeds, and blog posts.

These semi-structured data do not fit well into traditional warehouses. They have some inherent structure, but the structure may be inconsistent. The structure can change quickly over time and may vary across different sources. They are not naturally tabular, and the analyses that users want to run over these data—clustering, classification, prediction, and so on—are not easily expressed with SQL. The existing tools for making effective use of these data are cumbersome and insufficient.

As a result, a new highly scalable storage and analysis platform arose, Hadoop, inspired by the technologies implemented at Google for managing web crawls and searches. At its core, Hadoop offers a clustered file system for reliably storing its data, HDFS (Hadoop Distributed File System), and a rudimentary parallel analysis engine, MapReduce, to support more complex analyses. Starting with these pieces, the Hadoop ecosystem has grown to include an indexed, operational store, HBase, and new query interfaces, Pig and Hive, that rely on MapReduce.

Hive is an Apache project that adds a query layer on top of Hadoop, without any of the optimizations found in traditional warehouses for query optimization, caching, and indexing. Instead, Hive simply turns queries in a SQL-like language (called Hive-QL) into MapReduce jobs to be run against the Hadoop cluster. There are three main problems with Hive for traditional business users. Hive does not support standard SQL, and does not have a dynamic schema. Further, Hive is not fast enough to allow interactive queries, since each Hive query requires a MapReduce job that re-parses all the source data, and often requires multiple passes through the source data.

Impala is a real-time engine for Hive-QL queries on Cloudera's Hadoop implementation. It provides analysis over Hive's sequence files and may eventually support nested models. However, it does not have a dynamic schema, instead requiring that a user still provide a schema upfront for the data to be queried.

Pig is another Apache project and offers a schema-free scripting language for processing log files in Hadoop. Pig, like Hive, translates everything into map-reduce jobs. Likewise, it doesn't leverage any indexes, and is not fast enough for interactivity.

Jaql is a schema-free declarative language (in contrast to declarative languages, like SQL) for analyzing JavaScript Object Notation (JSON) logs. Like Pig, it compiles into map-reduce programs on Hadoop, and shares many of the same drawbacks, including a non-interactive speed.

Hadoop itself is catching on fairly quickly, and is readily available in the cloud. Amazon offers elastic map-reduce, which may be effectively equivalent to Hadoop's MapReduce implementation running in the cloud. It works on data stored in Amazon's cloud-based S3 (Simple Storage Service) and outputs results to S3.

The advantages of the Hadoop ecosystem are three fold. First, the system scales to extreme sizes and can store any data type. Second, it is extremely low cost compared to traditional warehouses (as much as twenty times less expensive). Third, it is open-source, which avoids lock-in with a single vendor. Users want the ability to pick the right tool for the right job and avoid moving data between systems to get their job done. Although Hadoop is more flexible, using Hadoop requires specially skilled administrators and programmers with deep knowledge, who are usually hard to find. Moreover, Hadoop is too slow to be interactive. Even the simplest queries take minutes to hours to execute.

Dremmel is a tool developed internally at Google, which provides SQL-based analysis queries over nested-relational or semi-structured data. The original version handled data in ProtoBuf format. Dremmel requires users to define the schema upfront for all records. BigQuery is a cloud-based commercialization of Dremmel and is extended to handle CSV and JSON formats. Drill is an open-source version of Dremmel.

Asterix is a system for managing and analyzing semi-structured data using an abstract data model (ADM), which is a generalization of JSON, and annotation query language (AQL). Asterix does not support standard SQL, nor does it have fast access afforded by the present disclosure.

SUMMARY

A data transformation system includes a schema inference module and an export module. The schema inference module is configured to dynamically create a cumulative schema for objects retrieved from a first data source. Each of the retrieved objects includes (i) data and (ii) metadata describing the data. Dynamically creating the cumulative schema includes, for each object of the retrieved objects, (i) inferring a schema from the object and (ii) selectively updating the cumulative schema to describe the object according to the inferred schema. The export module is configured to output the data of the retrieved objects to a data destination system according to the cumulative schema.

In other features, the data destination system includes a data warehouse. In other features, the data warehouse stores relational data. In other features, the export module is configured to convert the cumulative schema into a relational schema and output the data of the retrieved objects to the data warehouse according to the relational schema. In other features, the export module is configured to generate commands for the data warehouse that update a schema of the data warehouse to reflect any changes made to the relational schema.

In other features, the export module is configured to create at least one intermediate file from the data of the retrieved objects according to the relational schema. In other features, the at least one intermediate file has a predefined data warehouse format. In other features, export module is configured to bulk load the at least one intermediate file into the data warehouse. In other features, an index store is configured to store the data from the retrieved objects in columnar form. In other features, the export module is configured to generate row-based data from the stored data in the index store. In other features, the schema inference module is configured to create a time index in the index store that maps time values to identifiers of the retrieved objects.

In other features, for each retrieved object of the retrieved objects, the time value denotes at least one of (i) a transaction time corresponding to creation of the retrieved object or (ii) a valid time corresponding to the retrieved object. In other features, a write-optimized store is configured to (i) cache additional objects for later storage in the index store and (ii) in response to a size of the cache reaching a threshold, package the additional objects together for bulk loading into the index store. In other features, the schema inference module is configured to collect statistics on the metadata of the retrieved objects. In other features, the schema inference module is configured to collect statistics on data types of the retrieved objects. In other features, the schema inference module is configured to, in response to the statistics on data types, recast the data of some of the retrieved objects.

In other features, the schema inference module is configured to, in response to the statistics on data types, report the data of some of the retrieved objects to a user as potentially being typed incorrectly. In other features, the schema inference module is configured to collect statistics on the data of the retrieved objects. In other features, the statistics includes at least one of minimum, maximum, average, and standard deviation. In other features, a data collector module is configured to receive relational data from the first data source and generate the objects for use by the schema inference module. In other features, the data collector module is configured to eventize the relational data by creating (i) a first column indicating a table from which each item of the relational data is retrieved and (ii) a second column indicating a timestamp associated with each item of the relational data.

In other features, a scheduling module is configured to assign processing jobs to the schema inference module and the export module according to predetermined dependency information. In other features, the export module is configured to partition the cumulative schema into multiple tables. In other features, each of the multiple tables includes columns that appear together in the retrieved objects. In other features, the export module is configured to partition the cumulative schema according to columns corresponding to groups of the retrieved objects that have different values for an identifier element. In other features, the schema inference module records a source identifier for each of the retrieved objects. In other features, for each object of the retrieved objects, the source identifier includes a unique identifier of the first data source and a position of the object within the first data source.

A method of operating a data transformation system includes dynamically creating a cumulative schema for objects retrieved from a first data source. Each of the retrieved objects includes (i) data and (ii) metadata describing the data. Dynamically creating the cumulative schema includes, for each object of the retrieved objects, (i) inferring a schema from the object and (ii) selectively updating the cumulative schema to describe the object according to the inferred schema. The method further includes outputting the data of the retrieved objects to a data destination system according to the cumulative schema.

In other features, the data destination system includes a data warehouse. In other features, the data warehouse stores relational data. The method further includes converting the cumulative schema into a relational schema and outputting the data of the retrieved objects to the data warehouse according to the relational schema. The method further includes generating commands for the data warehouse that update a schema of the data warehouse to reflect any changes made to the relational schema.

The method further includes creating at least one intermediate file from the data of the retrieved objects according to the relational schema. In other features, the at least one intermediate file has a predefined data warehouse format. The method further includes bulk loading the at least one intermediate file into the data warehouse. The method further includes storing the data from the retrieved objects in columnar form in an index store. The method further includes generating row-based data from the stored data in the index store.

The method further includes creating a time index in the index store that maps time values to identifiers of the retrieved objects. In other features, for each retrieved object of the retrieved objects, the time value denotes at least one of (i) a transaction time corresponding to creation of the retrieved object or (ii) a valid time corresponding to the retrieved object.

The method further includes caching additional objects for later storage in the index store and in response to a size of the cache reaching a threshold, packaging the additional objects together for bulk loading into the index store. The method further includes collecting statistics on the metadata of the retrieved objects. The method further includes collecting statistics on data types of the retrieved objects.

The method further includes, in response to the statistics on data types, recasting the data of some of the retrieved objects. The method further includes, in response to the statistics on data types, reporting the data of some of the retrieved objects to a user as potentially being typed incorrectly. The method further includes collecting statistics on the data of the retrieved objects. In other features, the statistics includes at least one of minimum, maximum, average, and standard deviation.

The method further includes receiving relational data from the first data source and generating the objects for use by the dynamically creating. The method further includes eventizing the relational data by creating (i) a first column indicating a table from which each item of the relational data is retrieved and (ii) a second column indicating a timestamp associated with each item of the relational data. The method further includes assigning processing jobs corresponding to the dynamically creating and the exporting according to predetermined dependency information.

The method further includes partitioning the cumulative schema into multiple tables. In other features, each of the multiple tables includes columns that appear together in the retrieved objects. The method further includes partitioning the cumulative schema according to columns found in corresponding groups of the retrieved objects that have each have a different value for an identifier element. The method further includes recording a source identifier for each of the retrieved objects. In other features—for each object of the retrieved objects, the source identifier includes a unique identifier of the first data source and a position of the object within the first data source.

A method of operating a data analysis system includes retrieving objects from a data source. Each of the retrieved objects includes (i) data and (ii) metadata describing the data. The method further includes dynamically creating a cumulative schema by, for each object of the retrieved objects: (i) inferring a schema from the object based on the metadata of the object and inferred data types of elements of the data of the object, (ii) creating a unified schema, wherein the unified schema describes both (a) the object described by the inferred schema and (b) a cumulative set of objects described by the cumulative schema, and (iii) storing the unified schema as the cumulative schema. The method further includes exporting the data of each of the retrieved objects to a data warehouse.

In other features, the method further includes converting the cumulative schema into a relational schema, wherein the exporting is performed according to the relational schema. In other features, the dynamically creating is performed during a first pass through the retrieved objects, and wherein the exporting is performed during a second pass through the retrieved objects. In other features, the method further includes storing the data of each of the retrieved objects into an index storage service, wherein the data of each of the retrieved objects is exported from the index storage service to the data warehouse.

In other features, the exporting includes creating at least one intermediate file from the index storage service, wherein the at least one intermediate file has a predefined data warehouse format, and bulk loading the at least one intermediate file into the data warehouse. In other features, the method further includes converting the cumulative schema into a relational schema, wherein the at least one intermediate file is created according to the relational schema. In other features, the method further includes receiving a query from a user via a graphical user interface and responding to the query based on at least one of (i) data stored by the index storage service and (ii) results returned from the data warehouse.

In other features, the method further includes passing the query to the data warehouse in order to obtain the results. In other features, the method further includes displaying initial results to the user via the graphical user interface, and iteratively updating results in the graphical user interface as execution of the query continues. In other features, the method further includes receiving a query from a user via a graphical user interface, and responding to the query based on results returned from the data warehouse. In other features, the method further includes receiving a query from a user via a graphical user interface, displaying initial results to the user in the graphical user interface, and iteratively updating results in the graphical user interface as execution of the query continues. In other features, the updating results in the graphical user interface includes updating scaling of at least one axis of at least one data chart.

In other features, the method further includes displaying the cumulative schema to a user via a graphical user interface, updating the cumulative schema as additional data is retrieved from the data source, and selectively updating the graphical user interface to reflect the updated cumulative schema. In other features, the method further includes, in the user interface, visually distinguishing changed items in the updated cumulative schema. In other features, the method further includes repeating the retrieving, the dynamically creating, and the exporting in response to new objects being available from the data source. In other features, the method further includes, prior to repeating the exporting, determining whether the cumulative schema has changed since a previous exporting and, in response to determining that the cumulative schema has changed, sending at least one command to the data warehouse to update a schema of the data warehouse to reflect the changes to the cumulative schema.

The disclosure further encompasses each of the above method features embodied as instructions stored on a non-transitory computer-readable medium.

BRIEF DESCRIPTION OF THE DRAWINGS

The present disclosure will become more fully understood from the detailed description and the accompanying drawings, wherein:

FIGS. 13A-13E are screenshots of example implementations of a user interface;

In the drawings, reference numbers may be reused to identify similar and/or identical elements.

DETAILED DESCRIPTION

Overview

Figure 1A:
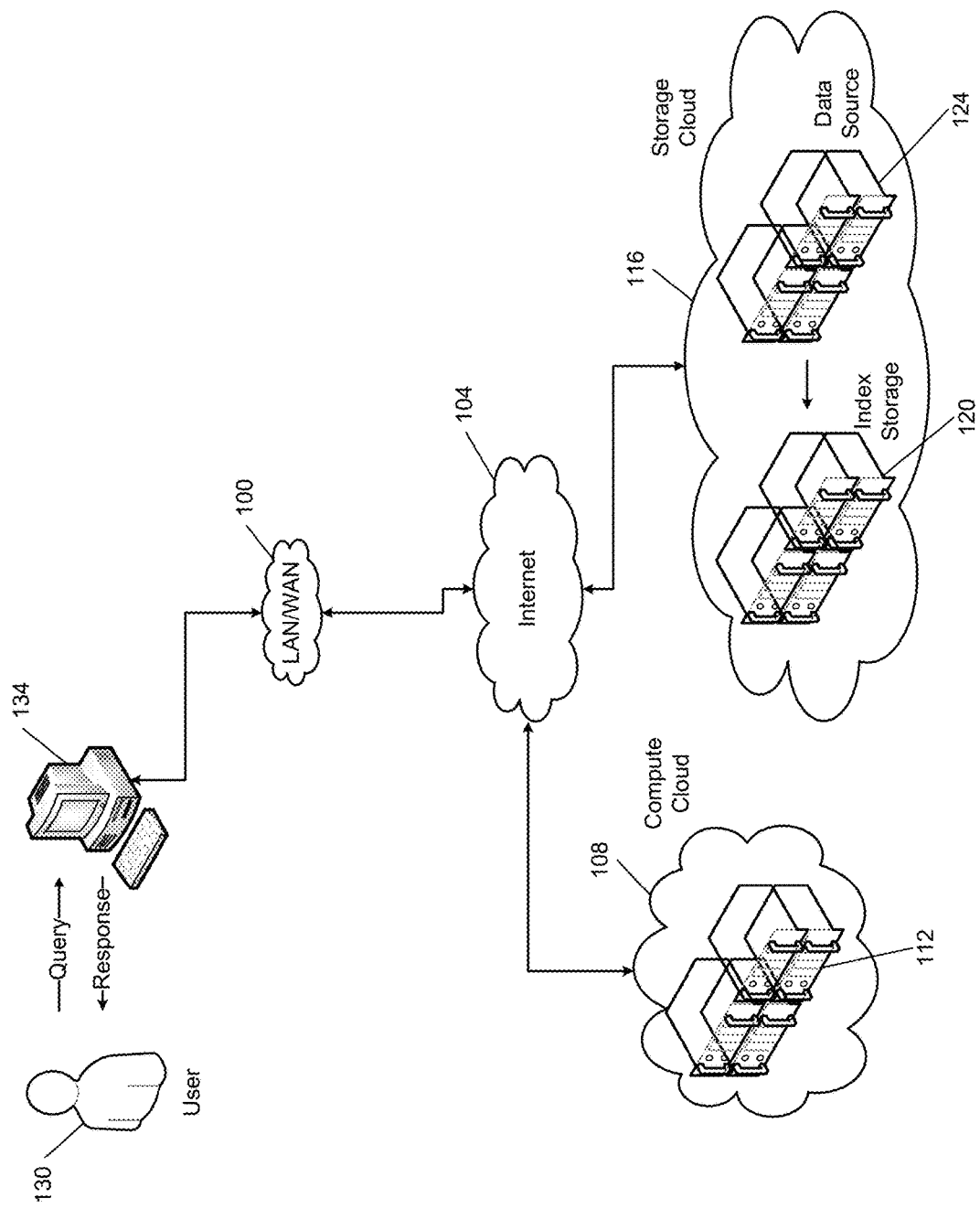
FIG. 1A depicts an example network architecture for a scalable analysis platform for semi-structured data that leverages cloud resources.

The present disclosure describes an analysis platform capable of offering a SQL (structured query language)-compliant interface for querying semi-structured data. For purposes of illustration only, semi-structured data is represented in JSON (JavaScript Object Notation) format. Other self-describing, semi-structured formats can be used according to the principles of the present disclosure. Source data does not need to be self-describing. The description can be separated from the data, as would be the case with something like protocol buffers. As long as there are rules, heuristics, or wrapper functions to apply tags to the data, any input data can be turned into objects similar to a JSON format.

In various implementations of the analysis platform according to the present disclosure, some or all of the following advantages are realized:

Speed

The analysis platform provides fast query response times to support ad-hoc, exploratory, and interactive analysis. Users can use this system to quickly discover hidden insights in the data, without having to submit a query and return later in the day or the next day to view the results. The analysis platform relies on an index store, storing all ingested data in indexes, which allows for fast response times.

Two primary indexes are used, a BigIndex (BI) and an ArrayIndex (AI), which are described in more detail below. These are a cross between path indexes and column-oriented stores. Like column-oriented stores, they allow queries to retrieve data only in the relevant fields, thereby reducing I/O (input/output) demands and improving performance. Unlike column stores, however, these indexes are suitable for complex nested objects and collections with numerous fields. For other access patterns, the analysis platform engine maintains auxiliary indexes, described in more detail below, including a ValueIndex (VI). Like traditional database indexes, the ValueIndex provides fast logarithmic access for specific field values or ranges of values. These indexes significantly reduce the data necessary to retrieve to satisfy a query, thereby improving response times.

Dynamic Schema

The analysis platform infers the schema from the data itself, so that users do not have to know an expected schema a priori, and pre-declare the schema before data can be loaded. Semi-structured data may have varying structure, both over time and across different sources. So, the engine computes and updates the schema (or structure) from the data dynamically as data arrives. A relational schema based on this computed schema is presented to users, which they can use to compose queries.

Unlike previous analysis engines that require programmers to specify the schema of data collections before querying them, the present platform computes (or, infers) the underlying schema amongst all the ingested objects. Because of the dynamic schema property, there is a great deal of flexibility. Applications that generate source data can change the structure as the application evolves. Analysts can aggregate and query data from various periods without needing to specify how the schema varies from period to period. Moreover, there is no need to design and enforce a global schema, which can take months, and often requires excluding data that does not fit the schema.

Other analysis systems like MapReduce or Pig that are sometimes described as "schema-free" have two main drawbacks. First, they require users to know the schema in order to query the data, instead of automatically presenting an inferred schema to the user. Second, they parse and interpret objects and their structure on every query, while the analysis platform parses and indexes objects at load time. These indexes allow subsequent queries to run much faster, as mentioned above. Previous engines do not provide automatic inference of a precise and concise schema from the underlying data.

SQL

The analysis platform exposes a standard SQL query interface (for example, an interface compliant with ANSI SQL 2003) so that users can leverage existing SQL tools (e.g., reporting, visualization, and BI tools) and expertise. As a result, business users familiar with SQL or SQL tools can directly access and query semi-structured data without the need to load a data warehouse. Since traditional SQL-based tools do not handle JSON or other semi-structured data formats, the analysis platform presents a relational view of the computed schema of JSON objects. It presents a normalized view and incorporates optimizations to keep the view manageable in size. Although the relational views may present several tables in the schema, these tables are not necessarily materialized.

In order to better accommodate representing semi-structured data in tabular form, the analysis platform can automatically identify "map" objects. Maps are objects (or nested objects) in which both the field name and value can be searched and queried. For example, an object may contain dates as field names and statistics like page views for the values. In the relational view, maps are extracted into separate tables and the data is pivoted such that keys are in a key column and values are in a value column.

Scale and Elasticity

The analysis platform scales to handle large dataset sizes. The analysis platform can automatically and dynamically distribute internal data structures and processing across independent nodes.

The analysis platform is designed and built for virtualized "cloud" environments, including public clouds such as Amazon Web Services and private clouds, such as virtualized server environments administered by the user's organization or offered by third parties, such as Rackspace. Various components of Amazon Web Services, including S3 (Simple Storage Service), EC2 (Elastic Compute Cloud), and Elastic Block Storage (EBS), can be leveraged. The analysis platform is elastic, meaning it can scale up and down to arbitrary sizes on demand, and can hibernate by storing its internal data structures on long-term stores, such as Amazon S3. The analysis platform also has multi-tenancy and multi-user support.

The analysis platform uses a service-based architecture that has four components: the proxy, the metadata service, the query executor, and the storage service. To scale the analysis platform engine to support larger datasets, provide faster responses, and support more users, the execution engine is parallelized and the storage service is partitioned across independent, low-cost server nodes. These nodes can be real servers or virtualized servers in a hosted environment. Since the executor and storage service are de-coupled, they can be scaled independently. This de-coupled, scale-out architecture allows the user to leverage the on-demand elasticity for storage and computing that a cloud environment like AWS provides.

The storage service is configurable with various partitioning strategies. Moreover, the underlying data structures (indexes and metadata) can be migrated to long-term storage like Amazon S3, to hibernate the system when not in use, thereby decreasing costs.

Synchronization

The analysis platform can be configured to automatically synchronize its contents with, and thereby replicate, the source data from repositories like HDFS (Hadoop Distributed File System), Amazon S3 (Simple Storage Service), and noSQL stores, such as MongoDB. These sources can be continuously monitored for changes, additions, and updates, so that the analysis platform can ingest the changed data. This allows query results to be relatively up-to-date.

Schema Inference

The analysis platform takes the following actions in response to data appearing in a source: (1) infer unified semi-structured (such as JSON) schema from the data, (2) create a relational view for the schema, (3) populate physical indexes with data, and (4) execute queries that leverage the indexes. Parts or all of actions 1, 2, and 3 may be pipelined to allow only a single pass through the data from the data source.

The first action, schema inference, is described first.

Introduction to Semi-Structured Data

JSON is an increasingly popular self-describing, semi-structured data format, and is very commonly used for data exchange on the internet. Again, while JSON is described here for illustration, and to provide context for later examples using the JSON format, the present disclosure is not limited to JSON.

Briefly, a JSON object consists of string fields (or columns) and corresponding values of potentially different types: numbers, strings, arrays, objects, etc. JSON objects can be nested and the fields can be multi-valued, e.g., arrays, nested arrays, etc. A specification can be found at: JSON.org. Additional details are can be found in "A JSON Media Type for Describing the Structure and Meaning of JSON Documents," IETF (Internet Engineering Task Force) draft-zyp-json-schema-03, Nov. 22, 2010, available at tools.ietf.org/html/draft-zyp-json-schema-03, the entire disclosure of which is hereby incorporated by reference. There are generalizations of JSON to include more types, e.g., BSON (Binary JSON). Moreover, other semi-structured formats like XML (Extensible Markup Language), Protobuf, Thrift, etc. can all be converted to JSON. When using XML, queries may conform to XQuery instead of SQL. Below is an example JSON object:

```
{ "player": { "fname": "George", "lname": "Ruth",
    "nickname" : "Babe"}, "born": "February 6, 1985",
    "avg": 0.342, "HR": 714,
    "teams": [ { "name": "Boston Red Sox", "years": "1914-
    1919" },
    { "name": "New York Yankees", "years": "1920-1934" },
    { "name": "Boston Braves", "years": "1935" } ] }
```

The structure of semi-structured objects can vary from object to object. So, in the same baseball data, the following object may be found:

```
{ "player": { "fname": "Sandy", "lname": "Koufax"},
    "born": "December 30, 1935",
    "ERA": 2.76, "strikeouts": 2396,
    "teams": [ { "name": "Brooklyn / LA Dodgers", "years":
    "1955-1966" } ] }
```

A schema describes the possible structures and data types found in a data collection. This schema includes the names of the fields, the types for the corresponding values, and the nesting relationships. Thus, the schema for the above two objects would be:

```
{ "player": { "fname": string, "lname": string, "nickname":
    string }, "born": string, "avg": number, "HR": number,
    "ERA": number, "strikeouts": number,
    "teams": [ { "name": string, "years": string } ] }
```

Although the above is the notation used throughout the document for illustrating schemas, a more complete specification is JSON-schema, available at JSON-schema.org. For example, types in the JSON-schema are generally included in quotes, as in string or "int." For conciseness and readability in this disclosure, the quotes will be omitted.

Semi-structured objects can alternatively be viewed as trees with fields as nodes and leaves as atomic values. A path in the object or schema is a path in this tree, e.g., "player. fname", "teams[ ].name".

Iterative Schema Inference

Before a user can ask questions of a data set, they need to know the schema—i.e., what fields or dimensions are available for querying. In many cases, the analyst is not responsible for generating the data, so they are unaware of what has been recorded and available. For example, in the baseball example above, an analyst may not know that the "ERA" field was available if only hitters had been observed in the collection. So, the analysis platform computes (or, infers) a unified schema from the ingested data and presents a relational view of the schema to assist the analyst in formulating queries.

The analysis platform aims to produce a schema aimed at optimizing the precision and conciseness of the schema. Generally, precise means that the schema represents all the structures in the observed or ingested data and does not allow for structures not yet seen. Concise means that the schema is small enough that it can be read and interpreted by a human.

The general approach to dynamically creating the schema is to start with a "current" schema inferred from past objects and grow the schema as new objects are ingested. We simply merge the current schema (S_curr) with the schema (type) of a new object (O_new) to arrive at the new schema (S_new):

S_new=merge(S_curr, type (O_new))

Roughly speaking, the merging process takes the union of the two schemas, collapsing common fields, sub-objects, and arrays, and adding new ones when they appear. This is discussed in more detail below.

Objects

Some of the following examples use data that resembles the output of a data stream from Twitter, referred to as the firehose. The Twitter firehose gives a stream (unending sequence) of JSON objects that represent the tweets "tweeted" and metadata about those tweets: e.g., user, location, topics, etc.). These tweets are analogous to many other types of event log data, such as that generated by modern web frameworks (e.g., Ruby on Rails), mobile applications, sensors and devices (energy meters, thermostats), etc. Although similar to Twitter data, the following examples diverge from actual Twitter data for purposes of explanation.

Basic JSON objects are straightforward to deal with; we simply infer the types seen in the object. For instance, consider the following object:

```
{ "created_at": "Thu Nov 08", "id": 266353834,
    "source": "Twitter for iPhone",
    "text": "@ilstavrachi: would love dinner. Cook this:
    http://bit.ly/955Ffo",
    "user": { "id": 29471497, "screen_name": "Mashah08" },
    "favorited": false}
```

The schema inferred from that object would be:

```
{ "created_at": string, "id": number, "source": string,
    "text": string,
    "user": { "id": number, "screen_name": string },
    "favorited": boolean }
```

As new objects arrive, new fields can be added by performing a union on the set of fields. Sometimes, a field will be repeated, but its type varies, a condition called type polymorphism. The schema uses multiple attributes with the same key to represent type polymorphism.

Log formats often change and developers may add new fields, or change the field type. As a concrete example, consider the "id" field identifying the tweet, which was originally a number. However, as the number of tweets grew, certain programming languages could not handle such large numbers, and so the "id" field has been changed to a string. So, suppose we saw a new record of the form

```
{ "created_at": "Thu Nov 10", "id": "266353840",
    "source": "Twitter for iPhone",
    "text": "@binkert: come with me to @ilstavrachi place",
    "user": { "id": 29471497, "screen_name": "Mashah08" },
    "retweet_count": 0 }
```

Since a string "id" has now been seen, and a new field "retweet_count" has appeared, the schema is augmented as follows:

```
{ "created_at": string, "id": number, "id": string,
    "source": string, "text": string,
    "user": { "id": number, "screen_name": string },
    "retweet_count": number }
```

Notice that "id" appears twice, once as a string and once as a number. Sometimes, the structure of nested objects vary. For example, suppose we added more profile information for the user:

```
{ "created_at": "Thu Nov 10", "id": "266353875",
    "source": "Twitter for iPhone",
    "text": "@binkert: come with me to @ilstavrachi place",
    "user": { "id": "29471755", "screen_name": "mashah08",
    "location": "Saratoga, CA", "followers_count": 22 },
    "retweet_count": 0 }
```

In that case, the platform recursively merges the "user" nested schema to get the following schema:

```
{ "created_at": string, "id": number, "id": string,
    "source": string, "text": string,
    "user": { "id": number, "id": string, "screen_name":
    string,
    "location": string, "followers_count": number },
    "retweet_count": number }
```

Null Fields and Empty Objects

Empty objects or null fields can be present in JSON records. For example, the record for a person's coordinates (latitude and longitude) might be:
{"coordinates": { }}
The schema has the identical type:
{"coordinates": { }}
Strictly speaking, { } is termed instance, and the type is object. The examples and explanations in this disclosure vary from strict JSON for ease of explanation.

Similarly, the following object
{"geo": null}
has the identical type:
{"geo": null}
If a subsequent record has a value for the object, the empty object is filled in by applying the merge. For instance, the records:
{"coordinates": { }}
{"coordinates": {"type": "Point"} }
will produce the schema
{"coordinates": {"type": string} }
A null type is similarly replaced by an observed type. For example, the records
{"geo": null}
{"geo": true}
will produce the schema:
{"geo": boolean}

Arrays

Tweets often contain items such as hashtags (highlighted topic words), urls, and mentions of other Twitter users. The Twitter firehose, for example, may parse and extract these items automatically for inclusion in the tweet's JSON object. In the following examples, hashtag metadata is used to illustrate how the schema for arrays is inferred.

First, let's consider extracting and recording a list of starting offsets for hashtags in the following tweet (or string):
"#donuts #muffins #biscuits"
Those offsets may be represented with an array as follows:
{"offsets": [0, 8, 17]}
An array in the source data is represented in the schema as an array containing the types of the elements found in the source array, in no particular order. Thus, the schema for the above object is:
{"offsets": [number]}

One may want to include the hashtag along with the offset for later processing. In that case, the tweet object may enumerate both the hashtag and offset in the array as follows:
{"tags": [0, "donuts", 8, "muffins", 17, "biscuits"]}
The corresponding schema would include both types in the array:
{"tags": [number, string]}
Alternatively, the tags and offsets could be reversed as follows:
{"tags": ["donuts", 0, "muffins", 8, "biscuits", 17]}
and, because the "tags" array can contain either a string or number, the resulting schema is:
{"tags": [string, number]}
In fact, tag text and tag offsets can be included in adjacent objects:
{"tags": ["donuts", "muffins", "biscuits"]},
{"tags": [0, 8, 17]}
There are now two schemas for "tags":
{"tags": [string]} and {"tags": [number]}
In this case, the arrays are at the same depth and can be merged to yield the same schema as above:
{"tags": [string, number]}
Also, note that the following schemas are identical:
{"tags": [string, number]}
{"tags": [number, string]}
This is because the list of types is treated as a set. Types for array elements are merged where possible, and merging is further performed for objects and arrays inside arrays. In various other implementations, the order of types and dependencies among types (in both arrays and objects) could be preserved. However, this may make the schema much less concise.

Nested Objects

To illustrate nested objects, suppose both beginning and ending offsets are recorded as follows:

```
{ "tags": [{ "text": "donuts", "begin": 0 }, { "text":
    "donuts", "end": 6 }]}
```

The resulting schema is:

```
{ "tags": [{"text": string, "begin": number,
    "end": number }] }
```

As shown, the objects types are merged instead of typing the array elements separately.

Similarly, in a case where the tag string and offsets are in nested arrays:
{"tags": [["donuts", "muffins" ], [0, 8]]}=>
{"tags": [[string], [number]]},
The schema further reduces to:
{"tags": [[string, number]]}
This is the tradeoff made in various implementations of the present disclosure between precision of the schema and conciseness of the schema.

Empty objects and empty arrays are treated as follows. Because empty objects are filled in as described above, the following example schema reduction is possible:

```
{ "parsed": { "tag": { }, "tag": { "offset": number } } }
    => { "parsed": { "tag": { "offset": number }}
```

Similarly, using the merging rules for arrays, the following schema reductions are made:

```
{ "tags": [[ ], [ number ]] } => { "tags": [[ number ]] }
{ "tags": [[ ], [[ ]]] } => { "tags": [[[ ]]] }
{ "tags": [[ ], [[ ]], [number]] } => { "tags": [[[ ]],
    [number]] } => { "tags": [[[ ], number]]] }
```

Merge Procedure

To create a new schema from a previous schema and a new object, the analysis platform first types (i.e., computes the schema for) the new object. This procedure is intended to specify the canonical semantics for typing, not describe any particular implementation. In the following description, the variables v, w, v_i, w_j range over any valid JSON value, while j, k, j_m, k_n range over valid strings. The base rules for typing are:

```
type(scalar v) = scalar_type of v
type({ k_1: v_1, ..., k_n: v_n }) =
    collapse({ k_1: type(v_1), ..., k_n: type(v_n) })
type([ v_1, ..., v_n ]) =
    collapse([ type(v_1), ..., type(v_n) ])
```

The first rule simply states that for a scalar, such as 3 or "a", the corresponding type is inferred directly from the value itself (number for 3 or string for "a"). The second and third rules recursively type objects and arrays using the collapse function.

The collapse function repeatedly merges types of the same field in objects, and merges objects, arrays, and common types inside arrays. It continues recursively until the scalar types are reached. For objects, the collapse function is:

```
collapse({ k_1: v_1, ..., k_n: v_n }):
    while k_i == k_j:
        if v_i, v_j are scalar types and v_i == v_j OR
           v_i, v_j are objects OR v_i, v_j are arrays:
            replace    {..., k_i: v_i, ..., k_j: v_j, ...}
            with       {..., k_i: merge(v_i, v_j), ...}
```

For arrays, the collapse function is:

```
collapse([ v_1, ..., v_n ]):
    while v_i, v_j are scalar types and v_i == v_j OR
          v_i, v_j are objects OR v_i, v_j are arrays:
        replace    [..., v_i, ..., v_j, ...]
        with       [..., merge(v_i, v_j ), ...]
```

The merge function describes how to pairwise combine values to remove duplicates and combine arrays/maps. For objects, merge simply calls collapse recursively to collapse common fields:

```
merge(v, v) = v
merge({}, { k_1: v_1, ..., k_n: v_n }) = { k_1: v_1, ...,
    k_n: v_n }
merge({ j_1: v_1, ..., j_n: v_n }, { k_1: w_1, ..., k_m:
    w_m } )
  = collapse({ j_1: v_1, ..., j_n: v_n, k_1: w_1, ...,
    k_m: w_m })
```

Similarly for arrays:

```
merge([ ], [v_1, ..., v_n]) = [v_1, ..., v_n]
merge([v_1, ..., v_n], [w_1, ..., w_m])
    = collapse({v_1, ..., v_n, w_1, ..., w_m})
```

Nulls are preserved, such as shown here:

```
merge ( { "coordinates": { } } , { "coordinates": null } ,
       {" coordinates": [ ] } )
  = { "coordinates": { }, "coordinates": [ ], "coordinates":
      null }
```

A JSON null is a value, just as the number 9 is a value. In a relation, NULL indicates that there was no value specified. In SQL, nulls are presented as tags<null>: boolean, where the Boolean value is True if the null exists, and NULL otherwise. To simplify the schema for a SQL user, the coordinates<null> column can be omitted if the user does not need to differentiate JSON nulls from SQL nulls.

Cumulative Example

With the above simple rules, it is possible to type deeply nested JSON records. For instance, consider a complex hypothetical record that represents page view statistics for a web page:

```
{ "stat": [ 10, "total_pageviews", { "counts": [1, [3]],
    "page_attr": 7.0 }, { "page_attr": ["internal"]} ]}
```

The following schema would be produced:

```
{ "stat": [number,
           string,
           { "counts": [number, [number]],
             "page_attr": number,
             "page_attr": [string]
           }]}
```

In various implementations, the JSON Schema format can be used to encode the inferred schema. This format is standardized, and can easily be extended to incorporate additional metadata (e.g., whether an object is a map). However, it is quite verbose and space-inefficient, so it is not used for the examples in this disclosure. For instance, in JSON-Schema format, the above schema is represented as follows:

```
{
  "type": "object",
  "properties": {
    "stat": {
      "items": {
        "type": [
          "number",
          "string",
          {
            "type": "object",
            "properties": {
              "counts": {
                "items": {
                  "type": [
                    "number",
                    {
                      "items": {
                        "type": "number"
                      },
```

-continued

```
                    "type": "array"
                  }
                ]
              },
              "type": "array"
            },
            "page attr": {
              "type": [
                "number",
                {
                  "items": {
                    type": "string"
                  },
                  "type": "array"
                }
              ]
            }
          }
        ]
      },
      "type": "array"
    }
  }
}
```

Map Adornment

Developers and analysts can use JSON objects and arrays for many different purposes. In particular, JSON objects are frequently used both as objects and as "maps." For example, a developer might create an object, where the fields are dates and values are collected statistics like page views. Another example is when fields are user ids and values are profiles. In these cases, the object is more like a map data structure rather than a static object. A user does not always know the possible fields names because there are so many of them, and the field names are dynamically created. As a result, users may want to query fields in the same way they query values.

To support this use, the analysis platform is able to identify maps. The analysis platform incorporates heuristics to identify maps, and also allows users to specify which nested objects should and should not be treated as maps. Tagging objects as maps is called adornment.

Generally, adornment is performed after the initial load—that is, it is not necessary to identify maps on the initial ingest. Adornment can be performed later on a second pass, or after more data has been ingested. In addition, maps can be reverted back to simply objects, if needed.

By default, JSON objects are treated as objects (or, structs, in C nomenclature). This can be explicitly indicated in the JSON Schema by annotating an object with "obj_type": object. The shorthand notation used in examples below is O{ }.

To flag maps, the heuristic looks for fields that as a group occur relatively infrequently compared to their containing object (container). For maps, the shorthand M{ } is used.

While computing the schema on the first pass, the frequency that fields occur is tracked. Consider an object (or nested-object) which occurs with frequency F in the data set. Let $v\_i$ be the frequency of field i in the object, and N be the number of unique fields of the object (irrespective of its type). The ratio $(\text{sum}(v\_i)/N)/F$ is the ratio of the average field frequency to the frequency of the container. If this ratio is below a threshold, such as 0.01, which may be user-configurable, then the containing object is designated as a map. In various implementations, empty objects in the JSON Schema are treated as maps.

Creating Relational Schema

After the schema of the JSON objects in the source data set is inferred, the analysis platform produces a relational schema that can be exposed to SQL users and SQL-based tools. The goal is to create a concise schema that represents the containment relationships in the JSON schema, while giving the users the power of standard SQL. This relational schema is produced from the adorned JSON schema, and is a view over the underlying semi-structured data set. A few examples of how a JSON schema is converted to a relational view are presented here, before discussing a generalized procedure for performing the conversion.

Objects

The simplest example is an object with simple scalar types, such as the following schema:

{ "created_at": string, "id": number, "text": string,
    "source": string, "favorited": boolean }

In this case, the fields of the object translate directly into columns of a relation:

Root(created_at: str, id: num, text: str, source: str,
    favorited: bool)

The relation (or, table) of the top-level object is called "Root" here, although it can be replaced by, for example, the name of the source collection, if such a name exists. In the interest of space and readability, the type names string, number, and boolean have been shortened to str, num, and bool.

The type can be added to the attribute name in order to support type polymorphism. For instance, consider the following schema:

{ "created_at": string, "id": number, "id": string, "text":
    string, "source": string, "favorited": boolean }

The resulting relational schema would then have separate "id" and "id" columns:

Root(created_at: str, id<num>: num, id<str>: str,
    source: str, text: str, favorited: bool)

Nested Objects

Nested objects produce new relations with foreign-key relationships. For instance, consider the JSON schema:

{ "created_at": string, "id": number, "source": string,
    "text": string,
    "user": { "id": number, "screen_name": string },
    "favorited": boolean }

The corresponding relational schema is

Root(created_at: str, id: num, source: str, text: str,
    favorited: bool, user: join_key)
Root.user(id_jk: join_key, id: num, screen_name: str)

The nested object is "normalized" into a separate relation named by its path, "Root.user" in this case. The column "Root.user"."id_jk" in the new table that represents the sub-object is a foreign-key for the column "Root.user" ("user" column in the table "Root"). The type is specified as "joinkey" to distinguish it from other columns, but in actual implementations, the join_key type is typically an integer.

Objects can be nested several levels deep. For example, retweet objects may include a retweeted status object, which includes the profile of the user that retweeted, resulting in the following schema:

```
{ "created_at": string, "id": number, "source": string,
    "text": string,
    "user": { "id": number, "screen_name": string },
    "retweeted_status": { "created_at": string, "id":
    number, "user": { "id": number, "screen_name": string }
    }, "favorited": boolean }
```

The corresponding relational view is:

```
Root(created_at: str, id: num, source: str,
    text: str, favorited: bool,
    user: join_key, retweeted_status: join_key)
Root.user(id_jk: join_key, id: num, screen_name: str)
Root.retweeted_status(id_jk: join_key, created_at: str, id:
    num, user: join_key)
Root.retweeted_status.user(id_jk: join_key, id: num,
    screen_name: str)
```

Note that "Root.user", "Root.retweeted_status", and "Root.retweeted_status.user" are all separated into different tables.

Optimizing 1-to-1 Relationships

In nested object relationships, often there is a 1-to-1 relationship from rows in the main table to the rows in the table for the nested object. As a result, these can be collapsed 1-to-1 into a single table using dotted notation for the column names.

For example, the multi-relation examples above flatten into:

```
Root(created_at: str, id: num, source: str,
    text: str, favorited: bool,
    user.id: num, user.screen_name: str)
``` and, for the three-level nested object example,

```
Root(created_at: str, id: num, source: str,
    text: str, favorited: bool,
    user.id: num, user.screen_name: str,
    retweeted_status.created_at: str,
    retweeted_status.id: num,
    retweeted_status.user.id: num,
    retweeted_status.user.screen_name: str)
```

Note that, since the relational schema is simply a view over the JSON schema, flattened, partially flattened, or separate (un-flattened) relational schema can be presented to the user as desired by the analysis platform without modifying the underlying data. The only limitation is that the user not be presented with conflicting table definitions.

Maps

Without designating a set of fields as a map, the corresponding relational schema may include a huge number of columns. In addition, the user may want to query the field names; for example, they may want to find the average page views in December.

To solve these issues, the tables for (nested) objects that are adorned as maps can be "pivoted." For example, consider the following schema for keeping track of various metrics (daily page views, clicks, time spent, etc.) for each page on a web site:

```
O{ "page_url": string, "page_id": number,
    "stat_name": string,
    "metric": M{ "2012-01-01": number, "2012-01-02": number,
    ..., "2012-12-01": number, ...}}
```

Rather than producing a table with a separate column for each day, the fields and values can be stored as key-value pairs in a relation:

```
Root(page_url: str, page_id: num, stat_name: str,
    metric<map>: join_key)
Root.metric<map>(id_jk: join_key, key: string, val: num)
```

In this case, the id column is a foreign key; indicating within which record each map entry was originally present. For a year's worth of page views, instead of having 365 columns in table "Root.metric", there are only two. The "key" column stores the field names and the "val" column stores the values. For example, for the above schema, the database may contain these records for "www.noudata.com/jobs" (page_id 284):

```
Root("www.noudata.com/jobs", 284, "page_views", 3),
Root.metric<map>(3, "2012-12-01", 50),
Root.metric<map>(3, "2012-12-02", 30), ...
```

Pivoting still works when there is type polymorphism in the map. For example, suppose the metric represents sentiment, which contains both a category and a score indicating the strength of the category:

```
{ "page_url": "www.noudata.com/blog", "page_id": 285,
    "stat_name": "sentiment"
    "metric": { "2012-12-01": "agreement", "2012-12-01": 5,
    "2012-12-05": "anger", "2012-12-05": 2, ...
    } }
```

The JSON schema would be:

```
O{ "page_url": string, "page_id": number,
    "stat_name": string,
    "metric": M{ "2012-12-01": string, "2012-12-01": number,
    ...,
    "2012-12-05": string, "2012-12-05": number,
    ...}}
```

When creating the relational schema, a new "val" column can be added to the map relation to include the new type. The other "val" columns can be appended with their types as well to distinguish the column names, as shown:

```
Root(page_url: str, page_id: num, stat_name: str,
    metric<map>: join_key)
Root.metric<map>(id_jk: join_key, key: string,
    val<str>: str, val<num>: num)
```

The entries resulting from the above JSON object would appear as:

```
Root.metric<map>(4, "2012-12-01", "agreement", NULL),
Root.metric<map>(4, "2012-12-01", NULL, 5),
Root.metric<map>(4, "2012-12-05", "anger", NULL),
Root.metric<map>(4, "2012-12-05", NULL, 2) ...
```

Once these maps are pivoted, users can apply predicates and functions to the key column as they would any other column.

Nested Maps

The basic principles are the same for nested maps. Consider a list of statistics per day and per hour:

```
M{"2012-12-01": M{ "12:00": number,
                  "01:00": number,
                  "02:00": number,
                  ... },
  "2012-12-02": M{ ... },
  ... }
```

The resulting schema would be

```
Root(id_jk: join_key, key: string, val<map>: join_key)
Root.val<map>(id_jk: join_key, key: string, val<num>: num)
```

Objects can also be nested inside maps:

```
M{"2012-12-01": O{ "sentiment": string,
                   "strength": number }
  "2012-12-02": O{ ... }
  ... }
```

The resulting flattened relational schema is:

```
Root(id_jk: join_key, key: string, val<map>: join_key)
Root.val<map>(id_jk: join_key, sentiment: string,
              strength: number)
```

Empty Elements

Empty objects sometimes appear in the data. Consider the schema:

```
{ "created_at": string, "id": number, "source": string,
  "text": string,
  "user": { "id": number, "screen_name": string } }
```

A JSON object may be received without user information, as shown here:

```
{ "created_at": "Thu Nov 08",
  "id": 266353834,
  "source": "Twitter for iPhone",
  "text": "@ilstavrachi: would love dinner. Cook this:
           http://bit.ly/955Ffo",
  "user": { } }
```

The empty user object can be represented with the following relational tuples:

```
Root("Thu Nov 08", 266353834, "Twitter for iPhone",
     "@ilstavrachi: would love dinner. Cook this:
     http://bit.ly/955Ffo", join_key)
Root.user(join_key, NULL, NULL)
```

If all ingested user objects had an empty object in the ingested stream, the resulting JSON schema would include an empty object. For example, see the final field ("user") in this schema:

{"id": number, "user": { }}

In this case, empty object "user" can be treated as a map, resulting in the following relational schema:

```
Root(id: num, user<map>: join_key)
Root.user<map>(id_jk: join_key, key: string)
```

Note that Root.user<map> does not have any value columns, and initially is empty. However, this design makes it straightforward to add columns later if the schema changes as new objects are ingested, because each record in Root will have already been assigned a join key.

Arrays

Arrays are treated similarly to maps, so the schema translation is quite similar. The major difference is that the string "key" field of a map is replaced by an "index" field of type integer (int) corresponding to the array index. A simple example is:

{"tags": [string]} which leads to the relational schema:

```
Root(tags<arr>: join_key)
Root.tags<arr>(id_jk: join_key, index: int, val<str>: str)
```

Type polymorphism and nested arrays work the same way as for maps. Consider the following schema:

{"tags": [number, string]} which leads to the relational schema:

```
Root(tags<arr>: join_key)
Root.tags<arr>(id_jk: join_key, index: int,
               val<num>: num, val<str>: str)
```

An object may be nested within in an array, as here:

{"tags": [{"text": string, "offset": number}]}

The resulting relational schema can be created as:

```
Root(tags<arr>: join_key)
Root.tags<arr>(id_jk: join_key, index: int, val: join_key)
Root.tags<arr>.val(id_jk: join_key, text: str, offset: num)
```

Using the 1-to-1 flattening optimization, the relational schema becomes:

```
Root(tags<arr>: join_key)
Root.tags<arr>(id_jk: join_key, index: int,
               val.text: str, val.offset: num)
```

Nested and Empty Arrays

Relational schemas can be created for nested and empty arrays in a similar manner to maps. For the following schema:
{"tags": [string, [number]], "urls": [ ]}
the relational schema would be:

```
Root(tags<arr>: join_key, urls<arr>: join_key)
Root.tags<arr>(id_jk: join_key, index: int,
    val<str>: str, val<arr>: join_key)
Root.tags<arr>.val<arr>(id_jk: join_key, index: int,
    val<num>: num)
Root.urls<arr>(id_jk: join_key, index: int)
```

Note that, for the nested array, a separate table is created with "val" appended to the table name. For the empty array, a separate table is created with only an "index" column, but no "val" column, which can be added later once the contents of the array are observed and typed.

Type Inference on Atomic Values

The above type inference and conversion to relational schema procedure relies on the basic types available in JSON. The same procedure applies equally to whatever type system is selected. In other words, the analysis platform can infer narrower scalar types like integer, float, and time, as long as the atomic scalar types can be inferred from the value. BSON and XML have such extended type systems. Moreover, various heuristics (such as regular expressions) can be used to detect more complex types such as dates and times.

Since ANSI SQL does not support the same types as JSON, the inferred types are converted into the most specific types seen thus far for the relational view. For example, if only integers have been seen for field "freq", then the number type will be converted to integer in the relational schema for "freq". Similarly, if both integers and floats have been observed, then the relational schema will show the "freq" column as a float. Likewise, string fields convert to character varying types in the relational schema. In other words, the more specific types than basic JSON types may be tracked.

An alternative is to rely on type polymorphism and use the more specific type system to infer the data value's types. That is, instead of using JSON primitive types, use ANSI SQL's primitive types.

Below are the list of types tracked during ingestion (on the left) and how they are converted for the SQL schema (on the right). Most SQL databases support additional types including text which can be used if desired by the client. Note: the ObjectId type is specific to BSON.

```
int32,              --> INTEGER
int64,              --> INTEGER
double,             --> DOUBLE PRECISION
string,             --> VARCHAR
date,               --> DATE
bool,               --> BOOLEAN
object_id, (BSON)   --> VARCHAR(24)
time                --> TIME
timestamp           --> TIMESTAMP
```

Procedure

Converting from a JSON schema to a relational schema can be accomplished using a recursive unpacking of the nested JSON schema structure. A pseudocode representation of an example implementation is shown here.

```
Call for every attribute in topmost object:
attr_schema, "Root", attr_name
create_schema(json_schema, rel_name, attr_name):
/* Creates a table (relation) if it's adorned as an object
*/
if json_schema is object:
    Add join key called attr_name to relation rel_name
    new_rel = rel_name + "." + attr_name
    Create relation new_rel
    add (id_jk: join_key) to new_rel
    /* recursively add attributes to the table (relation) */
    for attr, attr_schema in json_schema:
        create_schema(attr_schema, new_rel, attr)
/* Creates appropriate attrs and table for (nested) map */
else if json_schema is map:
    Add join key called 'attr_name + <map>' to relation
        rel_name
    new_rel = rel_name + "." + attr_name<map>
    Create relation new_rel
    Add (id_jk: join_key) and (key: string) to new_rel
    /* recursively add attributes to the table (relation) */
    for each distinct value type val_type in json_schema:
        create_schema(val_type, new_rel, "val")
/* Creates appropriate attrs and table for array */
else if json_schema is array:
    Add join key called 'attr_name + <arr>' to relation
        rel_name
    new_rel = rel_name + "." + attr_name<arr>
    Create relation new_rel
    Add (id_jk: join_key) and (index: int) to new_rel
    /* recursively add attributes to the table (relation) */
    for each distinct item type item_type in json_schema:
        create_schema(item_type, new_rel, "val")
/* Primitive type, add column to the table (relation) */
else:
    If attr_name does not exist in relation rel_name:
        Add column (attr_name, attr name's type) to relation
            rel_name
    else
        Rename attribute attr_name to attr_name + "<orignal
            attr_name's type>" in relation rel_name
        Add column (attr_name + "<" + attr_name's type + ">",
            attr_name's type) to relation rel_name
```

The above procedure will create the relational schema without the 1-to-1 optimization. A second pass may be performed through the relational schema, identifying object tables with 1-to-1 relationships and collapsing them. Alternatively, the 1-to-1-optimization could be performed inline, but this was not shown for clarity. When a sub-tree of the schema with nested objects is not "interrupted" by arrays or maps, then the entire object sub-tree can be collapsed into a single table with attributes named by their path to the root of the sub-tree. An attribute that is a map or object remains in a separate table, but any sub-objects contained within can be collapsed recursively. These principles apply to any arbitrary depth of nested objects.

Populating Indexes with Data

Once the JSON and relational schemas have been updated in response to a new object, the data contained within the object can be stored in indexes, as described below.

The indexes in the analysis platform rely on order-preserving indexes that store key-value pairs. The indexes support the operations: lookup(prefix), insert(key, value), delete (key), update(key, value), and get_next( ) for range searches. There are a number of data structures and low-level libraries that support such an interface. Examples include BerkeleyDB, TokyoCabinet, KyotoCabinet, LevelDB, and so on. These internally use order-preserving, secondary store data structures like B-trees, LSM (log-structured merge) trees, and Fractal trees. There may be special cases where non-order-preserving indexes (such as hash tables) are used, such as for object IDs. With non-order-preserving indexes, get_next( ) and the ability to do range searches may be sacrificed.

In various implementations, the analysis framework uses LevelDB, which implements LSM trees, does compression, and provides good performance for data sets with high insert rates. LevelDB also makes performance trade-offs that may be consistent with common use models for the analysis framework. For example, when analyzing data such as log data, data will be frequently added, but existing data will be infrequently, or, never, changed. Advantageously, LevelDB is optimized for fast data insertion at the expense of slower data deletion and data modification.

Order-preserving indexes have the property that they collocate the key-value pairs in key order. Thus, when searching for key-value pairs nearby a certain key or retrieving items in order, the responses will return much faster than when retrieving items out of order.

The analysis platform can maintain multiple key-value indexes for each source collection, and in some implementations, between two and six indexes for each source collection. The analysis platform uses these indexes for evaluating SQL queries over the relational schema (the SQL schema does not need to be materialized). Each object is assigned a unique id denoted by tid. The two indexes from which the other indexes and the schemas can be reconstructed are the BigIndex (BI) and ArrayIndex (AI).

BigIndex (BI)

The Big Index (BI) is the base data store that stores all fields in the data that are not embedded in an array. A value (val) can be retrieved from the BI by a key based on col_path and tid.

(col_path, tid)→val

The col_path is the path to the field from the root object with the field's type appended. For example, for the following records:

| | |
|---|---|
| 1: | { "text": "Tweet this", "user": { "id": 29471497, "screen_name": "Mashah08" } } |
| 2: | { "text": "Tweet that", "user": { "id": 27438992, "screen_name": "binkert" } } | the following key-value pairs are added to the BI:

(root.text<str>, 1) --> "Tweet this"
(root.text<str>, 2) --> "Tweet that"
(root.user.id<num>, 1) --> 29471497
(root.user.id<num>, 2) --> 27438992
(root.user.screen_name<str>, 1) --> "Mashah08"
(root.user.screen_name<str>, 2) --> "binkert"

in various implementations, the underlying index store (such as LevelDB) is unaware of the significance of the segments of the key. In other words, while "root.text<str>, 1" signifies the first element of the string text field in the root table, the index store may simply see an undifferentiated multi-character key. As a simple example, the key could be created simply by concatenating the col_path and tid (importantly, in that order). For example, the first key demonstrated above may be passed to the index store as "root.text<str>1." The index store will collocate the second key ("root.text<str>2") with the first key not because of any understanding of the path similarity, but simply because the first 14 characters are the same. Even though the column name and type are stored as part of every key, because of the sort ordering, compression (such as prefix-based compression) can be used to reduce the storage cost.

In the BI, all columns of the source data are combined into a single structure, unlike traditional column stores which create a separate column file for every new column. The BI approach allows for a single index instance and also enables map detection to be delayed. Since new fields simply appear as entries in the BI, failing to pivot a map does not incur the physical cost of creating a large number of physical files for each field later turned into a map.

In the BI, the key-value pairs for each attribute or "column" are collocated. Thus, like column files, the BI allows the query executor to focus on the fields of interest in a query rather than forcing it to sweep through data containing fields not referenced in a query.

ArrayIndex (AI)

Although fields from the normalized tables for arrays could be added to the BI, the array indices would then be from their corresponding values. Instead, array fields can be added to a separate ArrayIndex (AI) that preserves the index information and allows entries in the same array to be collocated by the index store, which provides good performance for many queries. The array values can be stored in the AI using the following signature:

(col_path, tid, join_key, index)→val

The col_path is the path of the array field: for example, "root.tags" for elements in the tags array, or "root.tags.text" for the "text" field in an object inside the tags array. The join_key and index are the array's foreign key and index of the value. The tid is also stored, to avoid having to store a separate entry in the BI for each array. The tid can be used to look up values for corresponding columns in the same object. Consider the objects that represent hashtags in different tweets:

| | |
|---|---|
| 1: { "id": 3465345, "tags": [ "muffins" "cupcakes" ] } |
| 2: { "id": 3465376, "tags": [ "curry" "sauces" ] } |

For these, the tags table has the following schema:

Root.tags<arr>(id_jk: join_key, index: int, val: string)

For that table, the entries in the AI would be:

(root.tags<arr>, 1, 1, 0) --> "muffins"
(root.tags<arr>, 1, 1, 1) --> "cupcakes"
(root.tags<arr>, 2, 2, 0) --> "curry"
(root.tags<arr>, 2, 2, 1) --> "sauces"

The array index allows for quickly iterating through the values of array fields. This is useful, for example, when running statistics over these fields (e.g., sum, average, variance, etc.), finding specific values, etc.

Nested Array Example

Note that, for arrays in the root object (top-level arrays), the tid and join_key fields are redundant (see above) and can be optimized away. However, for nested arrays, a separate join_key is needed and not superfluous. For example, consider this JSON object:

| |
|---|
| 1: {"id": 3598574, "tags": [[8,25,75], ["muffins", "donuts", "pastries"]]} |

The corresponding relational schema is:

```
Root.tags<arr>(id_jk: join_key, index: int, val<arr>:
    join_key)
Root.tags<arr>.val<arr>(id_jk: join_key, index: int,
    val<num>: num, val<str>: str)
```

Recall that the AI uses the following key-value pair
col_path, tid, join_key, index→val
which results in these AI entries

```
tags<arr>.val<arr>, 1, 1, 0 -> 1
tags<arr>.val<arr>, 1, 1, 1 -> 2
(numbers array)
tags<arr>.val<arr>.val<num>, 1, 1, 0 -> 8
tags<arr>.val<arr>.val<num>, 1, 1, 1 -> 25
tags<arr>.val<arr>.val<num>, 1, 1, 2 -> 75
(string array)
tags<arr>.val<arr>.val<str>, 1, 2, 0 -> "muffins"
tags<arr>.val<arr>.val<str>, 1, 2, 1 -> "donuts"
tags<arr>.val<arr>.val<str>, 1, 2, 2 -> "pastries"
```

Note that if the join key were removed from the nested array key-value pairs, then it would not be possible to know whether muffins was part of the first nested array or the second. Thus, the join key is redundant for a top-level array, but not for cases of nested arrays.

Array Index 2 (AI2)

Although these two indexes (BI and AI) are sufficient to reconstruct all the ingested data, there are access patterns that they do not support efficiently. For these, we introduce the following indexes, which can optionally be created to improve performance at the cost of additional space.

This has the signature:
(col_path, index, tid, join_key)→val
which allows specific index elements of an array to be found quickly. For example, returning all tags at index 10 (tags[10]) is simple and fast using AI2.

Map Index (MI)

The map index is similar to the array index in its functionality and signature:
(col_path, tid, join_key, map_key)→val The primary difference is that the map index is not built during initial ingestion, and is instead constructed asynchronously. During initial loading, maps will be treated as objects and inserted into the BI as usual. Once both are populated, there are entries available in both the BI and MI for more efficient query processing. The BI entries remain relevant in case a user or administrator requests that the map be unadorned. Only the relational schema needs to be changed, and the original BI entries corresponding to the unmapped data will then be used in queries.

Like the AI, the MI is useful when iterating through the elements of a map: for applying statistical functions, for restricting to specific field names, etc. Consider again objects that maintain pageview statistics:

```
1: { "url": "noudata.com/blog",
     "page_views": { "2012-12-01": 10, "2012-12-02": 12, ...
       "2012-12-15": 10 }
2: { "url": "noudata.com/jobs",
     "page_views": { "2012-12-01": 2, "2012-12-02": 4, ...
       "2012-12-15": 7 }
```

The relational schema for the page_views table if flagged as a map is:

```
Root.page_views<map>(id_jk: join_key, key: string, val:
    num)
where key is the map's key and val is the associated value.
    For the above objects, the entries in the MI would be:
(root.page_views<map>, 1, 1, "2012-12-01") --> 10
(root.page_views<map>, 1, 1, "2012-12-02") --> 12
...
(root.page_views<map>, 1, 1, "2012-12-15") --> 10
(root.page_views<map>, 2, 2, "2012-12-01") --> 2
(root.page_views<map>, 2, 2, "2012-12-02") --> 4
...
(root.page_views<map>, 2, 2, "2012-12-05") --> 7
```

This ordering allows the values in the page_views map to be collocated for each page, while in the BI, the values would be collocated by date.

Map Index 2 (MI2)

In addition, an auxiliary map index may be implemented. The map index is similar to the array index in its functionality and signature:
(col_path, map_key, tid, join_key)→val
This allows efficient searches for specific map elements, such as "all the different values corresponding to map key 2012-12-05." A generic representation of both AI2 and MI2 can be written as follows:
(col_path, key, tid, join_key)→val
where key corresponds to the index of an array or the map_key of a map.

ValueIndex (VI)

Although the above indexes are useful for looking up values for specific fields and iterating through those values, they do not allow fast access if queries are looking only for specific values or ranges of values. For example, a query may ask to return the text of tweets written by "mashah08". To assist such queries, a ValueIndex can be built for some or all fields in the schema. The ValueIndex may be built as data is ingested or be built asynchronously later. The key for the value index is:
(col_path, val)
where val is the value of the attribute in the source data. The corresponding value to that key in the VI depends on where the field for the value occurs. For each of the indexes above, it varies:

```
BI: (col_path, val) --> tid
AI: (col_path, val) --> tid, join_key, index
MI: (col_path, val) --> tid, join_key, key
```

For example, the tweets:

```
1: { "text": "Tweet this", "user": { "id": 29471497,
     "screen_name": "mashah08" } }
2: { "text": "Tweet that", "user": { "id": 27438992,
     "screen_name": "binkert" } }
``` are stored as:

```
(root.text<string>, "Tweet this")              --> 1
(root.text<string>, "Tweet that")              --> 2
(root.user.id<num>, 29471497)                  --> 1
(root.user.id<num>, 27438992)                  --> 2
(root.user.screen_name<string>, "Mashah08")    --> 1
(root.user.screen_name<string>, "binkert")     --> 2
```

Using the VI, one can search for all tweets authored by "mashah08" by looking for the key: (root.user.screen_name, "mashah08") and retrieving all associate tids. Then the BI can be searched using the retrieved tids to return the corresponding text of each tweet.

The cost of indexes, and especially the value index, is the additional storage space, and the execution time needed to update them as new objects are added to the system. Due to space or update overheads, the user may not want to index all possible paths because of these. So, the user can specify which paths to index in the VI.

RowIndex (RI)

To facilitate re-creation of an entire ingested object (similar to requesting a record in a traditional row-based store), a RowIndex (RI) can be implemented. The RowIndex stores a key-value pair tid-→JSON object The JSON object may be stored as a string representation, as a BSON, or as any other serialized format, such as a tree structure used for internal representation of a JSON object. For the two tweets discussed above with respect to the VI, the corresponding RI entries would be:

```
1 --> { "text": "Tweet this", "user": { "id": 29471497,
    "screen_name": "mashah08" } }
2 --> { "text": "Tweet that", "user": { "id": 27438992,
    "screen_name": "binkert" } }
```

Example

An example for the BI, AI, MI, and VI. Consider tweets similar to the above, where a "retweet_freq" attribute is added, which keeps track of how many times a tweet was retweeted in a day:

```
1: { "text": "Love #muffins and #cupcakes: bit.ly/955Ffo",
    "user": { "id": 29471497, "screen_name": "mashah08" },
    "tags": [ "muffins", "cupcakes" ],
    "retweet_freq": { "2012-12-01": 10, "2012-12-02": 13,
    "2012-12-03": 1 } }
2: { "text": "Love #sushi and #umami: bit.ly/955Ffo",
    "user": { "id": 28492838, "screen_name": "binkert" },
    "tags": [ "sushi", "umami" ],
    "retweet_freq": { "2012-12-04": 20, "2012-12-05": 1 } }
```

The schema for these records is:

```
O{ "text": string, "user": O{ "id": number,
    "screen_name": string }, "tags": [ string ],
    "retweet_freq": M{ "2012-12-01": number ... "2012-12-
    05": number } }
```

The JSON-Schema for these records will be

```
{
    "type": "object",
    "obj_type": "object",
    "properties": {
        "text": {
            "type": "string"
        },
        "user": {
            "type": "object",
            "obj_type": "object",
```

```
        "properties": {
            "id": {
                "type": "number",
            },
            "screen_name": {
                "type": "string",
            }
        }
    },
    "tags": {
        "type": "array",
        "items": {
            "type": "string"
        }
    },
    "retweet_freq": {
        "type": "object",
        "obj_type": "map",
        "properties": {
            "2012-12-01": {
                "type": "number"
            },
            ...
            "2012-12-05": {
                "type": "number"
            }
        }
    }
}
}
```

If retweet_freq is not treated as a map, the relational schema is:

```
Root (text: str,
    user.id: num, user.screen_name: str,
    tags<arr>: join_key,
    retweet_freq.2012-12-01: num,
    retweet_freq.2012-12-02: num,
    retweet_freq.2012-12-03: num,
    retweet_freq.2012-12-04: num,
    retweet_freq.2012-12-05: num)
Root.tags<arr> (id_jk: join_key,
    index: int,
    val: str)
```

In this case, the example records above would populate these relations as follows:

```
Root:
    ("Love #muffins ...", 29471497, mashah08, 1, 10, 13, 1,
    NULL, NULL)
    ("Love #sushi ...", 28492838, binkert, 2, NULL, NULL,
    NULL, 20, 1)
Root.tags<arr>:
    (1, 0, "muffins")
    (1, 1, "cupcakes")
    (2, 0, "sushi")
    (2, 1, "umami")
```

Note that these are the tuples the queries would return if a "select*" query were run on these tables. These tuples are not necessarily materialized as such in the storage engine. That is, this may simply be a virtual view over the underlying data, and not physically stored as depicted.

If retweet_freq is identified as a map, the relational schema becomes more concise (and more accommodating of additional data), as follows:

```
Root (text: str,
        user.id: num, user.screen_name: str,
        tags<arr>: join_key,
        retweet_freg<map>: join_key)
Root.tags<arr> (id_jk: join_key,
                index: int,
                val: str)
Root.retweet_freg<map> (id_jk: join_key,
                        key: str,
                        val: num)
```

The corresponding tuples are:

```
Root:
    ("Love #muffins ...", 29471497, mashah08, 1, 1)
    ("Love #sushi ...", 28492838, binkert, 2, 2)
Root.tags<arr>:
    (1, 0, "muffins")
    (1, 1, "cupcakes")
    (2, 0, "sushi")
    (2, 1, "umami")
Root.retweet_freg<map>:
    (1, "2012-12-01", 10)
    (1, "2012-12-02", 13)
    (1, "2012-12-03", 1)
    (2, "2012-12-04", 20)
    (2, "2012-12-05", 1)
```

The key-value pairs added to the BI are:

```
(root.retweet_freq.2012-12-01, 1) --> 10
(root.retweet_freq.2012-12-02, 1) --> 13
(root.retweet_freq.2012-12-03, 1) --> 1
(root.retweet_freq.2012-12-04, 2) --> 20
(root.retweet_freq.2012-12-05, 2) --> 1
(root.text, 1) --> "Love #muffins and #cupcakes"
(root.text, 2) --> "Love #sushi and #umami"
(root.user.id, 1) --> 29471497
(root.user.id, 2) --> 28492838
(root.user.screenname, 1) --> mashah08
(root.user.screen_name, 2) --> binkert
```

The key-value pairs added to the AI are as follows. Note that in this case, the join key is redundant (same as tid) since there are no nested arrays.

```
(root.tags<arr>, 1, 1, 0) --> "muffins"
(root.tags<arr>, 1, 1, 1) --> "cupcakes"
(root.tags<arr>, 2, 2, 0) --> "sushi"
(root.tags<arr>, 2, 2, 1) --> "umami"
```

The RI will have the following two entries

```
1 --> { "text": "Love #muffins and #cupcakes:
    bit.ly/955Ffo", "user": { "id": 29471497, "screen_name":
    "mashah08" }, "tags": [ "muffins", "cupcakes" ],
    "retweet_freq": { "2012-12-01": 10, "2012-12-02": 13,
    "2012-12-03": 1 } }
2 --> { "text": "Love #sushi and #umami: bit.ly/955Ffo",
    "user": { "id": 28492838, "screen_name": "binkert" },
    "tags": [ "sushi", "umami" ], "retweet freq": { "2012-
    12-04": 20, "2012-12-05": 1 } }
```

If and when it is built, the MI will have the following entries:

```
(root.retweet_freq<map>, 1, 1, "2012-12-01") --> 10
(root.retweet_freq<map>, 1, 1, "2012-12-02") --> 13
(root.retweet_freq<map>, 1, 1, "2012-12-03") --> 1
(root.retweet_freq<map>, 2, 2, "2012-12-04") --> 20
(root.retweet_freq<map>, 2, 2, "2012-12-05") --> 1
```

Similarly the VI will have the following entries (if all paths are indexed and maps are treated like maps):

```
(root.retweet_freg<map>, 1)       --> 2, 2, "2012-12-05"
(root.retweet_freg<map>, 1)       --> 1, 1, "2012-12-03"
(root.retweet_freg<map>, 10)      --> 1, 1, "2012-12-01"
(root.retweet_freg<map>, 13)      --> 1, 1, "2012-12-02"
(root.retweet_freg<map>, 20)      --> 2, 2, "2012-12-04"
(root.tags<arr>, "cupcakes")      --> 1, 1, 1
(root.tags<arr>, "muffins")       --> 1, 1, 0
(root.tags<arr>, "sushi")         --> 2, 2, 0
(root.tags<arr>, "umami")         --> 2, 2, 1
(root.text<str>, "Love #muffins and #cupcakes")   --> 1
(root.text<str>, "Love #sushi and #umami")        --> 2
(root.user.id, 29471497)          --> 1
(root.user.id, 28492838)          --> 2
(root.user.screen_name, "mashah08")   --> 1
(root.user.screen_name, "binkert")    --> 2
```

Although the actions above are described in phases, they can be pipelined to allow the ingest to be performed in a single pass, loading the BI, AI, and RI, and computing the JSON schema. The other indexes can be built asynchronously and can be enabled and disabled as desired.

System Architecture

The analysis platform is architected to be service-oriented. In various implementations, there are five main services: a proxy, a metadata service, a query executor, a storage service, and an ingestion service.

This decoupled approach may have several advantages. Since these services communicate only through external APIs (remote procedure calls), the services can be multiplexed and each shared independently. For example, multiple proxies may be used per executor and multiple executors per storage service. The metadata service can also be shared across multiple instances of executor and storage services.

The executor, storage, and ingestion services are parallelized, and can run the individual pieces in virtualized machine instances in either private or public infrastructures. This allows suspending and scaling these services independently. This is useful for reducing costs by adjusting service capacity based on fluctuations in demand. For example, the elasticity of a public cloud can be used to highly parallelize the ingestion service for fast overnight loading, while keeping the execution and storage service reduced in size for daily query workloads.

The proxy is the gateway to clients and supports one or more standard protocols, such as ODBC (Open Database Connectivity), libpq, JDBC (Java Database Connectivity), SSL (secure sockets layer), etc. The gateway serves as a firewall, authentication service, and a locus of control for the internal services. For example, client connections (such as network sockets) can be kept open at the proxy while the supporting execution and storage services are suspended to save costs. When the client connection becomes active again, the needed services can be woken on-demand with a relatively short start-up latency.

The metadata service is typically shared by many instances of the other services. It stores metadata including schemas, source information, partitioning information, client usernames, keys, statistics (histograms, value distributions, etc.), and information about the current state of each service (number of instances, IP addresses, etc.).

The storage service manages indexes and serves read and write requests. In addition, the query executor can push down a number of functions into the storage service. In various implementations, the storage service can evaluate predicates and UDFs (user defined functions) to filter results, evaluate local joins (e.g., to reconstruct objects), evaluate pushed-down joins (e.g., broadcast joins), and evaluate local aggregations.

The storage service can be parallelized through a technique called partitioned parallelism. In this approach, numerous instances or partitions of the storage service are created and the ingested objects are divided among the partitions. Each partition stores each type of index, just as if it were a single whole instance. However, each partition only indexes a subset of the ingested data.

The analysis engine supports one or more partitioning strategies. A simple but effective strategy is to partition the objects by tid and store their respective entries in the local indexes. In this way, ingested objects are not split across different instances, which may consume significant network bandwidth when a query relies on multiple portions of an object. The tid can be assigned in a number of ways, including hash assignment, round robin, or range-based assignment. These particular assignments distribute the most recent data across all the instances, thereby spreading the load.

Another strategy is to partition by another field value (or combination of field values), such as a user id or session id. Alternate partitioning fields (columns) make it convenient to perform local joins with other tables or collections, e.g., user profiles. The partitioning strategy may be hash partitioning or use sampling and range partitioning. The former is used for efficient point lookups and the latter for supporting efficient range searches.

Regardless of the partitioning strategy, an object or any subset of the object should be able to be reconstructed locally. Therefore, the storage service partitions have no cross talk during query processing and only need to communicate with the execution service via their API.

The storage service has a cache. We can increase the cache size in each partition or increase the number of partitions to improve the performance of the storage service. The storage service can cache the indexes in memory or on local disk, and the indexes can live on external storage like Amazon S3. This feature allows for shutting down and destroying the storage service nodes and redeploying them whenever necessary. Moreover, it allows extreme elasticity: the ability to hibernate the storage service to S3 at low cost and change storage service capacity as demand fluctuates.

The query execution service executes the query plan generated by the query planning phase. It implements query operators, e.g., join, union, sort, aggregation, and so on. Many of these operations can be pushed down to the storage service, and are when possible. These include predicates, projection, columnar joins to reconstruct the projected attributes, and partial aggregations for distributive and algebraic aggregation functions with group by statements.

The query execution service takes in data from the storage service and computes the non-local operations: non-local joins, group by statements that need repartitioning, sorts, and so on. The executor is similar to a partitioned parallel executor. It uses exchange operators to repartition between query execution steps and employs local storage for spilling intermediate results. For many queries, it is possible to run most of the query in the storage service and require only a single executor node to collect the results and perform any small non-local operations.

Ingestion Service

The ingestion service is responsible for loading semi-structured data into the storage service where it can be queried. Users provide data in a variety of formats (e.g., JSON, BSON, CSV) from a variety of platforms (e.g., MongoDB, Amazon S3, HDFS), optionally compressed with a compression mechanism (e.g., GZIP, BZIP2, Snappy). The basic procedure holds true regardless of the format used.

The ingestion task can be roughly divided into two parts: the initial ingestion task that loads a large volume of new user data, and incremental ingestion, which occurs periodically when new data is available.

Initial Ingestion

The initial ingestion process can be broken into several steps. First, partition input data into chunks. Users provide initial data in a collection of files or by providing direct connections to their data sources. The location and format of these files is recorded in the metadata service. Users may provide data that is already partitioned, for instance due to log file rotation, but if not, the files can be partitioned into chunks to support parallel loading. These chunks are typically on the order of several hundred megabytes and are processed independently.

The exact mechanism for partitioning the input files depends on the data format. For uncompressed formats in which records are separated by newlines, (e.g., JSON or CSV), a single file can be processed in parallel using a number of processes equal to the target number of chunks. Processing starts at the appropriate offset in the file (file_size/total_num_chunks)*chunk_num, and then searching until a newline is found. For compressed data or data in a binary format like BSON, each input file may need to be scanned sequentially. The location of each chunk (file, offset, size) is stored in the metadata service.

Once the data is divided into chunks, the actual schema inference and ingestion is performed. As part of this process, two services are launched: the ingestion service and the storage service. These two services can employ multiple servers to do the work. The two services can also be co-located on any given machine. The ingestion service is transient and used only during the ingestion process, while the storage service holds the actual data and must be persistent. The servers involved in ingestion send data to the storage service servers and the number of ingestion servers is independent of the number of storage servers where the number is chosen to minimize imbalance between the throughput of each service. The chunks are partitioned between the ingestion servers. Each ingestion server is responsible for the following steps for each chunk assigned to it: (i) parsing and type inference, (ii) communication with storage service, and (iii) computing local schema and statistics.

First, the data record is parsed into an internal tree representation. A consistent internal representation may be used for all the source formats (JSON, BSON, etc.). Depending on the input format, type inferencing may also be performed. For instance, JSON does not have a representation of a date, so it is common to store dates as strings. Since dates are very common, they are on example of a type detected during ingestion so that users can issue queries making use of dates. For CSV input files, since the columns are not typed, basic types such as integers must be detected as well.

Once the record has been parsed and types inferred, a compressed representation of the parse tree is sent to the storage service. This takes the form of a preorder traversal of the tree. The storage service is responsible for determining the values to store in each of the indexes (BI, AI, etc), and for generating tuple ids and join keys. Key generation is deferred to the storage service so that keys can be generated sequentially, which improves ingestion performance to the underlying index store.

As records are ingested, a local JSON schema is updated using the rules described above. The schema will reflect the records seen by a single ingestion machine, and different machines may have different schemas.

In addition to computing the schema, statistics are maintained, which are useful for query processing as well as identifying maps. These include metrics like the number of times each attribute appears as well as its average size in bytes. For example, the following records

```
{ id: 3546732984 }
{ id: "3487234234" }
{ id: 73242342343 }
{ id: 458527434332 }
{ id: "2342342343" }
``` would produce the schema {id: int, id: string}, and id: int could be annotated with a count of 3 and id: string with a count of 2. Each ingestion machine stores the schema and statistics it computed in the metadata service.

Once all of the chunks have been ingested, the overall schema is computed, which will be used by the query engine and presented to the user. This can be accomplished using a single process that reads the partial schemas from the metadata service, merges them using the method described above, and stores the result back in the metadata service. Since the number of schemas is limited to the number of ingestion machines, this process is not performance-critical.

Determining maps is optional. As described previously, heuristics can be used along with the statistics stored in the metadata service to determine which attributes should be stored as maps in the MI. Recall that this is not necessary for query processing, but it makes some queries more natural to express and improves efficiency. Once maps have been identified, each storage server receives a message identifying which attributes should be maps. The storage server then scans these columns and inserts them into the MI.

Incremental Updates

Some users may load the bulk of their data up front, but most will periodically load new data over time, often as part of a regular (e.g., hourly or daily) process. Ingesting this data is largely similar to the initial ingestion. The new data is split into chunks, the schema is computed per chunk, and the local schemas are merged with the global schema maintained in the metadata service.

The system automatically detects new data as it is added. The method depends on the source data platform. For example, for S3 files, the simplest case is to detect changes in an S3 bucket. A special process periodically scans the bucket for new key-value pairs (i.e., new files), and adds any that are found to the metadata service. After a certain number of new files have been found or a certain time period has elapsed, the process launches a new ingestion process to load the data.

Operations performed in MongoDB can be stored in a special collection called the operation log (or oplog). The oplog provides a consistent record of write operations that is used by MongoDB internally for replication. The oplog is read and used to create a set of flat files in S3 storing the new records. The above method can then be used to ingest the new data.

The incremental ingestion process can handle both new data (e.g. new JSON documents) and updates to existing documents (e.g. new attributes in existing JSON documents or new values for existing attributes). Each data source platform has different capabilities in terms of exposing updates in the source files. We refer to this type of information as 'deltas' and it can take the form of flat files or log files (e.g. MongoDB). The incremental ingestion process processes the information from the 'delta' files and combines that with the existing schema information to generate new data that are sent to the storage service.

Subsetting Data

While the system described here for ingesting data and doing incremental updates can ingest all data from the source, it is relatively simple to ingest only a subset, by specifying up-front the JSON schema (or the relational schema) of the data that we would like ingested. This is done by either providing the JSON schema itself, or by providing queries that specify the subset. In this manner, the analysis platform can be thought of as a materialized view of the source data.

It is also possible to specify data that the user does not want ingested. A JSON schema or a relational schema can be provided, describing the portion of the data that should not be ingested. Then it is simply a matter of recording that information in the metadata service which tells the ingestion process to simply skip those elements of all future rows. If this is done after data has already been ingested, the already ingested data simply becomes unavailable and can be garbage collected by a background task. This garbage collection would be incorporated into the compaction process of the index store (e.g., LevelDB).

Fault Tolerance

While it is possible to restart the loading process during the initial ingest, the incremental ingestion process should not corrupt the existing data in the system, to prevent users from having to reload all data from scratch. Since ingesting a file is not an idempotent operation, due to id generation, a simple fault-tolerance scheme can be implemented based on taking snapshots of the underlying storage system.

Taking snapshots may be straightforward when the underlying storage system supports taking consistent snapshots at a point in time, as LevelDB does. With this primitive, the steps for incremental loading are as follows. A single process directs each storage server to take a snapshot locally and directs all queries to this snapshot for the duration of the load. Each chunk is loaded as described above. When complete, the ingestion server responsible for loading a chunk marks it as finished in the metadata service.

A process monitors the metadata service. When all chunks have been loaded, it atomically redirects queries to the updated version of the state. The snapshot taken in the first step can then be discarded. In the event of a failure, the snapshot becomes the canonical version of the state and the partially updated (and potentially corrupted) original version of the state is discarded. The ingestion process is then restarted. Additionally, snapshots of the storage system disk volume can be used for recovery in the event of a server failure.

Query Execution

Example Query

To show example execution, consider the simple query:
select count(*) from table as t where t.a>10;
First, the proxy receives the query and issues it to an executor node for planning. Next, an executor node creates a query plan calling the metadata service to determine which collections and storage nodes are available for use. The executor node typically distributes the plan to other executor nodes, but here, we only need a single executor node.

Execution node then makes RPC calls to storage service nodes, pushing down t.a>10 predicate and count function. Next, storage nodes compute sub-counts and return them to executor node. Executor node then returns result to the proxy when proxy fetches the next result value.

Dynamic Typing

The storage engines of database systems (e.g., PostgreSQL) are strongly typed, which means that all the values of a column (or attribute) must have the exact same type (e.g., integer, string, timestamp, etc.). In the context of big-data analytics this is a significant limitation because quite often applications need to change the representation of a particular piece of information (attribute) and, consequently, the data type that they use to store it. For instance, an application may initially store the values of a particular attribute using integers and then switch to using floats. Database systems are not designed to support such operations.

One way to handle this problem is to use multiple relational columns for each attribute—one for each different data type. For example, if we have seen the attribute "user.id" with values 31432 and "31433" (i.e., an integer and a string), we can store "user.id<int>" and "user.id<string>" as separate columns. A single record will have a value for only one of these columns corresponding to the type of "user.id" in that record. The values for the other columns for that record will be NULL.

Presenting multiple columns for the same attribute is often too complicated for users to use. To simplify the user experience, the analysis platform can dynamically, at query time, infer the type the user intends to use. To this end, the storage service keeps track of multiple types. For example, the storage service uses a generic data type for numbers, called NUMBER, which covers both integers and floats. When the NUMBER type is used, the more specific data type is stored as part of the value. For example, the integer value 10 of attribute "Customer.metric" is stored in the BI as a key-value pair where (Customer.metric, <NUMBER>, tid) is the key and (10, INTEGER) is the value. The floating point value 10.5 of the same attribute would be stored as key: (Customer.metric, <NUMBER>, TID), value: (10.5, FLOAT).

Finally, at query time, the analysis platform can perform dynamic casting between data types according to the properties of the query (predicates, casting operations, etc.) as long as these operations do not result in information loss. Although "number" is not an ANSI SQL type, the flexible typing system allows clients to treat it as a standard ANSI SQL float, integer, or numeric type from query context. For example, consider the query:
select user.lang from tweets where user.id='31432'
In the case where we have both "user.id<int>" and "user.id<string>", the system optionally converts integers (e.g. 31432) to a single string representation (e.g. "31432") at query time, thereby allowing the user to work with a single column "user.id" with the ANSI SQL type VARCHAR.

Although ANSI (American National Standards Institute)/ISO (International Organization for Standardization) SQL:2003 is mentioned as an example, in other implementations compliance with other standards, SQL or otherwise, can be accomplished. For example only, the exposed interface could be compliant with ANSI/ISO SQL:2011.

Figures

In FIG. 1A, an example cloud-based implementation of the analysis platform is shown. A local area network (LAN) or a wide area network (WAN) 100 of an organization using the analysis framework connects to the internet 104. Compute needs and storage needs in this implementation are both provided by cloud-based services. In the particular implementation shown, compute servers are separate from storage servers. Specifically, a compute cloud 108 includes a plurality of servers 112 that provide processing power for the analysis framework. The servers 112 may be discrete hardware instances or may be virtualized servers.

The servers 112 may also have their own storage on which the processing capability operates. For example, the servers 112 may implement both the query executor and the storage service. While traditional columnar storage systems store data as columns on disk, when that data is read into memory, rows are reassembled from the columnar data. The indexes of present disclosure, however, operate as columnar storage both on disk and in memory. Because of the unique configuration of the indexes, benefits of fast columnar access can be achieved with relatively little penalty.

A storage cloud 116 includes storage arrays 120 used for index data because according to the present disclosure data is stored in indexes and not in materialized tables. When storage resources of the servers 112 are used the storage arrays 120 may be used for backup and nearline storage, not for responding to each query.

In various implementations, storage arrays 124 may include data on which the analysis framework will operate. For example only, the storage arrays 124 may hold relevant data, such as log data, which users may want to query using the analysis framework. Although storage arrays 120 and storage arrays 124 are shown in the same storage cloud 116, they may be located in different clouds, including private externally hosted clouds, public clouds, and organization-specific internally-hosted virtualized environments.

For example only, the storage cloud 116 may be an Amazon Web Services (AWS) S3 cloud, which the business was already using to store data in the storage arrays 124. As a result, transferring data into the storage arrays 120 may be achieved with high throughput and low cost. The compute cloud 108 may be provided by AWS EC2 in which case the compute cloud 108 and the storage cloud 116 are hosted by a common provider. A user 130 constructs a query using standard SQL tools, that query is run in the compute cloud 108, and a response is returned to the user 130. The SQL tools may be tools already installed on a computer 134 of the user 130, and do not have to be modified in order to work with the present analysis framework.

Figure 1B:
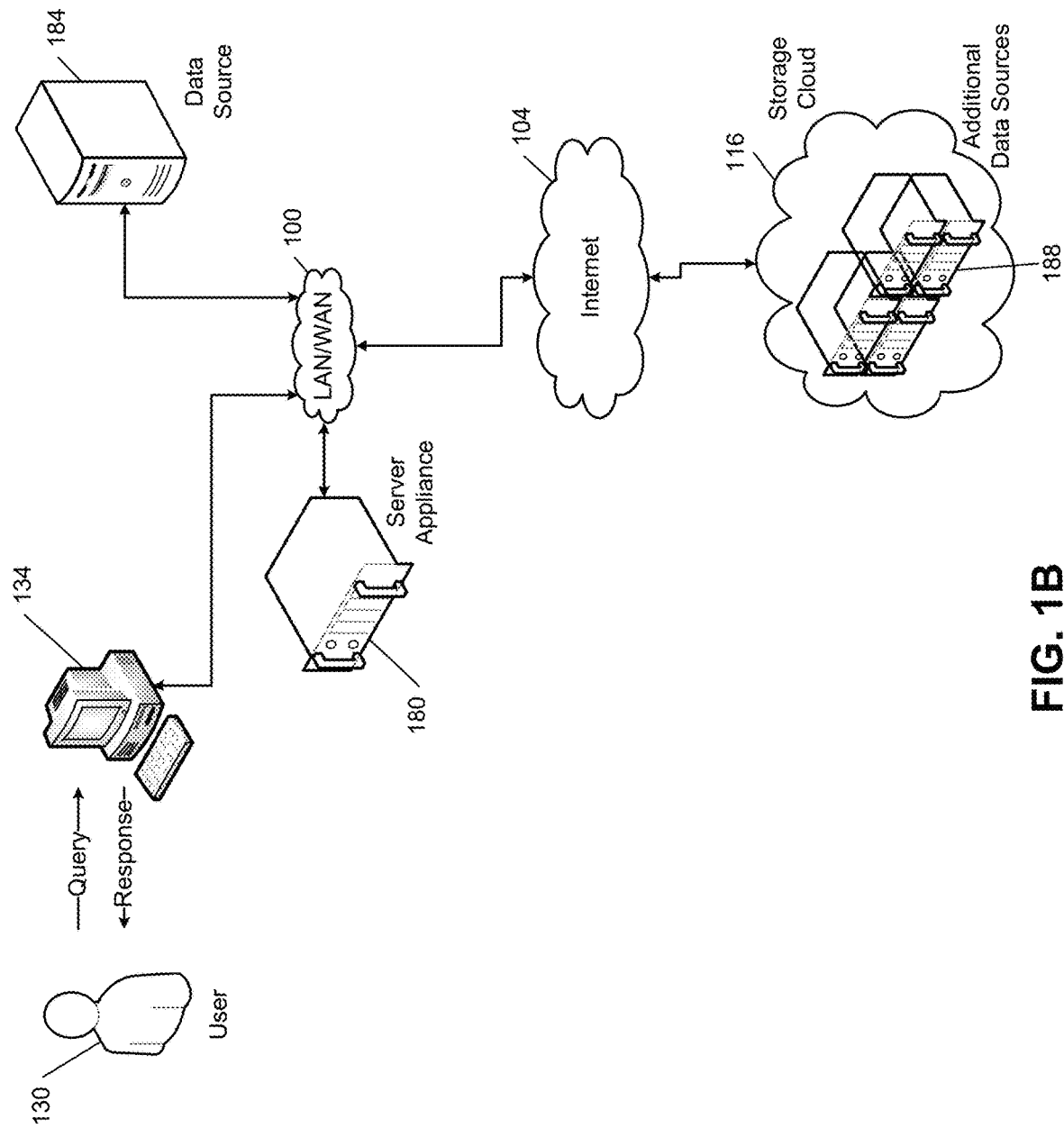
FIG. 1B depicts an example network architecture for a scalable analysis platform for semi-structured data with a server appliance at the user end.

In FIG. 1B, another example deployment approach is shown. In this case, a physical server appliance 180 is connected to the LAN/WAN 100 of the business. The server appliance 180 may be hosted onsite or may be hosted offsite and connected, such as with a virtual private network, to the LAN/WAN 100. The server appliance 180 includes compute capability as well as storage and receives input data from sources, which may be local to the LAN/WAN 100. For example only, a computer or server 184 may store logs, such as web traffic logs or intrusion detection logs.

The server appliance 180 retrieves and stores index data for responding to queries of the user 130. The storage cloud 116 may include additional data sources 188, which may hold yet other data and/or may be a nearline data storage facility for older data. The server appliance 180 may, in order to satisfy user queries, retrieve additional data from the additional data sources 188. The server appliance 180 may also store data, such as for backup purposes, in the storage cloud 116. In various other implementations, the additional data sources 188 may be part of a Hadoop implementation in the cloud.

The analytical framework of the present disclosure is flexible such that many other deployment scenarios are possible. For example only, software may be provided to a business, and that software could be installed on owned or hosted servers. In another implementation, virtual machine instances may be provided, which can be instantiated through virtualization environments. Still further, the user could be provided with a user interface in a browser and the SQL portion could be hosted by a service provider, such as Nou Data, and implemented on their systems or in the cloud.

Data Warehouse

Figure 1C:
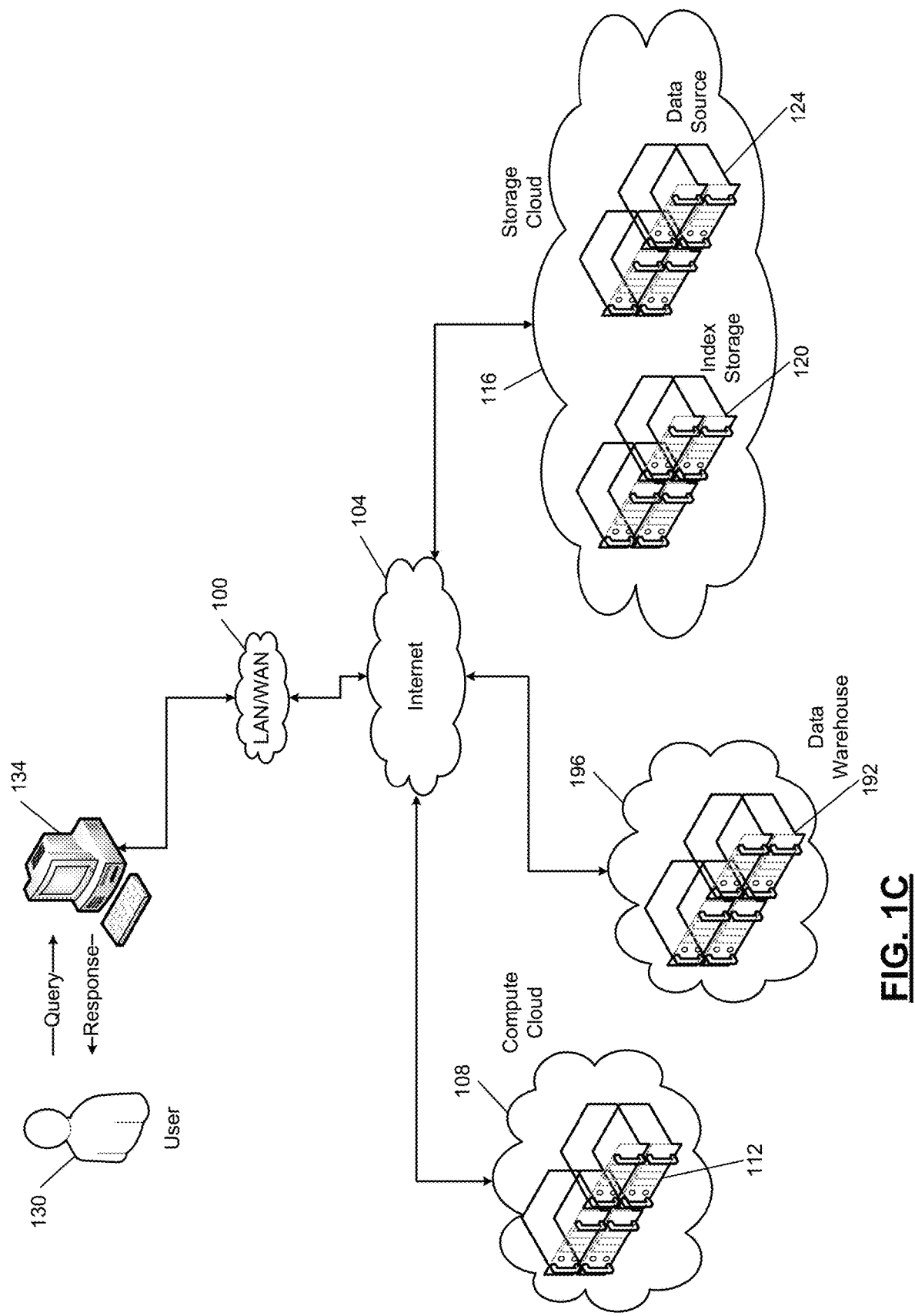
FIG. 1C depicts an example network architecture for a scalable analysis platform using a data warehouse.

In FIG. 1C, an example deployment approach according to the principles of the present disclosure is shown. Ingested data can be stored into a data warehouse 192 in addition to or instead of in the index storage 120. In various implementations, the data warehouse 192 may be located at a customer site or, as shown in FIG. 1C, located in a cloud 196.

Using the data warehouse 192 may provide a variety of benefits. For example only, the data warehouse 192 will generally have a mature and full-featured query processing layer and ODBC interface. Further, the data warehouse 192 may be a central repository for other data than would be ingested by a system according to the present disclosure. In addition, the data warehouse 192 may implement snapshotting and revision control of data, and may also be part of an established backup strategy.

In various implementations, the data warehouse 192 may simply be a relational database, such as one that supports a subset or the full set of SQL commands, including PostgreSQL, MySQL, Microsoft SQL Server, Oracle, etc. Because the schema of the ingested data may change over time, implementing the data warehouse 192 using columnar storage may allow for additional columns (such as a new attribute or a new type of an existing attribute) can be added efficiently.

In traditional database systems, which are row-oriented, adding columns may be time- and/or space-inefficient. Various implementations of the data warehouse 192 may have columnar features, including products from Vertica, Greenplum, Aster/Teradata, and Amazon (RedShift). Some implementations of the data warehouse 192, such as Vertica and Amazon RedShift, support parallel loading so that properly-formatted data can be ingested from several sources simultaneously. By packaging data into multiple intermediate files, the time required to load data into the data warehouse 192 may be significantly reduced.

Implementing the data warehouse 192 in the cloud 196 may offer various advantages, such as reducing up-front costs associated with purchasing hardware and software for the data warehouse 192. In addition, the cloud 196 serving the data warehouse 192 may be able to ingest data from the index storage 120 or the data source 124 with a greater throughput that might be available via public portions of the Internet 104. In various implementations, such as when the data warehouse 192 is Amazon RedShift and the index storage 120 is stored in Amazon S3, data may be transferred between the index storage 120 and the data warehouse 192 without leaving Amazon's network. This may allow for reduced latency and increased throughput.

Figure 1D:
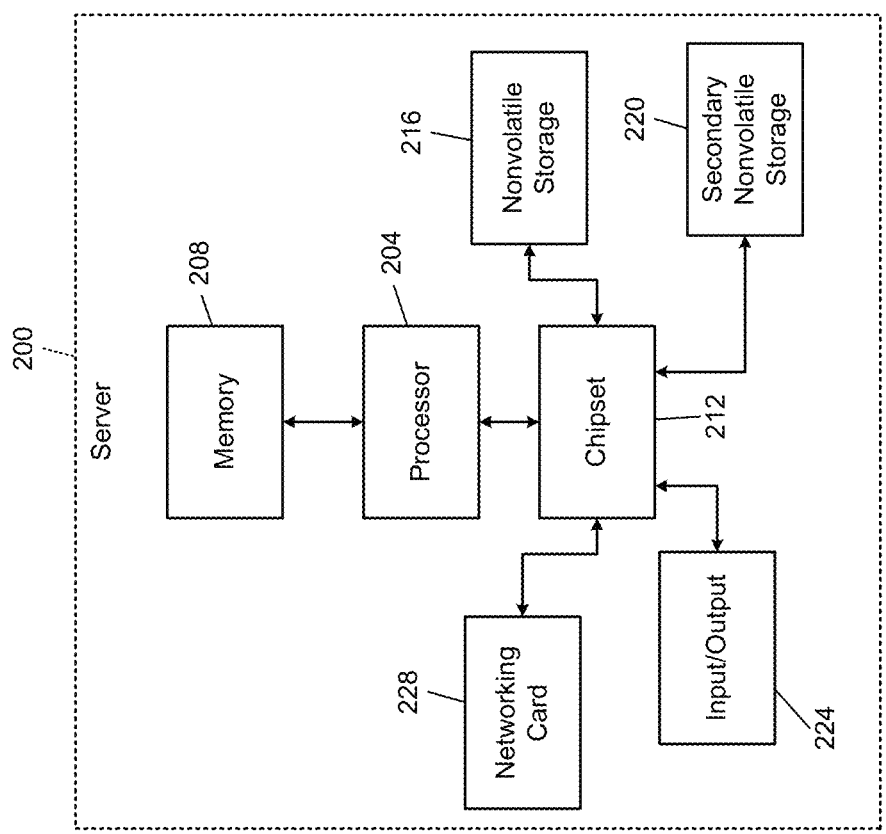
FIG. 1D is a functional block diagram of a server system.

In FIG. 1D, hardware components of a server 200 are shown. A processor 204 executes instructions from a memory 208 and may operate on (read and write) data stored in the memory 208. Generally, for speed, the memory 208 is volatile memory. The processor 204 communicates, potentially via a chipset 212, with nonvolatile storage 216. In various implementations, nonvolatile storage 216 may include flash memory acting as a cache. Larger-capacity and lower-cost storage may be used for secondary nonvolatile storage 220. For example, magnetic storage media, such as hard drives, may be used to store underlying data in the secondary nonvolatile storage 220, the active portions of which are cached in nonvolatile storage 216.

Input/output functionality 224 may include inputs such as keyboard and mouse, and outputs such as a graphic display and audio output. The server 200 communicates with other computing devices using a networking card 228. In various implementations or at various times, the input/output functionality 224 may be dormant, with all interaction between the server 200 and external actors being via the networking card 228. For ease of illustration, additional well-known features and variations are not shown, such as, for example only, direct memory access (DMA) functionality between nonvolatile storage 216 and memory 208 or between the networking card 228 and the memory 208.

Data Flow

Figure 2A:
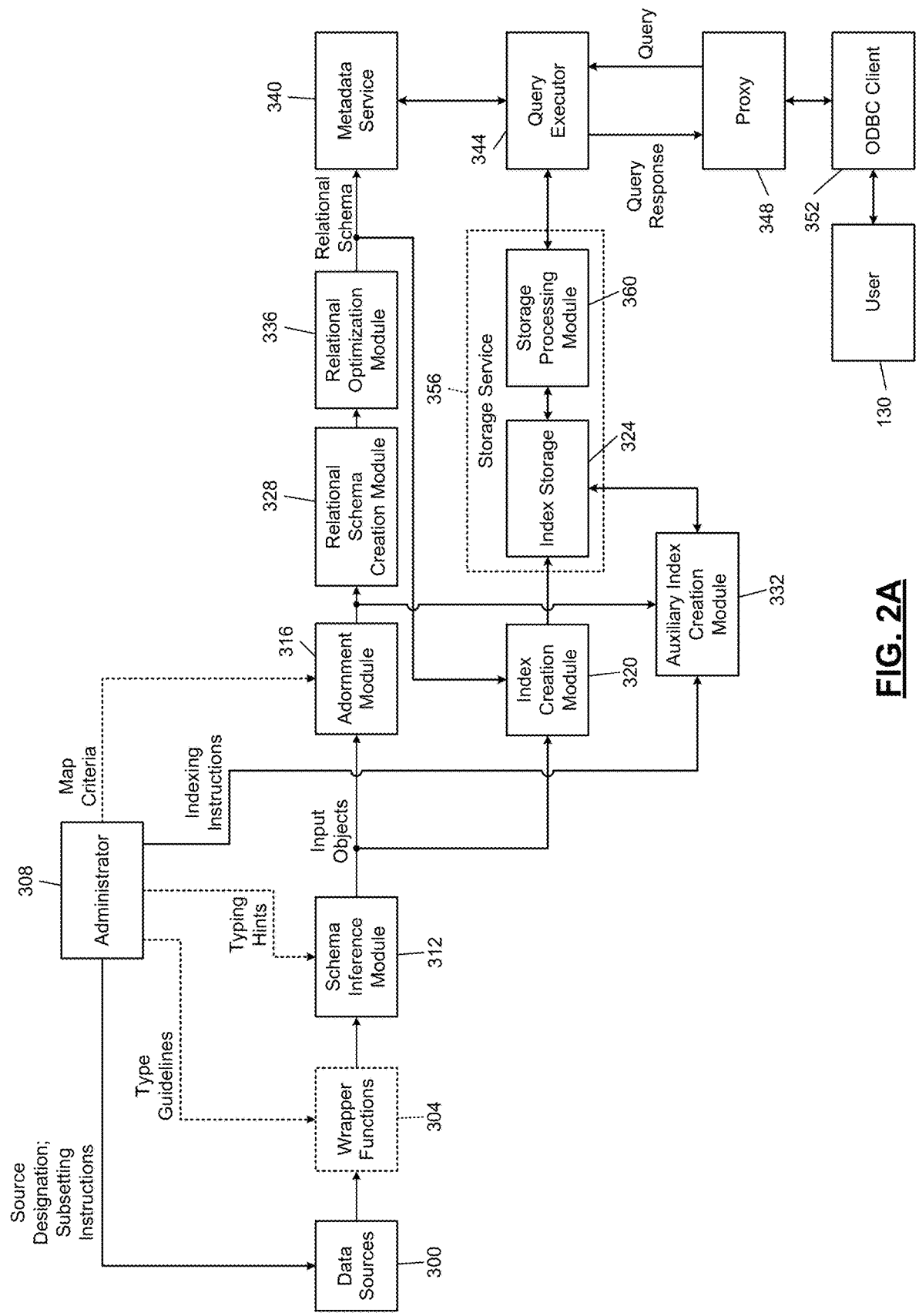
FIG. 2A is a functional block diagram of an example scalable analysis platform for semi-structured data.

In FIG. 2A, a process diagram shows one example of how data is ingested into the analytical framework so that it can be queried by the user 130. Data sources 300 provide data on which the analysis framework operates. If that raw data is not self-describing, optional user-defined wrapper functions 304 may convert the raw data into self-describing semi-structured data, such as JSON objects.

An administrator 308, which may be the user 130 operating in a different capacity, is able to designate guidelines for implementing these wrapper functions. The administrator 308 can also designate which of the data sources 300 to use and what data to retrieve from those data sources. In various implementations, retrieving the data may include subsetting operations and/or other computations. For example only, when one of the data sources 300 is Hadoop, a MapReduce job may be requested prior to retrieving the data for the analysis framework.

The retrieved data is processed by a schema inference module 312, which dynamically constructs the schema based on the observed structure of received data. The administrator 308 may have the ability, in various implementations, to provide typing hints to the schema inference module 312. For example, the typing hints may include requests to recognize particular formats, such as dates, times, or other administrator-defined types, which may be specified by, for example, regular expressions.

The data objects and the schema generated by the schema inference module 312 are provided to an adornment module 316 as well as an index creation module 320. Input objects include source data as well as metadata that describes the source data. The source data is stored in index storage 324 by the index creation module 320.

The adornment module 316 identifies maps in the schema generated by the schema module 312. In implementations where map identification is not desired, the adornment module 316 may be omitted. The administrator 308 may be able to specify map criteria to adjust the heuristics performed by the adornment module 316 used in identifying maps.

After maps have been identified, a relational schema creation module 328 generates a relational schema, such as an SQL-compliant schema. In addition, the identified maps are provided to an auxiliary index creation module 332, which is capable of creating additional indexes, such as the MapIndex, and map entries in the ValueIndex, as described above. The auxiliary indexes may also be stored in the index storage 324.

The administrator 308 may have the capability of requesting that the map index be created and may specify which column to add to the value index. In addition, the administrator may be able to specify which objects should be treated as maps, and can dynamically change whether an object is treated as a map or not. Such a change will result in changes to the relational schema.

A relational optimization module 336 optimizes the relational schema to present a more concise schema to the user 130. For example, the relational optimization module 336 may identify one-to-one relationships between tables and flatten those tables into a single table, as described above. The resulting relational schema is provided to a metadata service 340.

A query executor 344 interfaces with the metadata service 340 to execute queries from a proxy 348. The proxy 348 interacts with an SQL-compliant client, such as an ODBC client 352, which is, without special configuration, able to interact with the proxy 348. The user 130 uses the ODBC client 352 to send queries to the query executor 344 and to receive responses to those queries.

Via the ODBC client 352, the user 130 can also see the relational schema stored by the metadata service 340 and construct queries over the relational schema. Neither the user 130 or the administrator 308 are required to know the expected schema or help create the schema. Instead, the schema is created dynamically based on the retrieved data and then presented. Although the ODBC client 352 is shown, mechanisms other than ODBC are available including JDBC, and direct postgres queries. In various implementations, a graphical user interface application may facilitate ease of use of the ODBC client 352 by the user.

The query executor 344 operates on data from a storage service 356, which includes the index storage 324. The storage service 356 may include its own local storage processing module 360, to which the query executor 344 can delegate various processing tasks. The processed data is then provided by the storage processing module 360 to the query executor 344 to construct a response to a received query. In a cloud-based implementation, the storage service 356 and the query executor 344 may both be implemented in a compute cloud, and the index storage 324 can be stored in the compute instances. The index storage 324 may be mirrored to nearline storage, such as in the storage cloud 116 as shown in FIG. 1A.

Figure 2B:
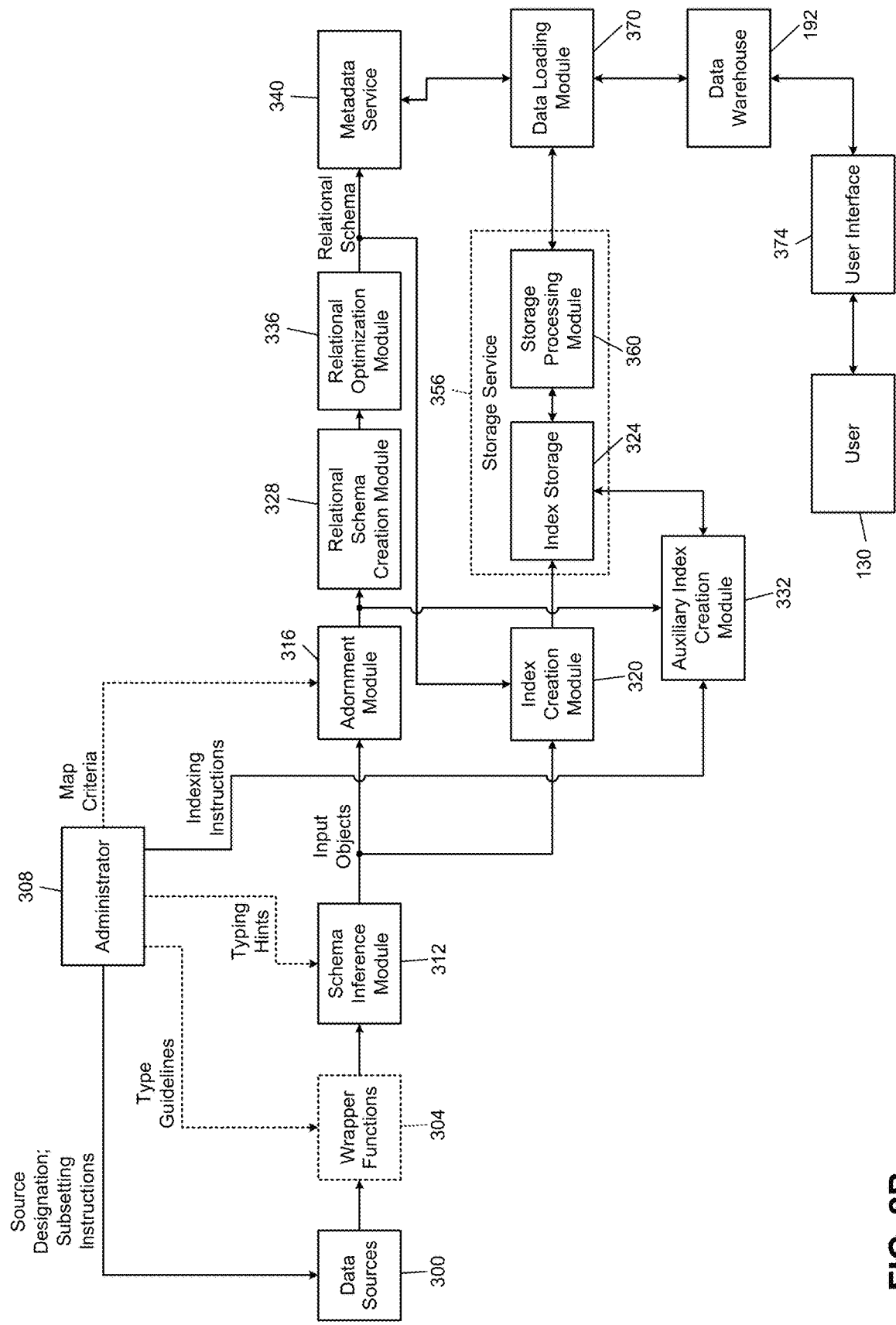
FIG. 2B is a functional block diagram of an example scalable analysis platform implementing a data warehouse.

In FIG. 2B, a data loading module 370 generates data files in a format understood by the data warehouse 192. For example, the data warehouse 192 may support an SQL Copy From command for loading large amounts of data. Data files operated on by this command may have a predefined type, which may be a variant of CSV (comma-separated variable). For each relation in the relational schema, an intermediate file is created for loading into the data warehouse 192. When the data warehouse 192 supports parallel loading, some or all of the larger files may be split into multiple files for parallel loading. Data for these intermediate files may be retrieved from the index storage 124 and/or be retrieved from a second pass over the data sources 300. A user interface 374 provides access to the data warehouse 192 to the user 130. For example only, the user interface 374 may be provided as part of the data warehouse 192. In other implementations, the user interface 374 may pass commands to the data warehouse 192 and/or may create SQL commands for execution by the data warehouse 192.

Figure 2C:
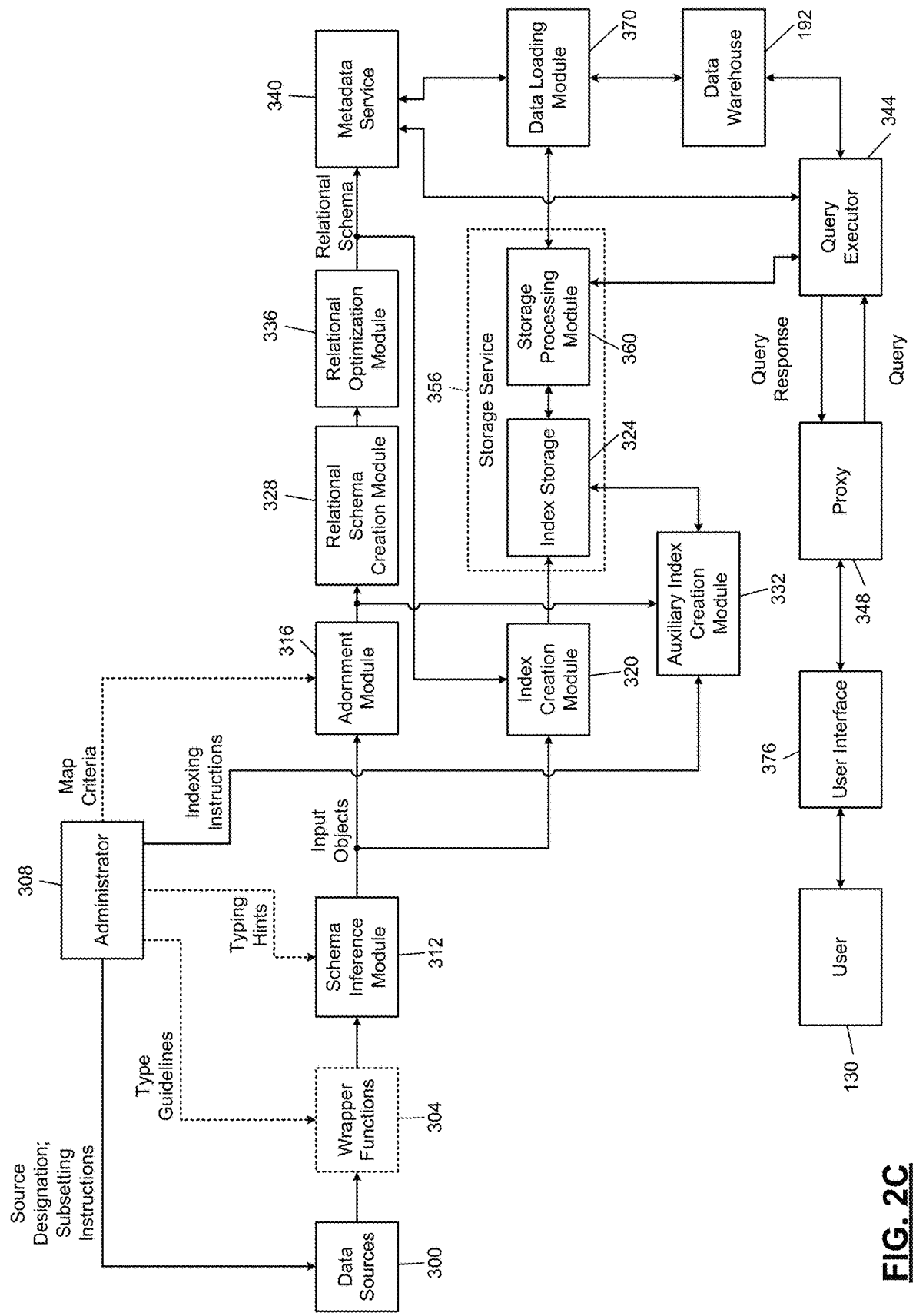
FIG. 2C is a functional block diagram of an example scalable analysis platform implementing a data warehouse and a hybrid query executor.

In FIG. 2C, a user interface 376 communicates with a query executor 344 via the proxy 348. The query executor 344 may pass off certain queries to the data warehouse 192. For various queries, the query executor 344 may perform part of the query based on data from the storage processing module 360 and the metadata service 340 and pass other portions of the query to the data warehouse 192. The query executor 344 may combine results and pass the combined output to the proxy 348. In various implementations, the user interface 376 may make transparent to the user 130 whether certain relations or data are stored in the data warehouse 192 versus the index storage 324. This feature may be relevant to customers who already have some data stored in the data warehouse 192 and are loading new data into the index storage 324 or vice versa.

Figure 2D:
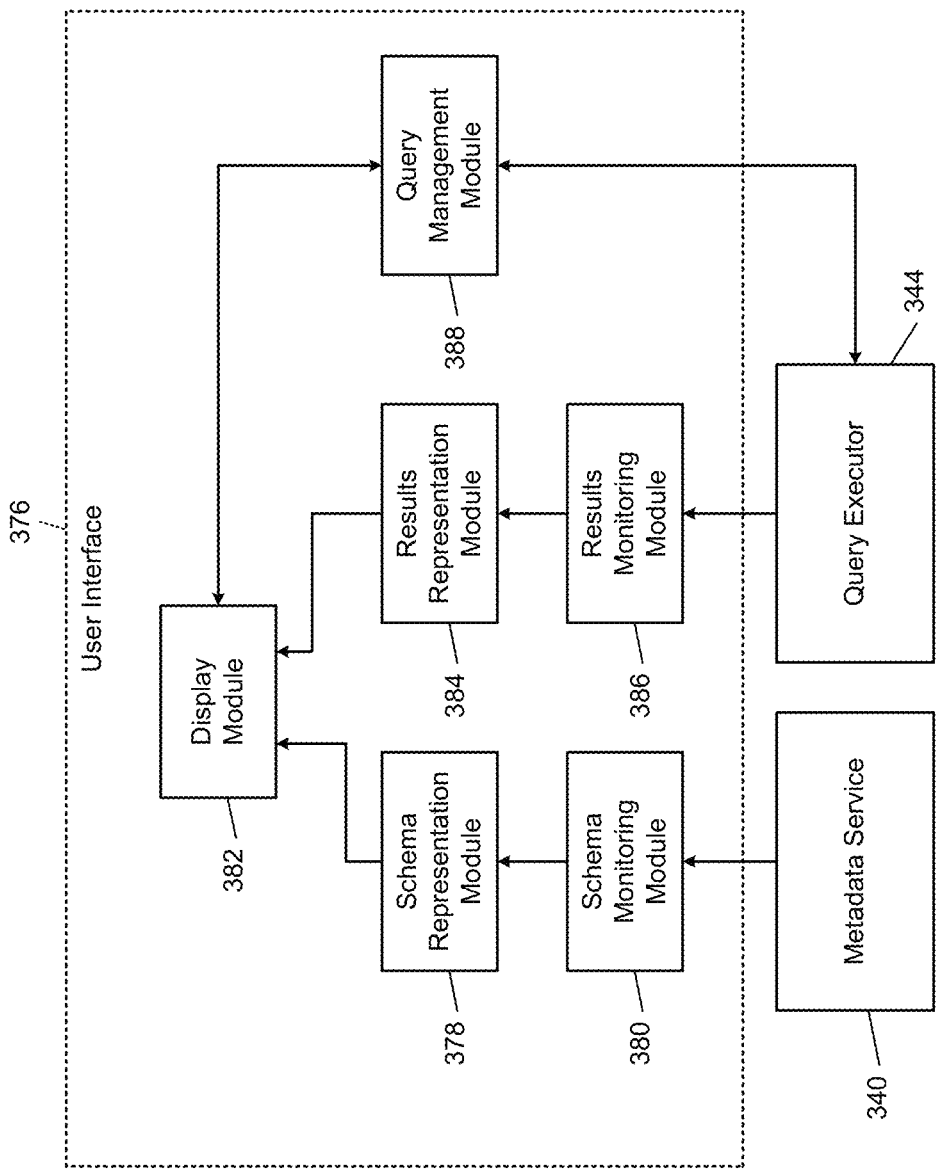
FIG. 2D is a functional block diagram of an example user interface implementation.

In FIG. 2D, a high level functional block diagram of an example implementation of the user interface 376 is shown. A schema representation module 378 receives schema data from a schema monitoring module 380, which receives information regarding the relational schema from the metadata service 340. A display module 382 displays the schema to the user 130 in one or a variety of formats. For example, a hierarchy of nested attributes may be indicated in a list form by level of indentation. Alternatively, a visual tree format may be used.

As the schema monitoring module 380 is informed of changes to the schema by the metadata service 340, the schema representation module 378 may update the schema by inserting new attributes, new sub-attributes, etc. For example, new nodes may be added to a tree, including new intermediate nodes and new leaf nodes. As the schema changes, leaf nodes may be converted into intermediate nodes and changes in type of an attribute may be reflected visually with a color, a label, or a secondary indication. For example only, the secondary indication may be revealed when hovering a cursor (when using, for example, a mouse or trackpad) over the attribute.

As changes are made to the schema, the display module 382 may attempt to keep a central focus of the currently displayed schema in the center of a display area. For example only, if many new attributes are added to the beginning of a listed schema, the previously listed attributes may be shifted down on the screen or even off of the screen. To counter this visually disruptive change, the display module 382 may scroll the list of attributes to maintain an approximately constant central location. Added elements to the schema may be represented visually, such as with outlining, shadowing, color, font (bolding, italicizing, or type size).

For example only, a color gradient may indicate how recently a schema element was changed. For example only, a very bright blue may indicate a schema element that was recently changed while the color blue will fade, eventually reaching white, to indicate schema elements that have been present for a longer period of time.

In various implementations, the display module 382 may track mouse movement, keyboard usage, which windows in the operating system have focus, and whether the display has been blanked to save power in order to determine when the user has been focused on the elements of the display module 382. For example, if the display module 382 determines that the user has not been interacting with the display module 382 for the last hour, the display module 382 may retain all schema elements added in the last hour in bright blue. Once the user begins interacting with the display module 382 once more, the color blue may then start to fade. In this way, changes to the metadata since the user last interacted with the display module 382 will be brought to their attention regardless of whether they have been actively monitoring the display module 382.

The user interface 376 also includes a results representation module 384, which displays results of one or more queries. The results may be displayed in a combination of textual and graphic form, including tables, charts, and graphs. The type of visual representation may be selected by the user who may be able to choose access labels, linear or logarithmic scaling, and chart type. The query executor 344 may begin providing results before the query has competed.

A results monitoring module 386 is notified by the query executor 344 when further results are available. The results representation module 384 then updates the view of the results and presents those to the display module 382. In various other implementations, the results monitoring module 386 may poll the query executor 344 to determine when additional results are available. The query executor 344 may provide these incremental results on a time schedule or based on another metric, such as number of records processed. As the results monitoring module 386 detects additional results, the results representation module 384 may need to adjust scaling of axes to accommodate the additional data, may add additional bars or slices to a bar or pie chart, and may adjust values assigned to elements of the chart.

As a simplistic example, consider a query that requests an average GPA for each grade level in a set of data. As the query executor 344 processes the data, initial results will display average GPAs of initial records. As additional records are parsed, the GPAs may be updated. In addition, grade levels that may not have yet have been observed in the query will be added to the results by the results representation module 384.

In various applications, and for various data sets, various metrics, such as average, may begin to converge while a significant number of records have yet to be parsed. This may allow for fast visualization of data trends, and may allow a user to tailor a query or reformulate a query before waiting for a query to complete. This may be particularly valuable for queries that require a long time to run, such as on the order of minutes or hours. For some queries, seeing initial results may indicate to the user that the query needs to be re-formed to return results relevant to that user.

Returning to the simplistic example, an SQL query may take the following form: "SELECT student_id, avg(gpa) FROM students GROUP BY class ORDER BY 2 DESCENDING;".

A query management module 388 provides queries entered by the user in the display module 382 to the query executor 344. The query management module 388 may store previously run queries, and allow those queries to be re-run. In addition, the query management module 388 may help the user to construct compound queries and/or combine results of previous queries.

Figure 2E:
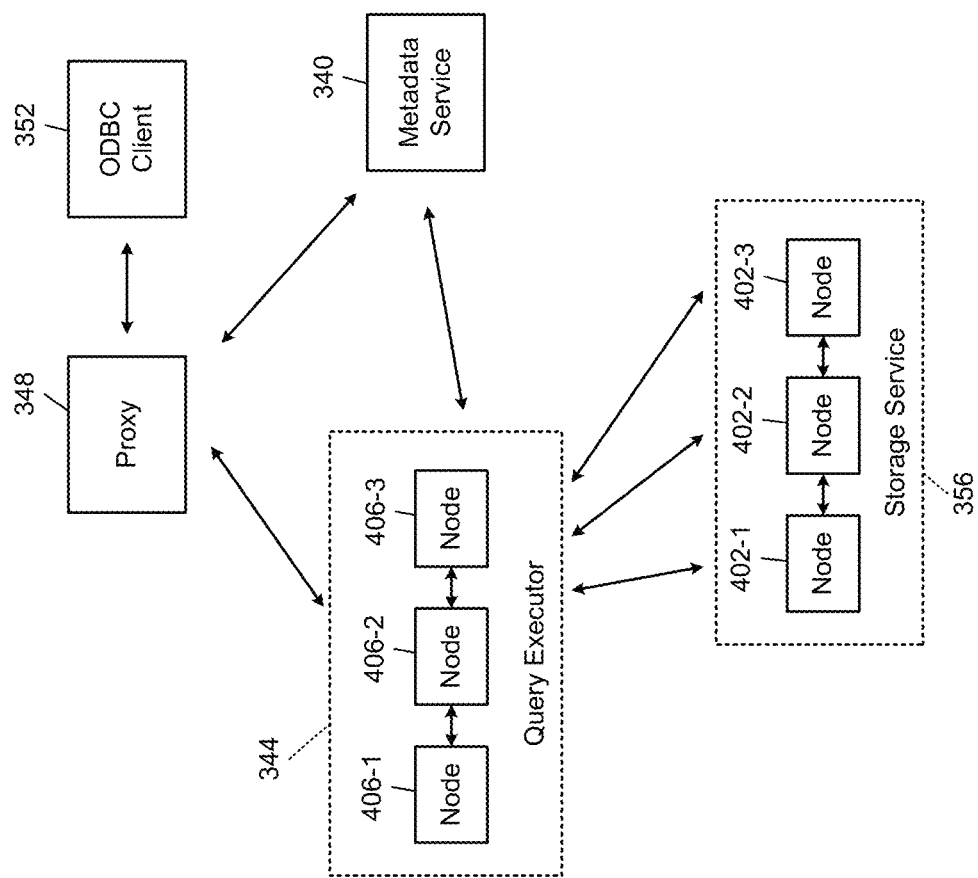
FIG. 2E is a functional block diagram of an example query system of a scalable analysis platform for semi-structured data.

In FIG. 2E, a high level functional diagram shows a storage service 356 with multiple nodes 402-1, 402-2, and 402-3 (collectively, nodes 402). Although three nodes 402 are shown, more or fewer may be used, and the number used may be varied dynamically based on the needs of the analysis framework. The number of nodes 402 may be increased as more data needs to be stored as well as in response to additional processing being required to execute queries and/or to provide redundancy. The query executor 344 is shown with nodes 406-1, 406-2, and 406-3 (collectively, nodes 406). The number of nodes 406 can also be varied dynamically based on query load, and is independent of the number of nodes 402.

Figure 2F:
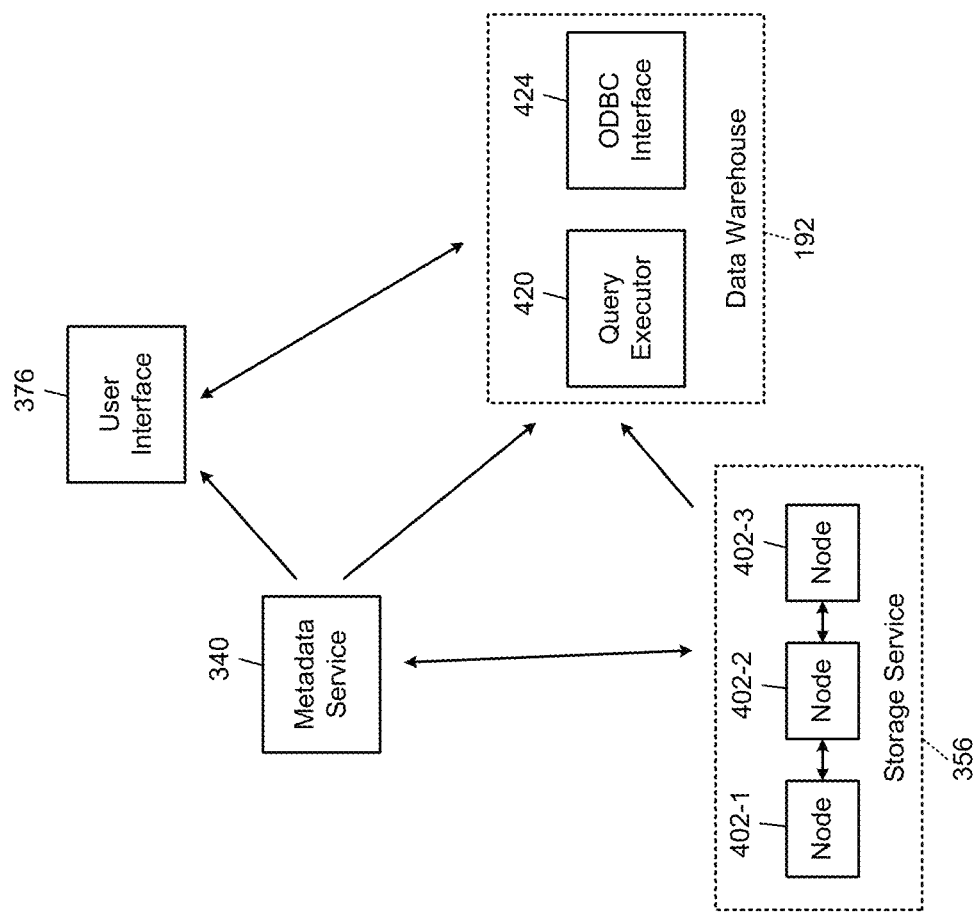
FIG. 2F is a functional block diagram of an example query system using a data warehouse.

In FIG. 2F, the storage service 356 may provide data for loading into the data warehouse 192. The metadata service 340 may provide the relational schema to the data warehouse 192 from which the data warehouse 192 can define tables. The data warehouse 192 may include multiple functional components beyond simply storage, including but not limited to a query executor 420 and an ODBC interface 424. The user interface 376 communicates with the data warehouse 192. In various implementation, the user interface 376 may also communicate with the query executor 344 of FIG. 2E.

A proxy 348 provides the interface between the ODBC client 352 and the query executor 344. The query executor 344 interacts with metadata service 340, which stores schemas for the data residing in the storage service 356.

Processes

Figure 3:
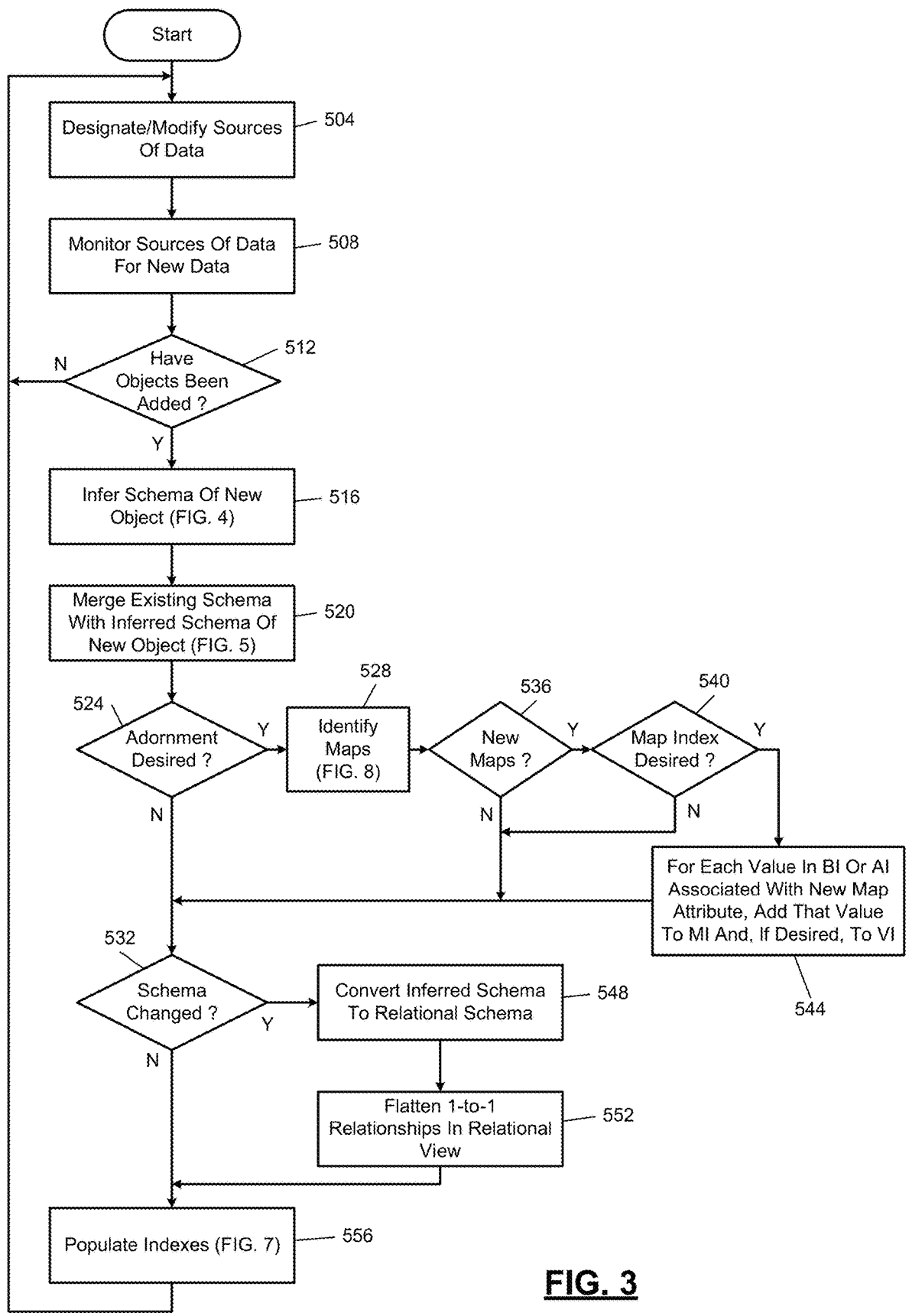
FIG. 3 is a flowchart depicting an example method of incorporating ingested data.

FIG. 3 shows an example process for data ingestion. Control begins at 504, where sources of data can be designated, such as by the user or administrator. In addition, certain data sets from the sources of data may be selected and certain subsetting and reducing operations may be requested of the data sources. Control continues at 508, where the designated data sources are monitored for new data.

Figure 4:
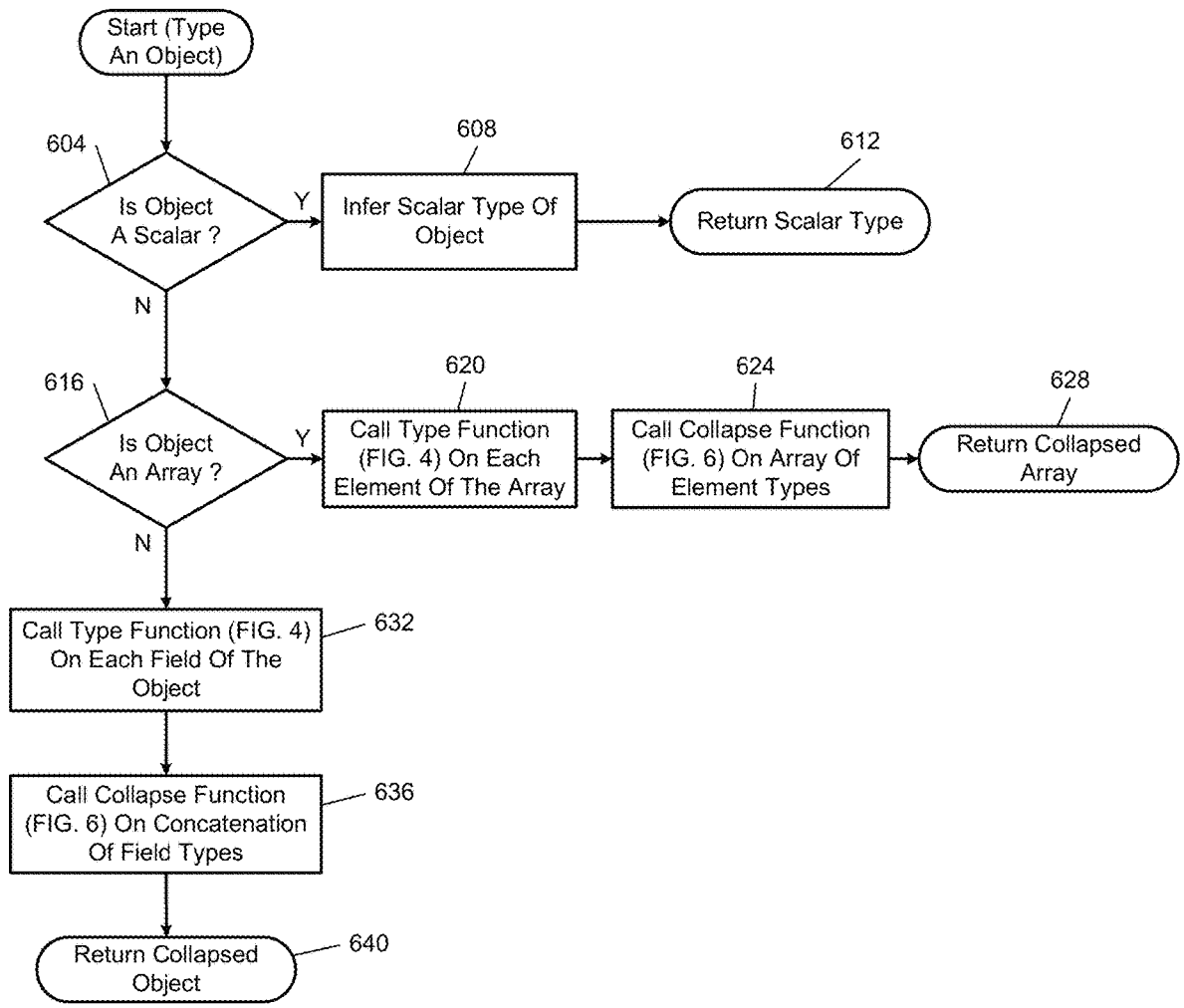
FIG. 4 is a flowchart depicting an example method of inferring a schema.
Figure 5:
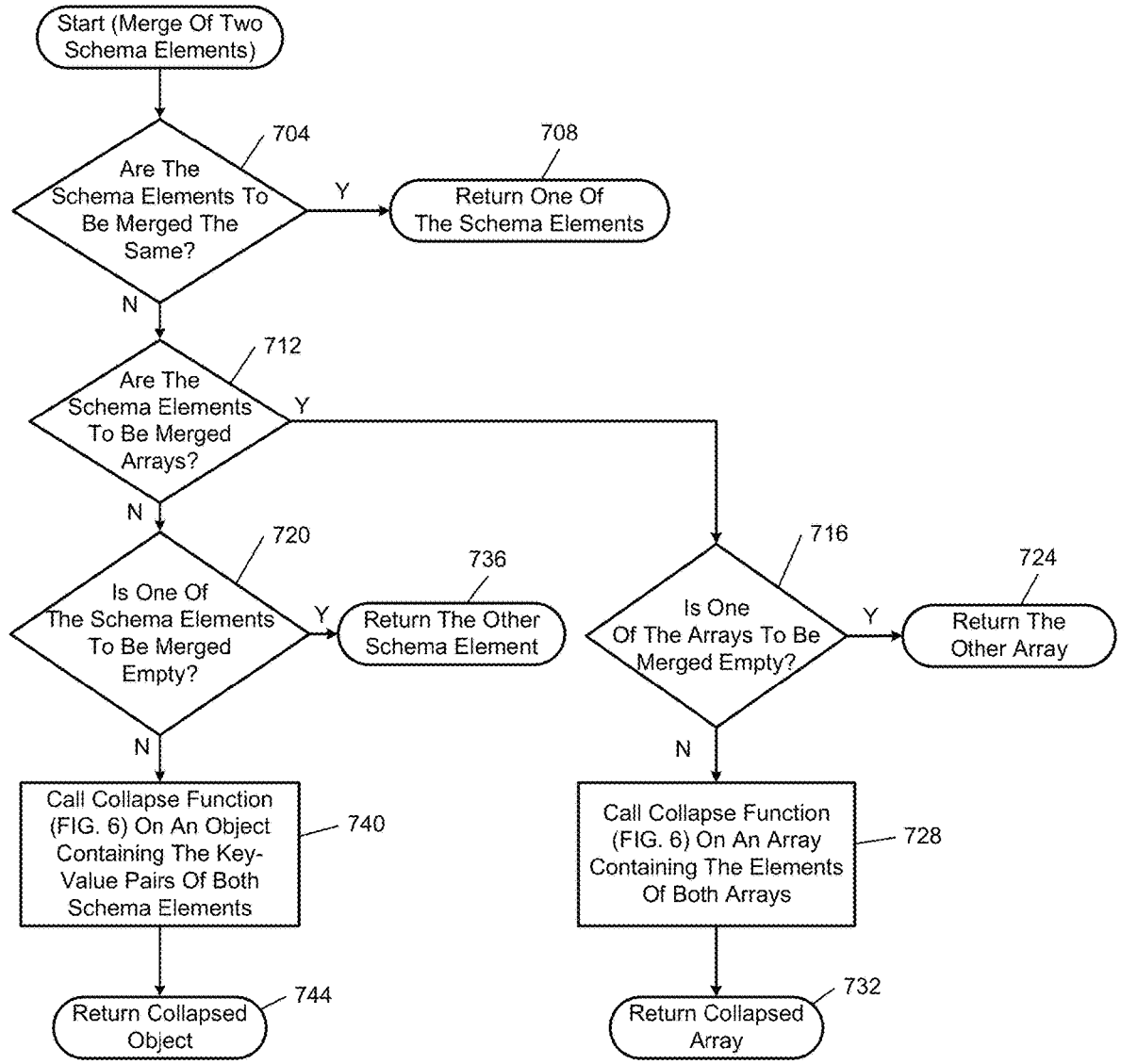
FIG. 5 is a flowchart depicting an example method of merging two schemas.

At 512, if new data objects have been added to the data sources, control transfers to 516; otherwise, control returns to 504, to allow the sources of data to be modified if desired. At 516, the schema of a new object is inferred, which may be performed according to a type function such as is shown in FIG. 4. At 520, the inferred schema from 516 is merged with the already-existing schema. The merge may be performed according to a merge function such as is shown in FIG. 5.

Figure 8:
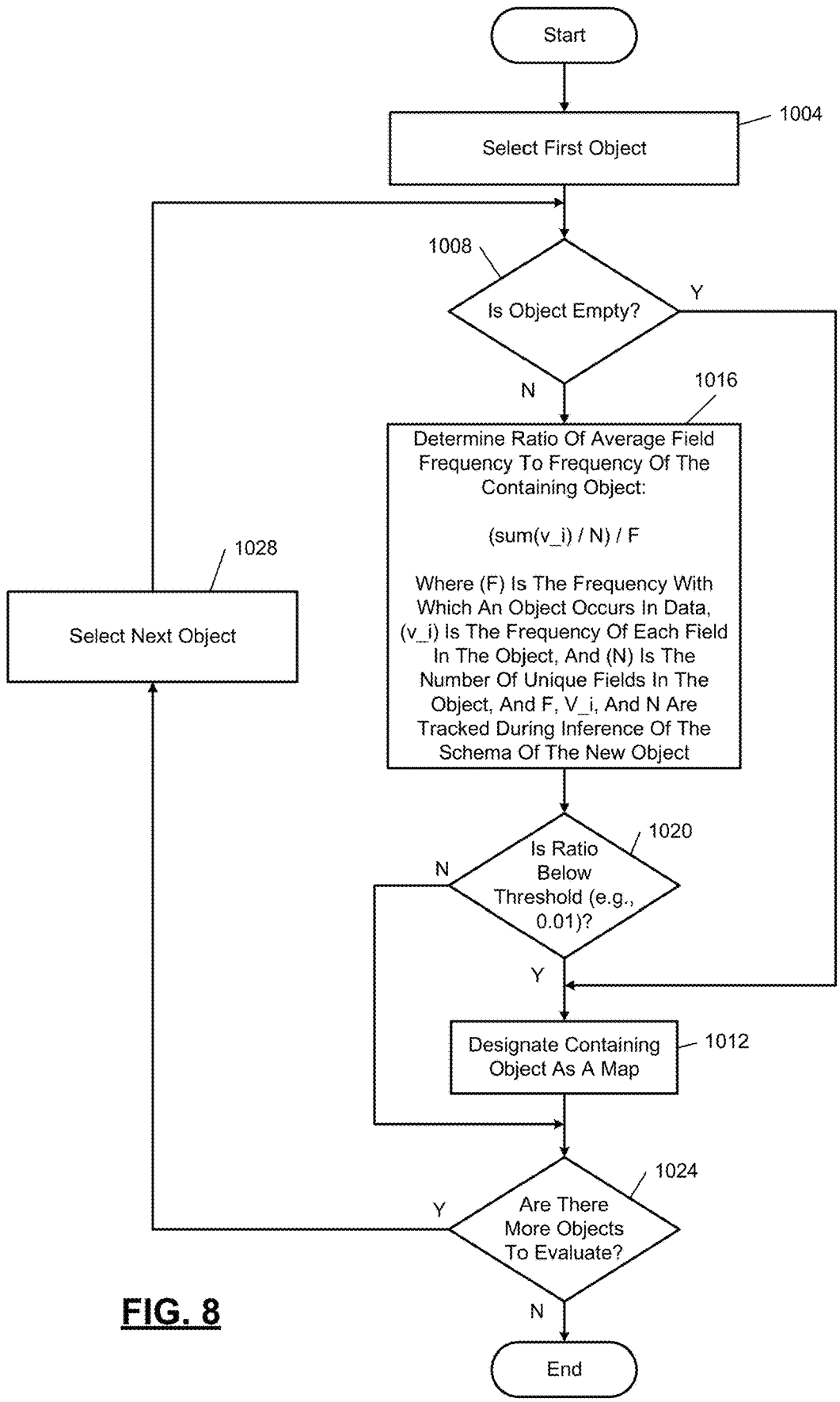
FIG. 8 is a flowchart depicting an example method of performing map adornment.

At 524, if adornment is desired, control transfers to 528; otherwise, control transfers to 532. At 528, maps are identified within the data, such as is shown in FIG. 8. At 536, if no new maps are identified, control continues at 532; otherwise, if new maps have been identified, control transfers to 540. At 540, if a map index is desired, control transfers to 544; otherwise, control continues at 532. At 544, for each value in the BigIndex or ArrayIndex associated with the new map attribute, that value is added to the map index. Further, if desired by the user and/or administrator, for the particular attribute, the values are added to the value index. Control then continues at 532.

In various implementations, adornment at 524 may wait until a first round of objects is processed. For example, on an initial ingest, adornment may be delayed until all of the initial objects are ingested. In this way, sufficient statistics will have been collected for use by the map heuristics. For incremental ingests of additional objects, adornment may be performed after each new group of additional objects.

Figure 7:
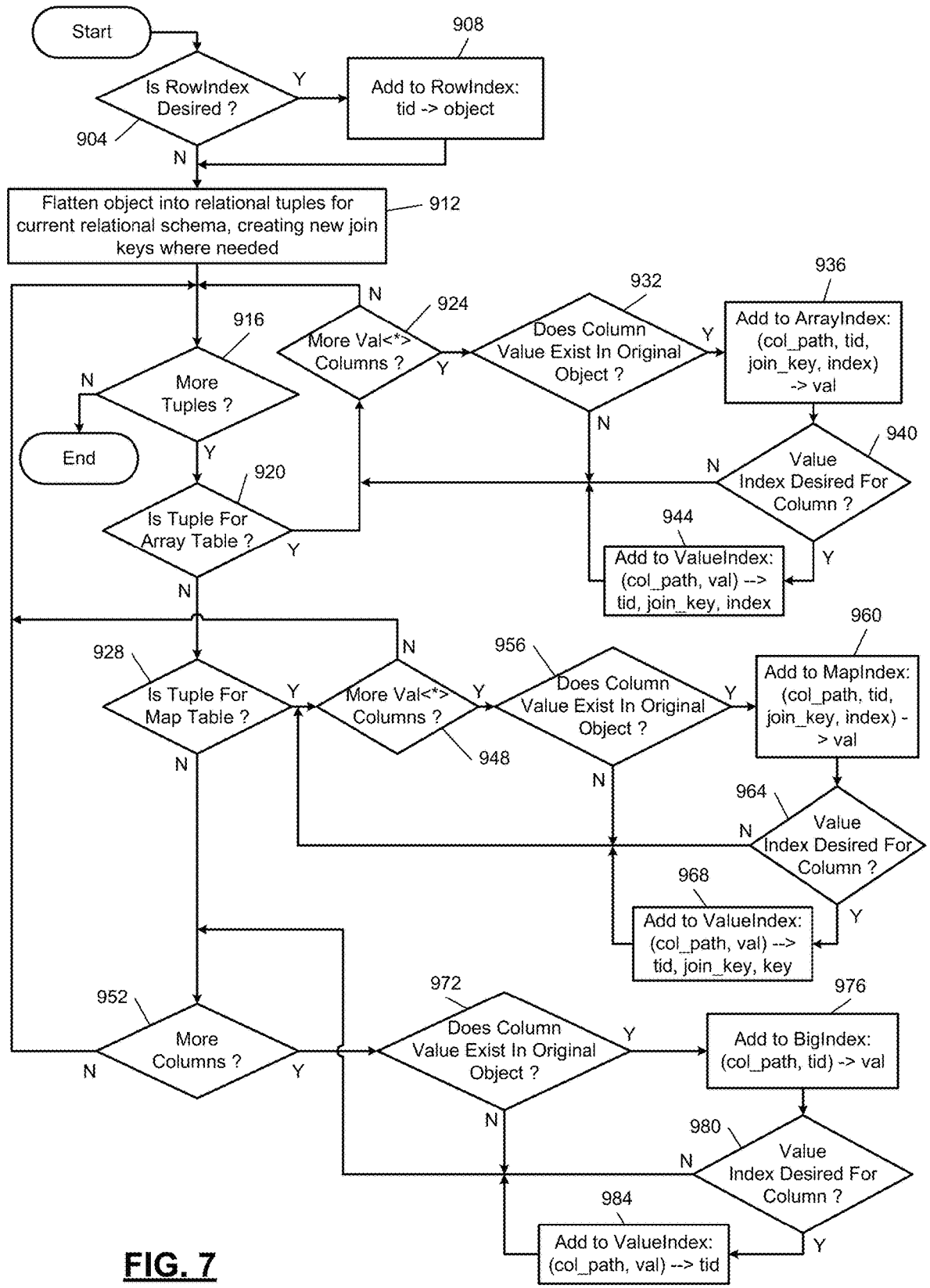
FIG. 7 is a flowchart depicting an example method of populating indexes with data.

At 532, if the JSON schema has changed as a result of the new objects, control transfers to 548 where the schema is converted to a relational schema. Control continues at 552 where the relational view is optimized, such as by flattening one-to-one relationships. Control then continues at 556. If the schema had not changed at 532, control would directly transfer to 556. At 556, indexes are populated with the data of the new object, which may be performed as shown in FIG. 7. Control then returns to 504.

Although population of the indexes is shown at 556 as being performed after converting the inferred schema to relational schema at 548, in various implementations, the indexes may be populated prior to generating the relational schema, as the relational schema is not required. The procedure can use the inferred JSON schema to generate paths and join keys. The relational schema serves as a relational view of the underlying semi-structured data.

FIG. 4 shows an example implementation of a type function relying on recursion. Control begins at 604 where, if the object to be typed is a scalar, control transfers to 608. At 608, the type of the scalar is determined and that scalar type is returned as an output of the function at 612. The scalar type may be determined based on self-description in the received object. In addition, further typing rules may be used, which may recognize that certain strings are representative of data such as dates or times.

Figure 6:
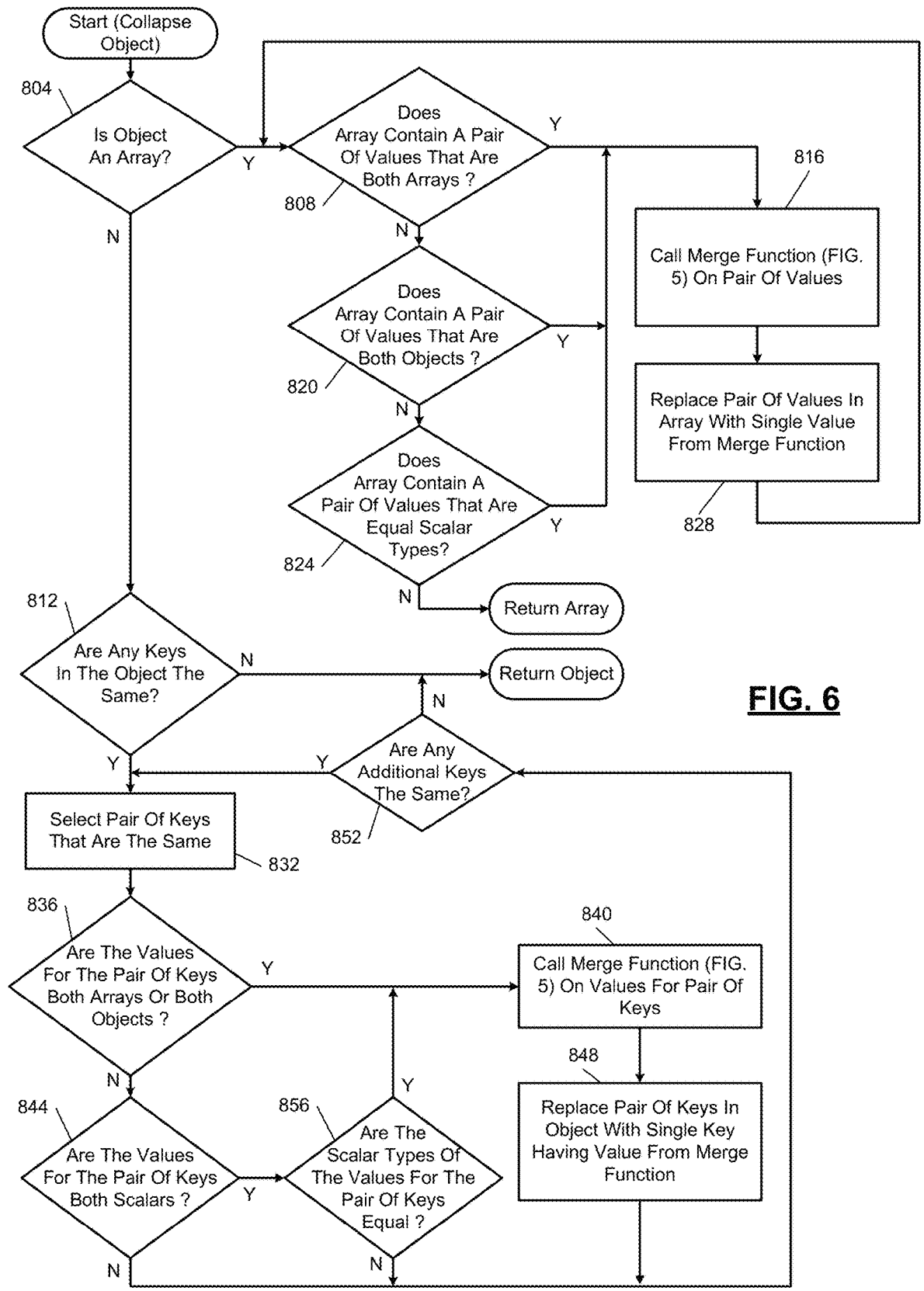
FIG. 6 is a flowchart depicting an example method of collapsing schemas.

If, at 604, the object is not a scalar, control transfers to 616. At 616, if the object is an array, control transfers to 620 where the type function (FIG. 4) is recursively called on each element of the array. When the results of these type functions have been received, control continues at 624 where a collapse function, such as is shown in FIG. 6, is called on an array of the element types as determined at 620. When the collapsed array is returned by the collapse function, that collapsed array is returned by the type function at 628.

If, at 616, the object is not an array, control transfers to 632. At 632, the type function (FIG. 4) is called recursively on each field of the object. Control continues at 636, where the collapse function, is called on a concatenation of the field types determined at 632. The collapsed object returned by the collapse function is then returned by the type function at 640.

FIG. 5 shows an example implementation of a merge function that merges two schema elements into a single schema element is shown. The merge function is also recursive and when first called, the two schema elements are a previously existing schema and a new schema inferred from a newly received object. In further recursive calls of the merge function, the schema elements will be sub-elements of these schemas. Control begins at 704 where, if the schema elements to be merged are equivalent, control transfers to 708 and returns either one of the equivalent schema elements. Otherwise, control transfers to 712 where, if the schema elements to be merged are both arrays, control transfers to 716; otherwise, control transfers to 720.

At 716, if one of the arrays to be merged is empty, the other array is returned at 724. Otherwise, control continues at 728, where a collapse function, such as is shown in FIG. 6, is called on an array containing the elements of both arrays to be merged. The collapsed array returned by the collapse function is then returned by the merge function at 732.

At 720, if one of the schema elements to be merged is empty, then the other schema element is returned by the merge function at 736. If neither of the schema elements to be merged is empty, control continues at 740 where the collapse function is called on an object containing the key-value pairs of both schema elements to be merged. The collapsed object returned by the collapse function is then returned by the merge function at 744.

FIG. 6 shows an example implementation of a collapse function. Control begins at 804 where, if the object to be collapsed is an array, control transfers to 808; otherwise, control transfers to 812. At 808, if the array contains a pair of values that are both arrays, control transfers to 816; otherwise, control continues at 820. At 820, if the array contains a pair of values that are both objects, control transfers to 816; otherwise, control continues at 824. At 824, if the array contains a pair of values that are equal scalar types, control transfers to 816; otherwise, the collapse is complete and the array is returned from the collapse function. At 816, a merge function, such as is shown in FIG. 5, is called on the pair of values identified by 808, 820, or 824. Control continues at 828, where the pair of values is replaced with a single value returned by the merge function.

At 812, if any of the keys in the object are the same, control transfers to 832; otherwise, collapse is complete and the object is returned. At 832, control selects a pair of keys that are the same and continues in 836. If the values for the pair of keys are both arrays or are both objects, control transfers to 840; otherwise, control transfers to 844. At 840, the merge function is called on the values for the pair of keys. Control continues at 848, where the pair of keys is replaced with a single key having a value returned by the merge function. Control then continues at 852 where, if any additional keys are the same, control transfers to 832; otherwise, the collapse is done and the object as modified is returned. At 844, if the values for the pair of keys are both scalars, control transfers to 856; otherwise, control transfers to 852. At 856, if the scalar types of the values for the pair of keys are equal, control transfers to 840 to merge those pair of keys; otherwise, control transfers to 852.

FIG. 7 shows an example process for populating indexes with data from newly retrieved objects. Control begins at 904 where, if the RowIndex is desired, control transfers to 908; otherwise, control transfers to 912. At 908, the object is added to the RowIndex as described above, and control continues at 912. At 912, the object is flattened into relational tuples for the current relation schema and join keys are created as needed. Control continues at 916 where control determines whether more tuples to be added to the indexes are present. If so, control transfers to 920; otherwise, the indexes have been populated and so control ends.

At 920, control determines whether the tuple is for an array table. If so, control transfers to 924; otherwise, control transfers 928. At 924, if there are more value columns in the array table, control transfers to 932. At 932, if the column value exists in the original retrieved object, the value is added to the ArrayIndex at 936. Control then continues at 940. If the ValueIndex is desired for the column, control transfers to 944; otherwise, control returns 924. If the column value does not exist in the original retrieved object at 932, control returns to 924.

At 928, if the tuple is for a map table, control transfers to 948; otherwise, control transfers to 952. At 948, control determines whether more value columns are remaining in the map table. If so, control transfers to 956; otherwise, control returns to 916. At 956, control determines whether the column value exists in the original retrieved object. If so, control transfers to 960; otherwise, control returns to 948. At 960, the value is added to the MapIndex and control transfers to 964. At 964, if the ValueIndex is desired for the column, the value is added to the ValueIndex in 968; in either case, control then returns to 948.

In 952, control determines whether there are more columns present in a table. If so, control transfers to 972; otherwise, control returns to 916. At 972, control determines whether column values exist in the original retrieved object. If so, control transfers to 976; otherwise, control returns to 952. At 976, the value is added to the BigIndex and control continues at 980. At 980, if the ValueIndex is desired for the column, control transfers to 984, where the value is added to the ValueIndex; in either case, control then returns to 952.

FIG. 8 shows an example process for identifying maps. Control begins at 1004 where a first object is selected. Control continues at 1008 where, if the object is empty, the containing object is designated as a map at 1012; otherwise, control transfers to 1016. At 1016, control determines the ratio of the average field frequency to the frequency of the containing object as described above. Control continues at 1020 where, if the ratio is below a threshold, control transfers to 1012 to designate the containing object as a map; otherwise, control transfers to 1024. For example only, the threshold may be user adjustable and/or may be dynamic based on observed data. In various implementations, the heuristic may be adjusted to more readily identify fields as maps as the relational schema grows larger. At 1012, the containing object is designated as a map and control continues at 1024. If there are more objects to evaluate, control transfers to 1028, where the next object is selected and control continues at 1008; otherwise, control ends.

Figure 9:
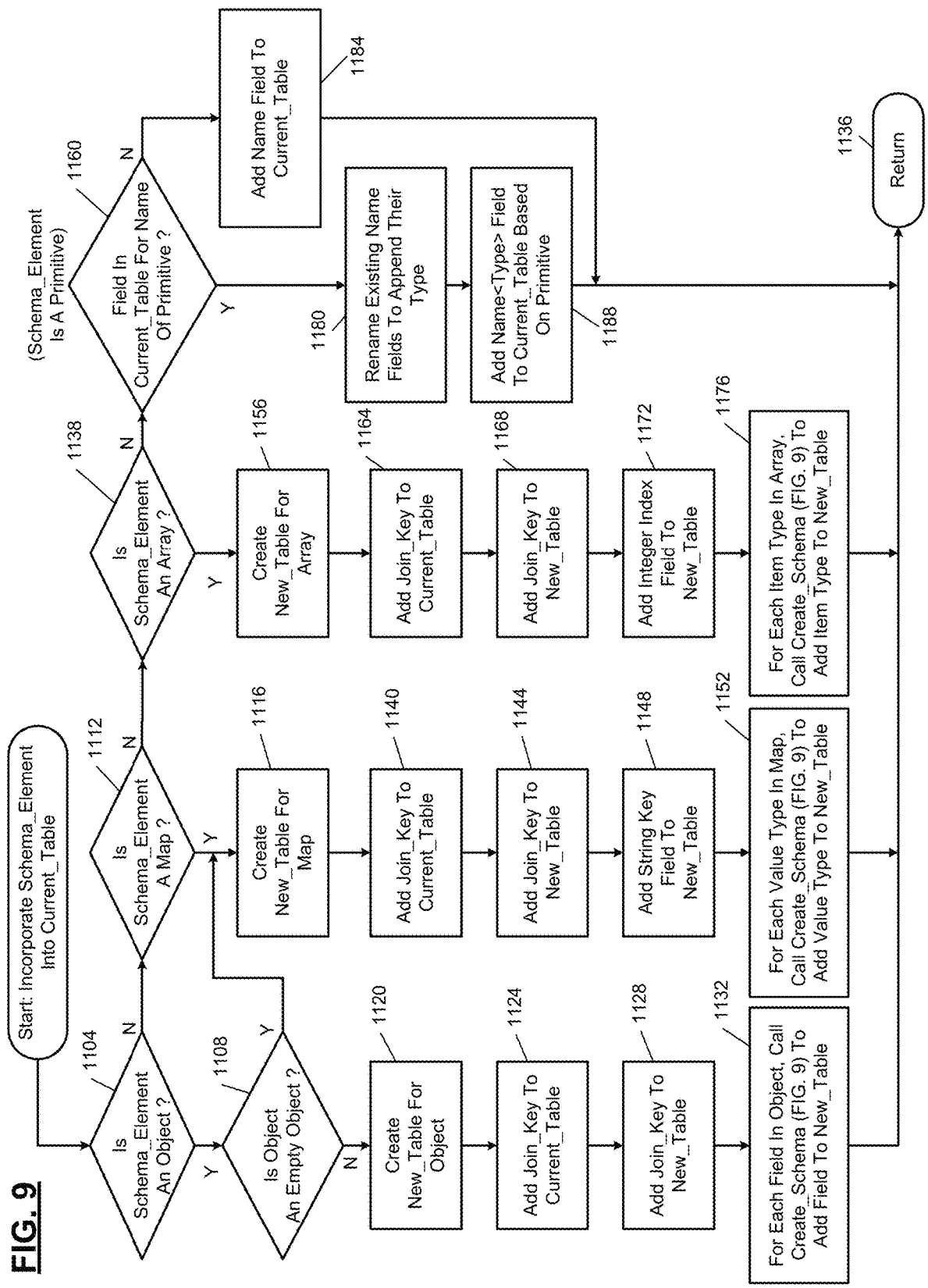
FIG. 9 is a flowchart depicting an example method of creating a relational schema from a JSON schema.

FIG. 9 shows an example implementation of a create_schema function relying on recursion to create a relational schema. When the create_schema function is called, control incorporates a schema element (Schema_Element) into a table (Current_Table). To this end, control begins at 1104 where, if Schema_Element is an object, control transfers to 1108; otherwise, control transfers to 1112. At 1108, if the object is an empty object, the object is treated as a map and control transfers to 1116; otherwise, control continues at 1120. At 1120, a new table (New_Table) is created for the nested object. At 1124, a join key (Join_Key) is added to Current_Table and at 1128 a corresponding Join_Key is added to New_Table. Control then continues at 1132 where, for each field in the nested object, the create_schema function is recursively called to add a field to the table. Control then returns from the present invocation of the create_schema function at 1136.

At 1112, if Schema_Element is a map, control transfers to 1116; otherwise, control transfers to 1138. At 1116, a new table (New_Table) is created for the map. Control continues at 1140, where a Join_Key is added to Current_Table and at 1144, a corresponding Join_Key is added to New_Table. At 1148, a key field having a string type is added to New_Table. Control continues at 1152 where, for each value type in the map, the create_schema function is recursively called to add the value type to New_Table. Control then returns at 1136.

At 1138, control determines whether Schema_Element is an array. If so, control transfers to 1156; otherwise, control transfers to 1160. At 1156, a new table (New_Table) is created for the array, a Join_Key is added to Current_Table at 1164, and a corresponding Join_Key is added to New_Table at 1168. At 1172, an index field having an integer type is added to New_Table. Control continues at 1176 where, for each item type in the array, the create_schema function is called to add the item type to New_Table. Control then returns at 1136.

At 1160, Schema_Element, by process of elimination, is a primitive. If there is already a field in Current_Table having the same name as the primitive, control transfers to 1180; otherwise, control transfers to 1184. At 1184, the name field is simply added to Current_Table and control returns at 1136. At 1180, type polymorphism is present and therefore existing fields in Current_Table having the same name as the primitive are renamed to append their type to the field name. Control continues at 1188 where a new field is added based on the current primitive, with the type appended to the field name. Control then returns at 1136.

Figure 10A:
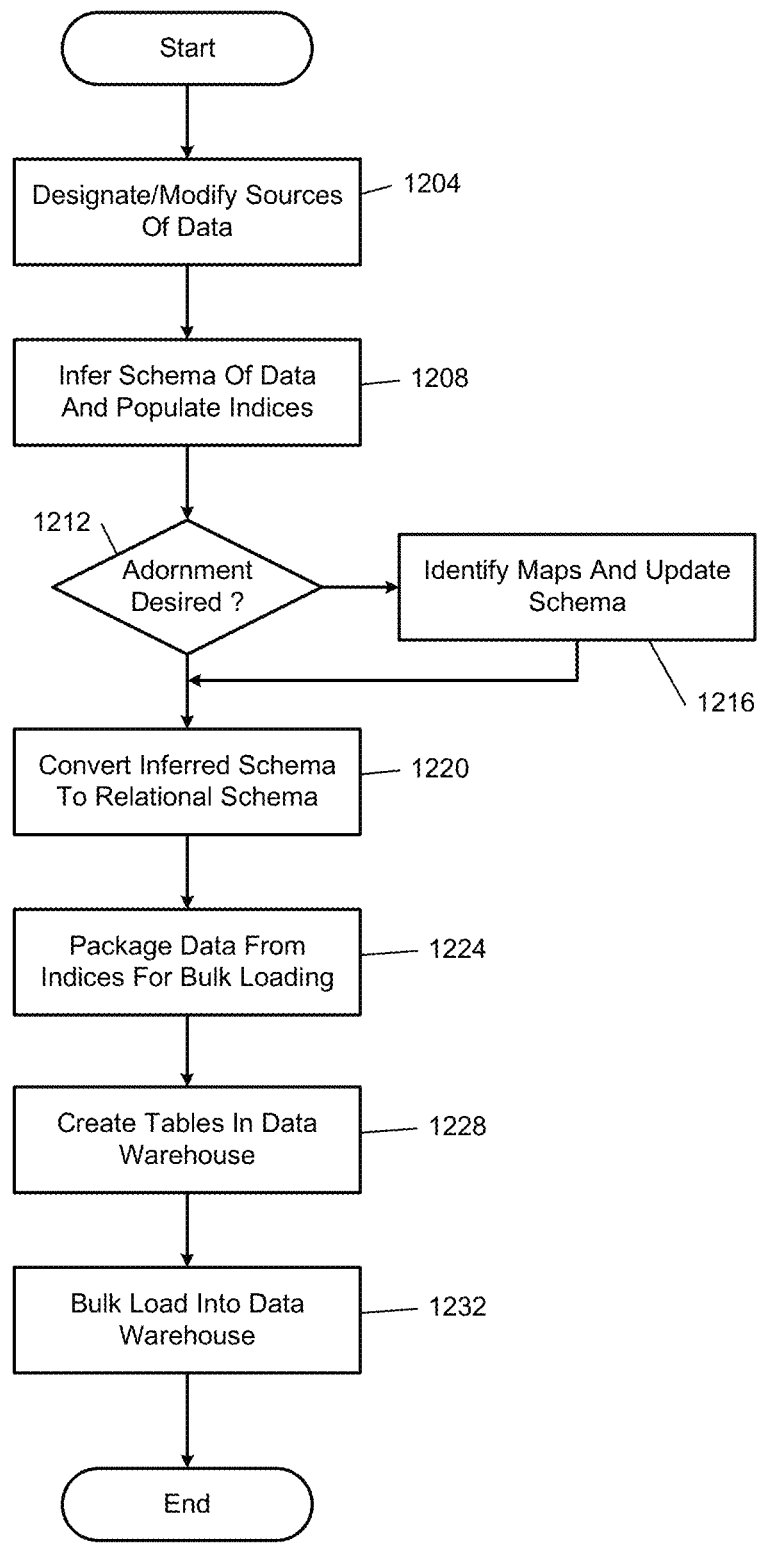
FIGS. 10A and 10B are flowcharts depicting example data ingestion processes using a data warehouse.

In FIG. 10A, control begins at 1204 where a user or an administrator designates and/or modifies sources of data. At 1208, control infers a schema from the data and populates indices as the schema is being inferred, as described in detail above. At 1212, control determines whether adornment is desired, which may be configured by the user or the administrator. If so, control transfers to 1216; otherwise, control transfers to 1220. At 1216, control identifies maps within the schema and updates the schema to reflect the identified maps. Based on settings from the user and/or the administrator, certain identified maps can be manually reverted to separate columns by the user and/or the administrator. This may be performed upon ingestion or at any time while the data is in use. Once a map is identified and a map index is created, the data may remain in the map index so that the schema can reflect the map or reflect the column separately, and the user or the administrator can toggle between these configurations without reloading the data. Control continues at 1220. At 1220, control converts the inferred schema to a relational schema. At 1224, control packages the data into a format recognizable by the particular data warehouse in use. At 1228, tables according to the relational schema are created in the data warehouse. For example only, SQL create table commands may be used. At 1232, the packaged data is bulk loaded into the data warehouse. When the data warehouse is able to bulk load in parallel, the data packaging at 1224 may create multiple files for each database relation to speed the bulk load of 1232.

Figure 10B:
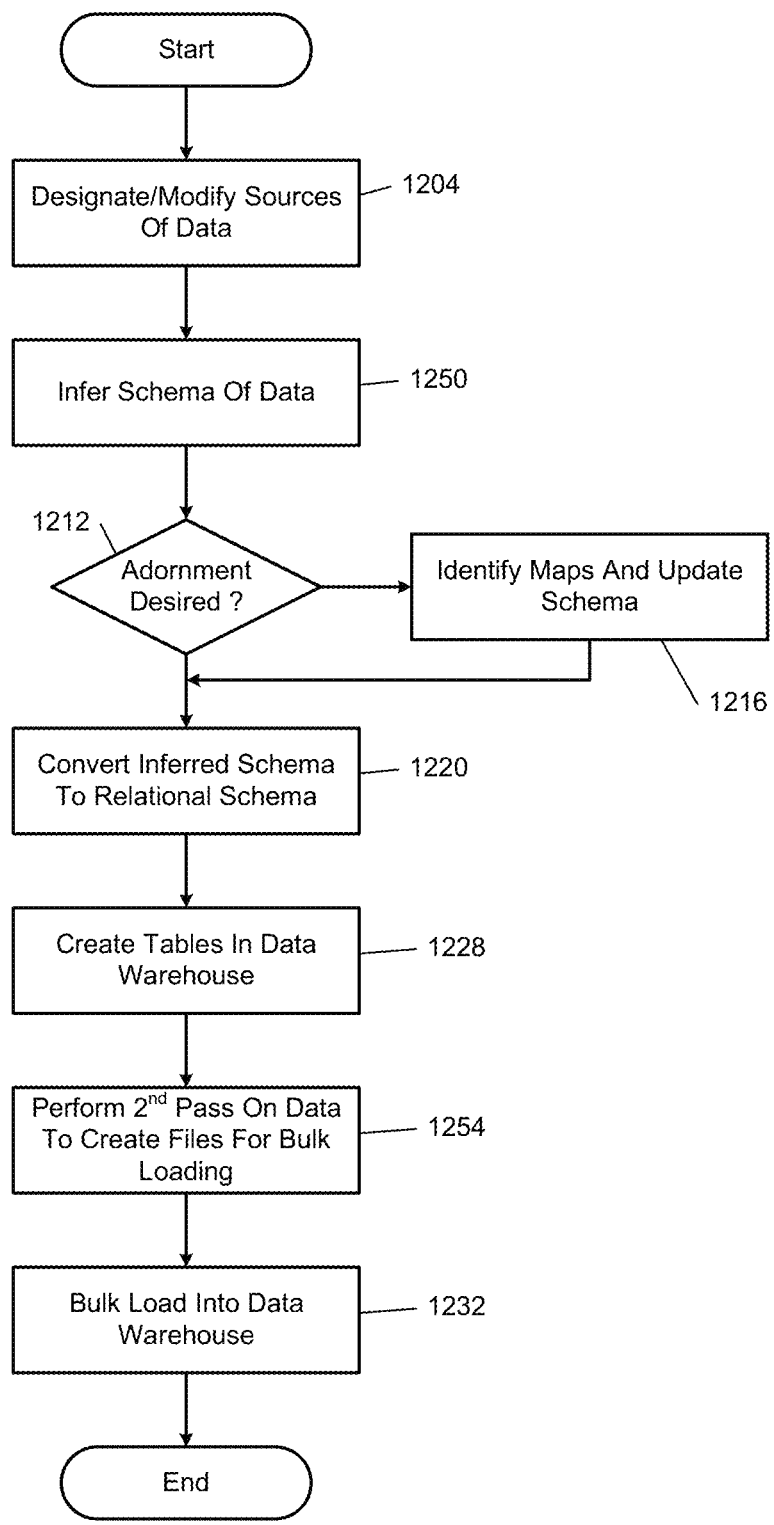

In FIG. 10B, a modified process may be used when index stores are not available, are overfull, or are not desired for this particular time at the current time. After 1204, at 1250, the schema of the data is inferred. Unlike in FIG. 10A, the data is not used to populate indices. After 1220, tables according to the relational schema are created in the data warehouse at 1228. Control continues at 1254, where a second pass is performed on the data to create intermediate files for local loading into the data warehouse. Control then continues at 1232, where the bulk load is reformed into the data warehouse.

Figure 11:
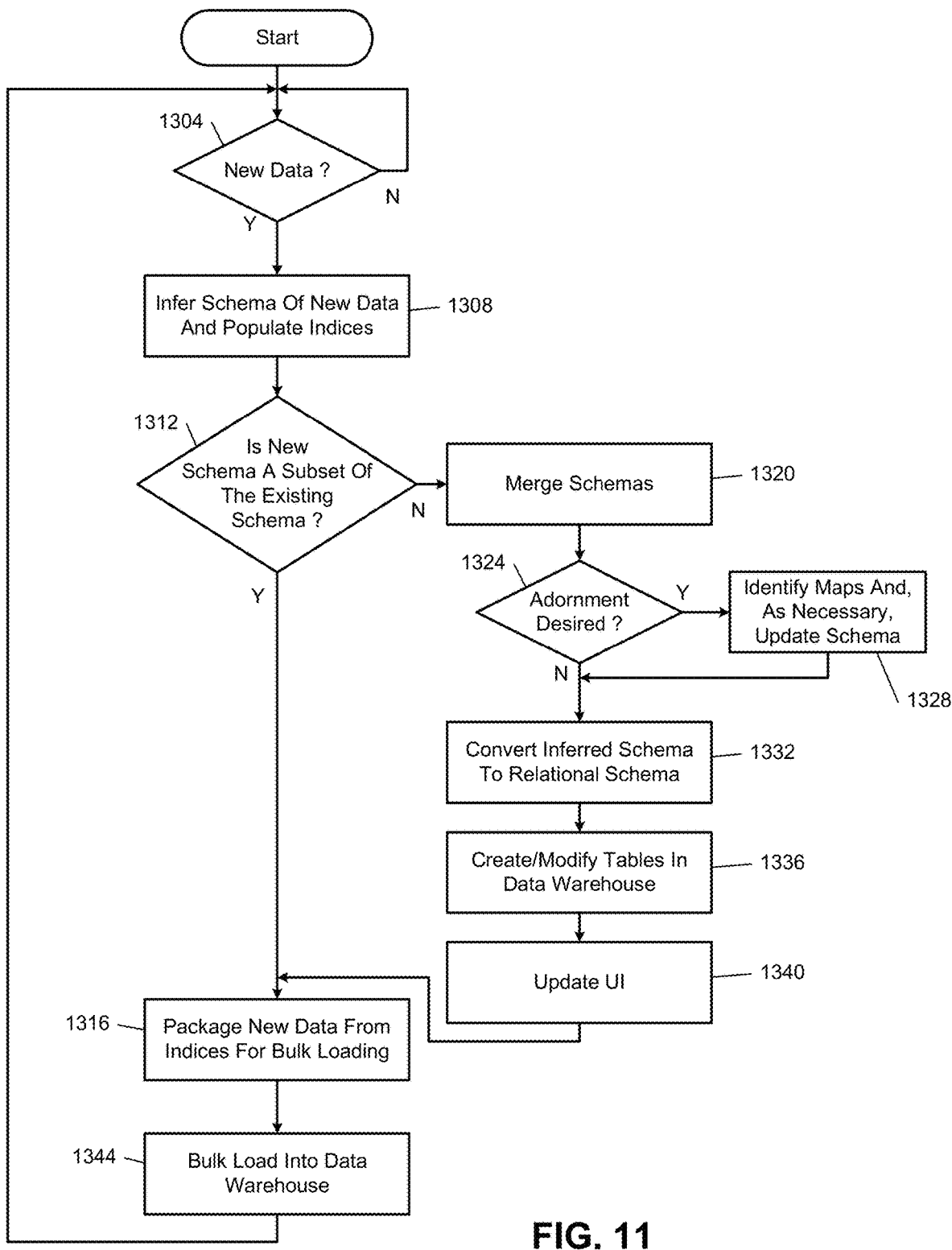
FIG. 11 is a flowchart depicting example updating in response to new data when using a data warehouse.

In FIG. 11, an example process for integrated new data into the data-warehouse-supported analysis platform is shown. At 1304, control determines whether new data has been received from designated sources of data. If so, control transfers to 1308; otherwise, control remains in 1304. At 1308, control infers a schema of the new data and populates indices with the new data. Control continues at 1312, where control determines whether the schema of the new data is a subset of the already existing schema. If so, control continues at 1316; otherwise, control transfers to 1320. At 1320, the new schema is merged with the existing schema and control continues at 1324. At 1324, control determines whether adornment is desired, and if so, control transfers to 1328; otherwise, control transfers to 1332. At 1328, control identifies maps based on the new data. These identified maps may encompass new data as well as previous data in situations where the new data has resulted in the attributes qualifying as a map according to the map criteria. If additional maps are identified, the schema is updated. Control then continues at 1332. At 1332, the merged schema is converted to a relational schema. At 1336, tables are modified in the data warehouse and/or new tables are created. At 1340, the user interface is informed that the schema has been updated and that the user interface should therefore display the updated schema to the user. Control then continues at 1316. At 1316, control packages the new data for bulk loading from the indices. Control continues at 1344, where bulk loading of the newly packaged data into the data warehouse is performed. Control then returns to 1304.

Figure 12:
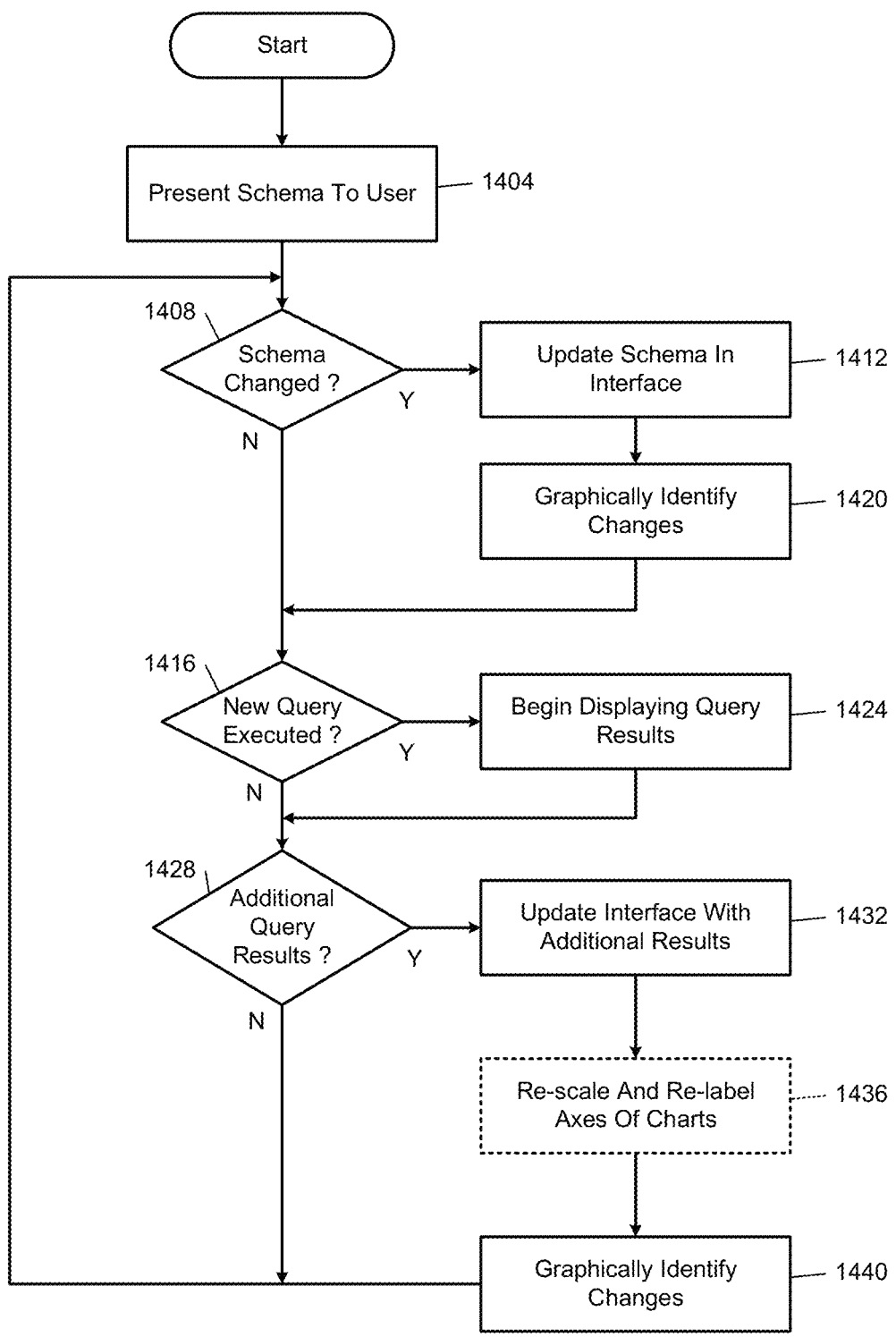
FIG. 12 is a flowchart depicting example user interface operation.

In FIG. 12, an example high level overview of user interface operation is performed. Control begins at 1404, where an inferred relation schema is presented to the user. Control continues at 1408, where if the schema has changed, control transfers to 1412; otherwise, control transfers to 1416. At 1412, control updates the displayed schema in the user interface and continues at 1420. At 1420, control optionally identifies changes to the schema graphically. For example only, recently changed schema elements may be highlighted visually. In various implementations, the user interface may determine whether a schema element has been recently changed based on when the last query was run. For example only, schema elements that have changed since the last query was run may be specially highlighted. Control then continues at 1416. At 1416, if a new query has been requested by the user, control transfers to 1424; otherwise, control transfers to 1428. At 1424, control begins displaying query results from the executed query. These results may be incomplete, including lacking certain rows or columns and/or having inaccurate or partially inaccurate data. Control continues at 1428. At 1428, if there are additional query results from a query that is in process, control transfers to 1432; otherwise, control returns to 1408. At 1432, control updates the interface with the additional results. Control continues at 1436, where if a plot of data is being displayed, various aspects of the chart may be modified, such as re-scaling and relabeling axes may be performed. Control continues at 1440, where control graphically identifies the changes to the query results. For example only, query results that have repeatedly changed are highlighted. In various implementations, query results that have changed by a greater percentage or by a greater amount may be highlighted more prominently. In addition, new columns and/or new rows may be uniquely identified. Further, ghosting and/or coloring may indicate a current value as well as a previously displayed value to provide a visual reference for trends in the query results. Control then returns to 1408.

Graphical User Interface

Figure 13A:
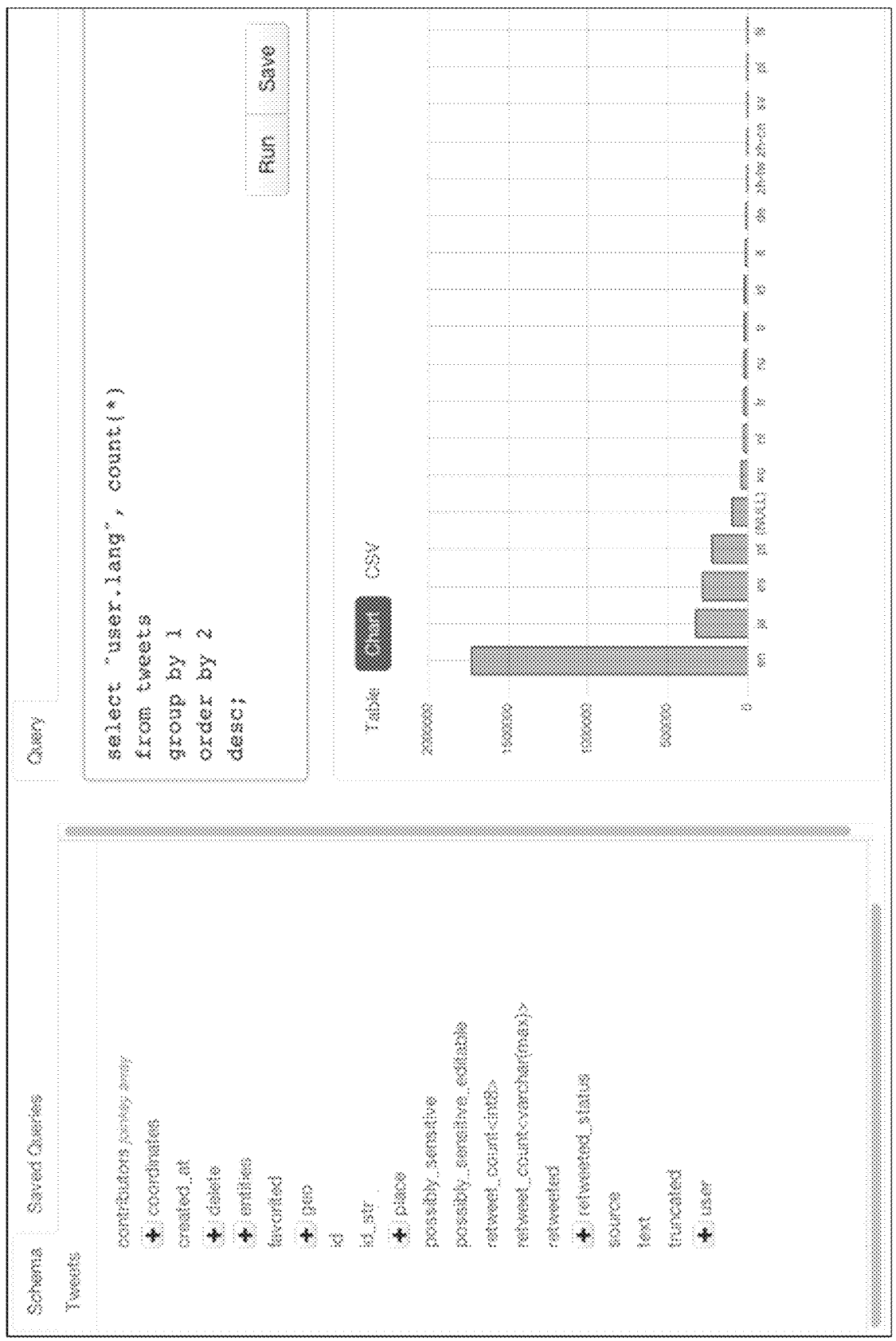

In FIG. 13A, a graphical user interface displays an inferred schema in a left hand pane, while in a right hand pane, a query and query results are shown. In these examples, an example representation of Twitter attributes is presented.

Figure 13B:
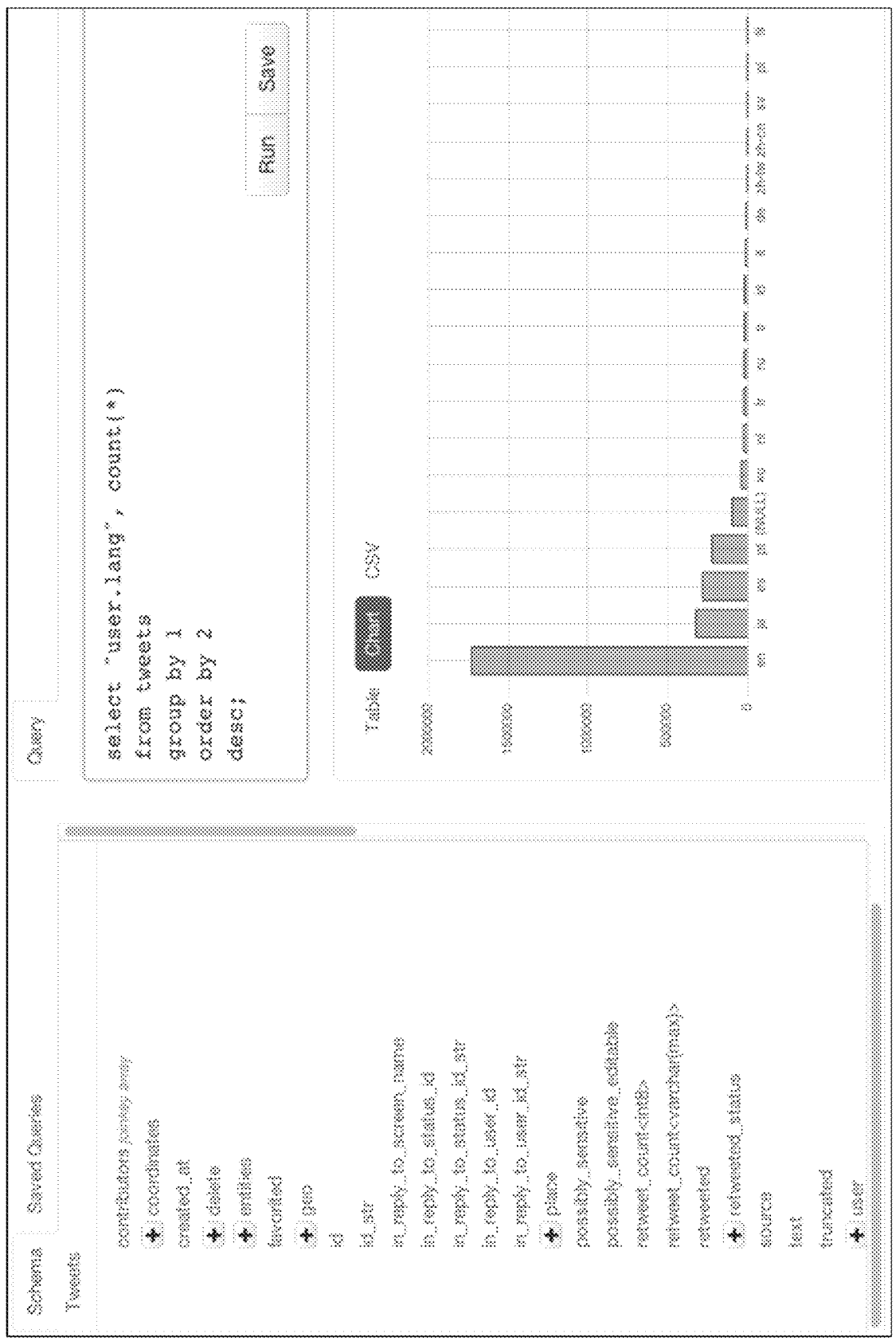
Figure 13C:
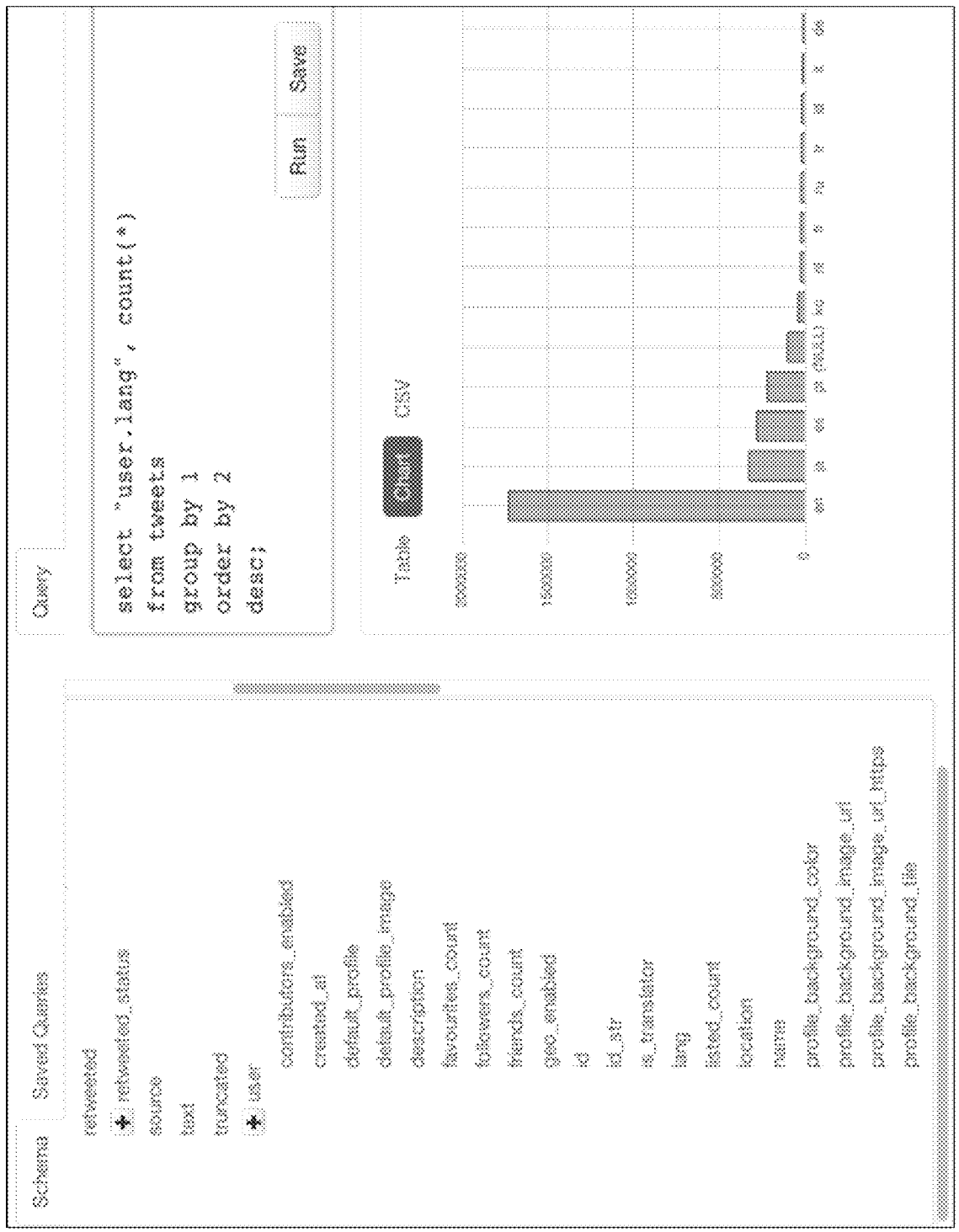

In FIG. 13B, note that additional relational schema attributes have appeared since FIG. 13A. Specifically, attributes beginning with in_reply_to have been dynamically added to the user interface based on additional data being parsed, which included those attributes. In FIG. 13C, one representation of a nested object is shown expanded. Specifically, attributes underneath the node user are shown.

Figure 13D:
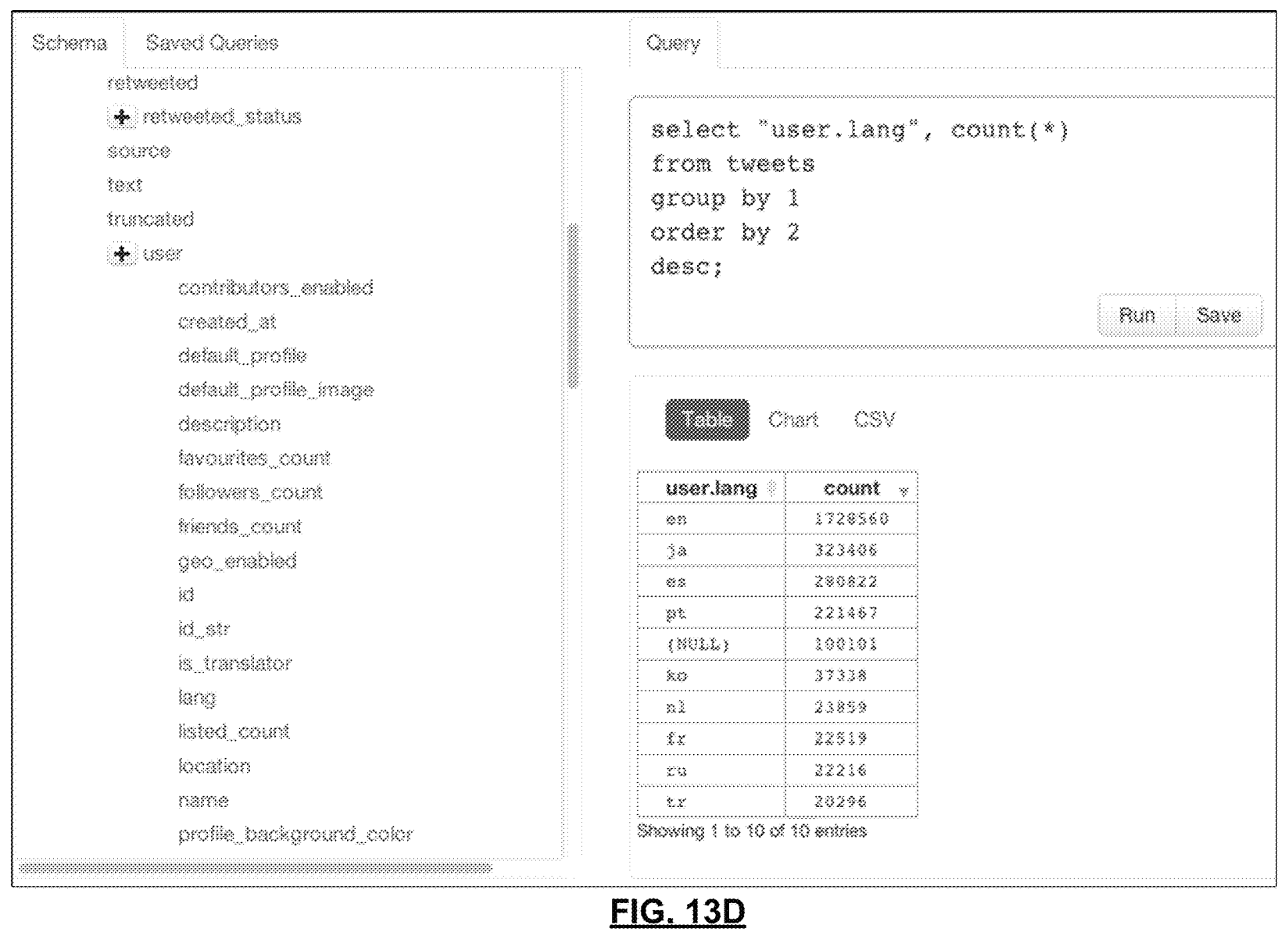

In FIG. 13D, a tabular representation of data is presented. In this display, 10 languages have been found by the query. In FIG. 13E, 24 languages have now been found. In this particular example, the counts for the original 10 languages have not changed, indicating that the records that were parsed between the display of FIG. 13D and the display of FIG. 13E were additional languages not shown in the initial 10 of FIG. 13D.

In FIG. 13B, additional attributes were dynamically added to the display subsequent to the display shown in FIG. 13A. In FIG. 13E, additional query results were dynamically added to the display subsequent to the display shown in FIG. 13D.

Automated Extract, Transform, Load (ETL)

Above, schema inference was introduced, which extracts a cumulative (or, global) schema (in certain implementations, also called a JSON schema) from a collection of semi-structured objects (in certain implementations, JSON documents). This cumulative schema is incrementally updated as more input becomes available. The cumulative schema may be adorned to designate sets of entities that belong to maps or arrays. Creating such a cumulative schema, and processing data based on the cumulative schema, can be used advantageously as part of or in place of a traditional extract, transformation, load (ETL) process. The resulting ETL process may recognize an improvement in one or more of speed, fidelity, or usability.

In general terms, ETL refers to the process that governs the movement of data from one or more source locations to one or more destination locations, with an optional transformation phase where selected data sets undergo certain transformations. Transformation may also be necessary to obey the input format of one of the destinations. The sources and destinations can be relational databases, object stores (such as NoSQL or key-value stores), or repositories of data that follow the format of those databases or stores (such as local or distributed file systems or cloud stores that store files or documents containing CSV or JSON data).

ETL fidelity can be defined as how accurately data items are mapped from a source to a destination. For example, an ETL process that is tasked to load data items a, b, and c from a source into a destination, and results in items b and c residing in the destination, has a better fidelity than an ETL process that only results in item c being loaded.

ETL usability can be measured in the (reduced) number of steps, taken both by the user and the computing system, in performing tasks on the destination computing system that are using parts of the loaded data as input. For example, two different ETL processes that both result in data items b and c being loaded from a source into a destination can have a different usability if one results in a smaller number of steps in computing the largest of the two items on the destination system.

As described above, semi-structured data can be transformed into relational form and loaded into a system supporting indexed columnar storage. In addition to or in place of the columnar storage, data can be loaded into multiple targets. This can be generalized to describe a flexible ETL process that takes data from one or more (possibly semi-structured) sources, optionally applies one or more transformations, and loads the data into one or more (possibly relational) targets. In various implementations, the ETL process may use an index store for intermediate storage or may omit the intermediate store.

Figure 14:
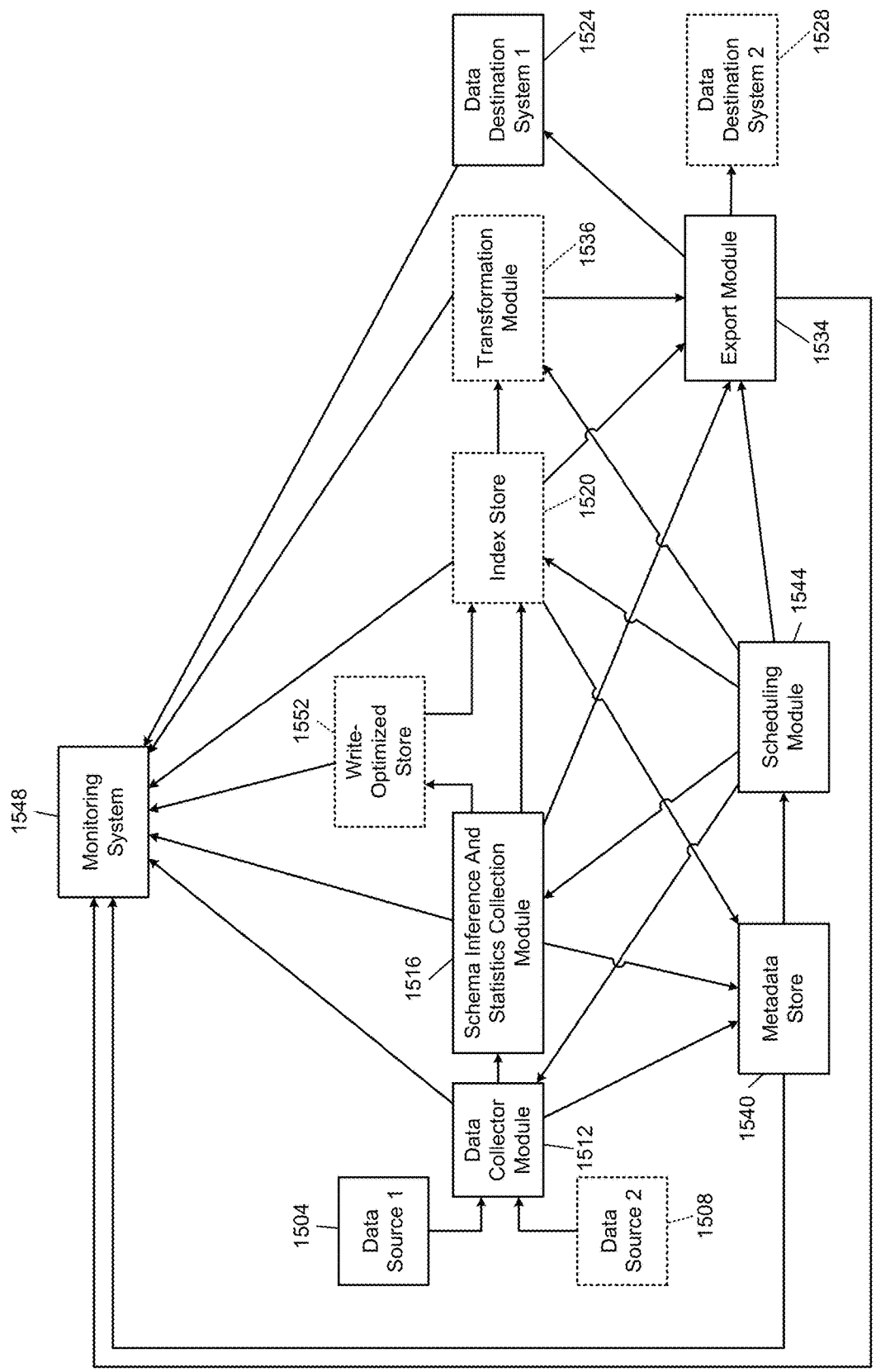
FIG. 14 is a functional block diagram of an example scalable analysis platform accommodating multiple data destinations.

FIG. 14 shows an overview of the ETL process, and is a higher level and more generalized version of FIG. 2B. On the left of FIG. 14, data starts out in one or more data sources (such as data sources 1504 and 1508), and is extracted by a data collector module 1512 in the form of raw records. The data collector module 1512 may produce the raw records in a semi-structured format such as JSON. When the data sources 1504 and 1508 contain data in a predetermined format, such as text files storing JSON objects, the data collector module 1512 may pass the JSON objects through unchanged. In various implementations, one or more additional data collector modules (not shown) may be implemented to process data in parallel from the same data source or from multiple data sources. In addition, data collector modules may be implemented in a chain to progressively convert data into a form usable by the schema inference and statistics collection module 1516 and the metadata store 1540.

The collected records are passed to a schema inference and statistics collection module 1516. Based on a cumulative schema determined by the schema inference and statistics collection module 1516, the data can be loaded into an index store 1520 for later loading into one or more destination systems (as shown in FIG. 14, data destination systems 1524 and 1528). Additionally or alternatively, the data may bypass the index store 324 and be sent directly to one or more of the data destination systems 1524 or 1528 by way of an export module 1534.

A transformation module 1536 may be implemented to perform one or more transformations on data from the index store 1520 before storing the data into one or more of the data destination systems 1524 or 1528 via the export module 1534. Alternatively, the transformation module 1536 may perform a transformation on data received directly from the schema inference and statistics collection module 1516, bypassing the index store.

The export module 1534 provides data to the data destination systems 1524 and 1528 in a format compatible with their ingestion commands. For example only, the export module 1534 may provide data in tabular row form for SQL-based data warehouses or databases. The export module 1534 may provide objects, such as JSON objects, to the data destination system 1524 in response to the data destination system 1524 accepting JSON objects. In various implementations, the objects may be passed through unchanged from the data collector module 1512. In response to the data destination system 1524 accepting columnar data, the export module 1534 may pass through column-based data unchanged from the index store 1520.

A metadata store 1540 records the status of each of the data collector module 1512, the schema inference and statistics collection module 1516, and the index store 1520. A scheduling module 1544 assigns jobs to the data collector module 1512, the schema inference and statistics collection module 1516, the index store 1520, and the export module 1534. The scheduling module 1544 may schedule the jobs based on dependencies described in more detail below with respect to FIGS. 16A-16B. A monitoring system 1548, as described below, records performance and error data on operation of the data collector module 1512, the schema inference and statistics collection module 1516, the index store 1520, the transformation module 1536, the metadata store 1540, and one or more of the data destination systems (in the example of FIG. 14, the data destination system 1524).

Extracting Data from Multiple Sources

Data Sources
Object Sources

We now expand the definition of an input source to the ETL process to cover object sources. These sources can include NoSQL stores, document stores such as MongoDB and Couchbase, data structure stores such as Redis, and key/multi-value stores such as Cassandra, HBase, and DynamoDB. Objects stored inside files on a file store can be treated as additional object sources. Objects stored in files can include JSON, BSON, Protobuf, Avro, Thrift, and XML.

In various implementations, the nature of some or all of the input sources selected for data extraction may be auto-detected. Specialized collectors may be used for different types of input sources. For simplicity, the remaining discussion will use JSON documents as the example of object sources. The present disclosure could instead use another type of object source, and there may be a one-to-one mapping between the other object source and JSON. In other words, the present disclosure is directly applicable to those other types of object sources.

Relational Sources

A relational source, such as a database, may also be used as a source. The process of extracting data from a relational source can be thought of in some ways as running in reverse the process of generating a relational schema from a JSON schema. The process starts with a root table being identified from which each row will be converted into an object. The root table may be specified by a user, selected automatically by the data collector process automatically, or selected by the data collector process based on previous heuristics or rulesets provided by a user or administrator. The data collector may select a root table subject to a later manual change made by a user.

The rows of that root table are joined with rows in other tables to create complete objects. For example, rows in other tables may be selected using foreign key relationships, statistical pairings, or user direction. The statistical pairings can be implemented by using statistics to detect similarity of value distributions between two columns. Timestamp and key columns in particular are good candidates for columns that may predict relationships. If there is a one-to-one relationship between the rows of a parent table and its child, then the row in the child table simply becomes a nested object in the primary object. If there is a one-to-many relationship, then the rows become part of an array of nested objects. This process may create objects that can be mapped to JSON documents, at which point the description of JSON processing in this disclosure directly applies.

As an example, consider the following two tables:

```
Table: user
Userid, name, age
1, "Nate", 27
2, "Stavros", 87
Table: address
Userid, start, end, city
1, 1995, 2006, Ann Arbor
1, 2006, NULL, Redwood City
2, 2005, 2007, Cambridge
2, 2007, NULL, San Francisco
```

A JSON schema may be inferred from those tables as follows:

```
user : { "userid" : "integer",
    "name" : "string",
    "age" : "integer",
    "address" : [ {
       "start" : "integer",
       "end" : "integer",
       "city" : "string" } ]
}
```

Using the JSON schema to create objects from the input tables leads to the following objects:

```
{ "userid" : 1, "name" : "Nate", "age" : 27,
    "address" : [ { "start" : 1995, "end" : 2006",
                    "city" : "Ann Arbor" },
                  { "start" : 2006, "end" : null,
                    "city" : "Redwood City" } ] }
{ "userid" : 2, "name" : "Stavros", "age" : 87,
    "address" : [ { "start" : 2005, "end" : 2007",
                    "city" : "Cambridge" },
                  { "start" : 2007, "end" : null,
                    "city" : "San Francisco" } ] }
```

Supporting Relational Sources through Eventization

In certain cases, relational sources may contain multiple tables not associated with a single root table or the manner of how to join different tables together may not be obvious. In situations where there each table (or set of tables) includes at least one column with timestamp data, the collector process can "eventize" a set of tables (referred to as "eventization") as follows. A new logical or physical event table is created having as columns the union of all columns from the input tables (the same column name appearing in more than one table may lead to only a single column with that name in the new table) and at least two new columns: "event" and "time." These names can be altered programmatically (such as with predefined prefixes and/or suffixes) at the time of eventization to avoid conflict with the names of the columns of the existing tables.

The new table is populated with rows from each table in the set of input tables. For columns in the new table that do not exist in an imported row, null values can be used. The "event" column takes as values the name of the input table from which a row is imported. The "time" column specifies the sort order of the eventized table. The "time" column is populated with the timestamp information from the corresponding row of the input table.

When there are multiple columns with timestamp data in the source table, multiple "time" columns can be added, such as "time1", "time2", etc. Each "time" column is populated by the corresponding timestamp column of the input table. Alternatively, one of the columns in the input table with timestamp data may be selected as the governing column and used to eventize the table. The selection of the timestamp column in the input table may be done through an automatic rule (e.g., always pick the smallest value, or always pick the left-most column), based on user input, or through statistical rules that can help derive the time that it is most likely the event represented by the row took place.

As an example of eventization, consider the following schemas of three example source tables:

```
table:user_log {"id": "number", "session_start" :
    "timestamp", "session_end" : "timestamp"}
table:query_log {"id": "number", "query_text" :
    "string", "query_start" : "timestamp",
    "duration" : "number"}
table:cpu_load {"time":"timestamp", "load" : "float"}
```

An example schema for the eventized table is shown here:

```
table:events { "event" : "string",
               "_time" : "timestamp",
               "_time2" : "timestamp",
               "id": "number",
```

-continued

```
               "session_start" : "timestamp",
               "session_end" : "timestamp",
               "query_text" : "string",
               "query_start" : "timestamp",
               "duration" : "number",
               "time" : "timestamp",
               "load" : "float" }
```

Consider one example row from each of the source tables:

```
user_log : (15213, "01/01/2014 12:15:00",
            "01/01/2014 12:15:30")
query_log : (79004525, "select * from T;",
            "01/01/2014 10:10:00", 53)
cpu_load : ("01/01/2014 11:20:30", 74.5)
```

The following is an example of how the eventized table is populated:

```
("user_log", "01/01/2014 12:15:00",
    "01/01/2014 12:15:30", 15213,
    "01/01/2014 12:15:00", "01/01/2014 12:15:30",
    NULL, NULL, NULL, NULL, NULL),
("query_log", "01/01/2014 10:10:00", NULL, 79004525,
    NULL, NULL, "select * from T;",
    "01/01/2014 10:10:00", 53, NULL, NULL),
("cpu_load", "01/01/2014 11:20:30", NULL, NULL, NULL,
    NULL, NULL, NULL, NULL, "01/01/2014 11:20:30",
    74.5)
```

Note that the eventized table retains the timestamp values according to their original location in the schema, but also copies one or more (in this case, up to two) timestamps into special "time" columns to eventize the rows. In this way, different rows of the input may include mutually exclusive timestamp columns that are preserved while still creating a single reference "time" column.

The eventization of a set of input tables at the source input can exist as a physical table (the table is materialized) or as a logical one. For a logical table, the eventization process can create a stream of rows that belong to the eventized table and this streamed input is directed to the ETL process. Eventization allows a relational source to be treated as an object source since each row in the eventized table is similar to an object in an object store that contains information about events that took place at a certain time.

Eventization can lead to increased usability, especially in cases where the user wants to query the data on the destination point to extract information across different events. For example, querying the relational source to find information about rows with a certain timestamp value (or range of values) may be a more complex and time-consuming query than querying an eventized table.

Data Collectors

Collectors are software components that can be used to extract individual records from one or more of the data sources described above. While processing received files in a standard format (JSON, BSON, etc., which may or may not be compressed) is described above, other mechanisms can be used to monitor data sources for new data, and extract this data for sending to the ingestion process.

Filesystem Monitoring

If data is provided in one or more directories in a file system, then the collector process can periodically monitor the filesystem for changes. The filesystem may be either a traditional local filesystem (e.g., ext4) or a distributed store with a filesystem-like interface (e.g., HDFS, Amazon S3). Depending on the precise interface of the filesystem, the collector can detect new files by periodically scanning the filesystem and comparing with a list of existing files, or using a notification mechanism built into the interface (e.g., S3 bucket logging).

Periodic Snapshots

If the source data is stored in an existing data store other than a filesystem, such as a relational database (e.g., MySQL, PostgreSQL, Oracle, etc.) or a NoSQL store (e.g., MongoDB, CouchDB, etc.), then the collector can make use of built-in snapshot mechanisms. Most data stores support a mechanism to export data to a filesystem or another process. For example, PostgreSQL supports a SQL COPY command, and an external utility named pg_dump is available. With this mechanism, a dump of the source data can be performed periodically to ingest new records. The snapshot can be initiated by the collector via remote procedure call or by a user. When complete snapshots are taken, an individual record may appear across multiple snapshots. Such duplicate records may be identified, and ignored, such as by using a source specific primary key or, if complete records are guaranteed to be distinct, using a hash function on the entire record for comparison purposes.

Replication Log

Many data stores that support replication maintain a log of operations that is used to ensure that replicas stay in sync. If this log can be accessed externally, then the collector may use the log directly to find new data. For example, MongoDB exposes an oplog (operations log), which can be queried using the standard MongoDB API and contains an entry for every insert, update, and delete operation in the database. By reading this log, the monitoring process can identify new records that need to be ingested.

Extracting Data

Once new source data has been detected, there are several ways to send that data to the ingest process. If the data is already in a file, then the ingest process can simply open the file and read the data directly. If the file is located across a network, it may be opened remotely across the network if using a network filesystem like HDFS (Hadoop Distributed File System).

If the data is not already in a filesystem (e.g., it came from a replication log), the collector can create one or more intermediate files containing the new records. These files may be stored in a traditional filesystem or a distributed store such as HDFS or Amazon S3. Once the files are created, they can be loaded as described above.

It is also possible for the collector to send data to the ingestion process directly using an IPC (inter-process communication) or RPC (remote procedure call) mechanism. This lets the ingestion process start processing new data without waiting for it to be written to a file, and avoids maintaining a separate copy of the data. In situations where it is desirable to have a backup of the data (e.g., when the source can only be accessed once), the data can be sent directly to the ingest process and asynchronously written to a backup file. This backup can be used for recovery in the case of an error during the ingest process.

Statistics

Because the schema inference step requires processing all of the source data, statistics can be computed during this process without additional passes over the data. Statistics may provide a number of benefits, including enhancing ETL fidelity.

Statistics on Schema Attributes

The first class of statistics can be computed from individual attributes from the cumulative schema in the source data. First, the frequency with which each attribute and type appears in the data can be tracked. This may be useful for a number of reasons. For example, as described above, the heuristic for map adornment is based on the frequency at which an attribute appears relative to the frequency of the object containing it.

Frequencies can also be used for making decisions based on type and in resolving type conflicts. Type information can be used to optimize physical storage decisions. For example, numeric types can be tracked and used to distinguish between 32-bit and 64-bit integral and floating-point types. Each of these types may require different amounts of storage space, so determining which type is applicable allows for allocating the minimum necessary space.

Type polymorphism occurs when the same attribute appears multiple times in the source data with different types. The schema inference mechanism and index store described above fully support type polymorphism, but in some cases, polymorphism of a certain field may be undesirable. For instance, if a single attribute appears as an integer in 99.9% of the records and a string in the other 0.1%, then the string-typed records may be spurious. For example, the string-typed records may indicate an error in data entry or validation or a corruption in the source data. These outlier records can be brought to the attention of the user and/or may be automatically recast based on a heuristic. For example, if less than 1% of records are of a divergent type, those records can be recast to the dominant type and a log entry can be created for the ETL process noting this event and optionally depicting the source data that was recast.

Consider the following example JSON records:

```
{"id": 12345678, "location": "Saratoga, CA", "tags":
        ["urgent", "direct"]}
{"id": "12345678", "location": "San Francisco, CA",
        "source": "iPhone"}
```

The cumulative schema inferred from these records may be:

```
{
    "id" : "string",
    "id" : "number",
    "location" : "string",
    "source" : "string",
    "tags" : ["string"]
}
```

The cumulative schema may be wrapped in a JSON schema that associates each attribute and type of the cumulative schema with a count. For example:

```
{
    "type": "object",
    "count" : 2,
    "properties" : {
        "id" : {
            "type" : [
                {"type": "string", "count": 1},
                {"type": "int32", "count": 1},
            ]
        },
```

```
"location" : {
    "type": "string",
    "count": 2
},
"source" : {
    "type": "string"
    "count": 1
},
"tags" : {
    "type": "array"
    "count": 1
    "items" : {
        "type": "string",
        "count": 2
    }
}
}
```

Note that since id appears once as a string and once as a 32-bit integer, each type is listed with a count of one, while the root object has a count of two. Furthermore, the tags array appears only once, so it has a count of one, but it contains two string items, so the items field has a count of two. The frequency of each attribute of a record can be computed during the typing process, and counts from multiple attributes can simply be added. Because addition is associative and commutative, this process can be done in parallel. Counts can be maintained independently on separate streams of data and then merged to compute global statistics.

Other statistics could be associated with each attribute in the same way, as long as they can be computed in a commutative and associative way. For example, statistics such as the average length of string attributes, or how frequently a string value appears to represent another type (such as a date) can be tracked. For the average, a sum and a count are separately maintained, and a division is performed once all the data is aggregated (because the division is not associative or commutative).

Statistics on Values

In addition to collecting statistics about the schema of the source data—for example the frequency with which each key appears—statistics can be compiled about the values associated with a specific attribute. These statistics can be used for a variety of applications, including query optimization, data discovery, and anomaly detection. The statistics of interest depend on the type of the attribute. For numerical attributes, these metrics may include basic statistical measures such as the minimum and maximum values, as well as the average and standard deviation of the distribution. To allow parallelism, statistics may be chosen such that they can be collected using commutative and associative operations.

More sophisticated statistics can be maintained on scalar values as desired, including a histogram of the distribution. In scenarios where some amount of error is acceptable, approximation algorithms can be used that are cheaper to compute. For example the HyperLogLog algorithm can be used to compute the approximate cardinality (number of distinct values) of a column, and the Q-Digest algorithm can be used to compute approximate quantiles. Statistics on values can be computed in the same way as statistics on properties. During type inference each value is analyzed in order to determine its type, and statistics can be compiled at the same time. Local statistics can be maintained in memory and then merged with global statistics and stored with the schema in the metadata store. Statistics that maintain a considerable amount of state may optionally be stored in a different store, such as the index store or a dedicated statistics store, in order to improve access performance.

Statistics on Entire Records

Some statistics are based on multiple attributes rather than single attributes or values. One common example is identifying which columns occur together frequently. For example, a source based on log data may combine records of different types in the same stream. The following JSON records are one example:

```
{"user": "mashah", "err_num": 4,
  "err_msg": "Connection error."}
{"user": "lstavrachi", "session_time": 23,
  "OS": "Mac OS X"}
{"user": "mashah", "session_time": 17,
  "OS": "Windows 7"}
{"operation": "update", "duration": 10,
  "frequency": 3600}
```

The first record represents a user error, the next two represent user sessions, and the fourth represents a system operation. While determining a cumulative schema from these records and converting the cumulative schema to a relational schema will combine these records into the same relational table, the records can be logically separated as they describe divergent events.

One way to analyze distinctions between groups of records is to store an adjacency matrix, where each entry represents a pair of columns and contains the number of times the two columns appear in the same record. The adjacency matrix may be an upper or lower triangular matrix since the order of the columns may be irrelevant. In the example above, the entry for the user row, session_time column (equivalently, user column, session_time row) would contain a 2, since those attributes both appear in two records, while the entry for user row and operation column would contain a 0 because those attributes do not co-occur in the data set.

The adjacency matrix may be stored in a variety of formats, such as an adjacency list, and can be updated when a parsed record is in memory. Multiple matrices can be merged by summing corresponding entries, so they can be computed in parallel. The matrix grows as square of the number of columns, though if it is sparse it can be stored in a compressed format using considerably less space. As with other statistics, the matrix can be stored in the metadata store or the index store.

Once the adjacency matrix is computed, it can be used to identify related columns in several ways. The matrix corresponds to a weighted graph, in which nodes are attributes and an edge appears with weight i if the columns corresponding to its endpoints appear together i times. A clique in this graph represents a set of columns in which every column appears with every other column. The example above includes the following cliques:

```
("user", "err_num", "err_msg")
("user", "session_time", "OS")
("operation", "duration", "frequency")
```

These, helpfully, correspond to the three separate event types and can be presented to the user or used for automatic data transformations. These cliques can be computed using standard graph algorithms, and the algorithms can be configured to require each edge in a clique to have at least a minimum weight.

To capture a broader view of related columns, all connected components in the graph described above can be grouped. In other words, any two attributes between which there is a path can be combined into a single grouping. The example above would produce the two groupings:

---
("user", "err_num", "err_msg", "session_time", "OS")
("operation", "duration", "frequency")
---

Note that err_num and os appear in the same connected component but not the same clique, because both error and session records have a user field. This looser notion of related columns may be useful to coarsely separate large sets of unrelated data.

The adjacency matrix described above is based only on the schema of each record, but it may be desirable to correlate certain values with the presence or absence of columns. One situation where unrelated records have distinct schemas is when, for example, each record includes an explicit attribute (such as event_id) identifying the type of the record. In the example above, user errors might have an event_id of 1, user sessions an event_id of 2, and system operations an event_id of 3. If the significance of the event_id can be determined (or indicated by the user), then event_id can be used to segregate attributes by event type. In this case, a separate cumulative schema can be maintained for each event_id value by merging the schemas of all records with that event_id value. The process of splitting a data source by event_id is termed "shredding," and is discussed further below.

Asynchronous Statistics Using the Index Store

While the above statistics can generally be computed in parallel, some statistics are difficult to compute without all of the data in once place (e.g., median and mode). These statistics may be computed after the data has been loaded using the query functionality of the index store. Because this may require scanning a large volume of data, it may be performed asynchronously and during times when the index store is otherwise idle.

Error Statistics

Another class of statistics that may be valuable to record is error statistics. There are a number of different types of errors that may be encountered with the data itself or operation of the system during ingestion. For example, these may include errors decompressing input data, errors with the format of an input file, parsing errors with a specific record, errors with string encoding (e.g. UTF-8), errors trying to open locked files, and errors accessing source data over the network. Information about these statistics can be maintained in the metadata store and sent to users and/or administrators as needed.

Intermediate Storage in the Index Store

Ingested data can be stored in a collection of indices that facilitate storage and querying, which may include the BigIndex (BI), ArrayIndex (AI), and RowIndex (RI) described above. The index store can be queried directly by users, but it can also be used as an intermediate store during the process of loading another system. This section describes the use of the index store as an intermediate store for the ETL process.

Bulk Export

When using the index store as an intermediate storage area for ETL, efficient export of bulk data from the index store is a concern. For example, when using hard disk drives (especially, magnetic drives), it is more efficient to read large chunks of data sequentially to avoid seek latency and thereby achieve maximum bandwidth.

For a sequentially accessed medium, like a hard disk drive, a given fraction of peak performance (f) may be determined. Given a disk's seek latency (L) and sustained sequential bandwidth (B), the number of bytes that must be read per seek (N) to achieve the desired fraction of peak performance can be calculated as follows:

$$N=(f/(1-f))*L*B$$

For example, consider a disk with a sustained 100 MB/s bandwidth and an average per-seek latency of 10 ms. To achieve 90% of peak performance (f=0.9):

$$N=(0.9/(1-0.9))*10 \text{ ms/seek}*100 \text{ MB/s}$$

N=9 MB/seek

Therefore, the goal to achieve the specified fractional performance is to read data in sequential bursts of at least 9 MB. When the target of the data is a disk-based system, the same formula applies based on write performance of the target.

Conceptually, exporting data from the index store can be performed by row or by column. The choice of mode depends on the capabilities of the destination datastore. When exporting columns, large sorted ranges of data from the BI, AI, or MI (each of these may be sorted by column first, then by tuple ID) may be exported. Once the requested tuples are sorted, for each column at least 9 MB of tuples should be read. To improve efficiency, all tuples from one column may be read and written to the output before moving to the next column.

When exporting rows, there are at least two options. If the RI is available, the requested data can be sorted in the RI by tuple ID, and then read in sorted order. Since the RI is also stored in sorted order, this will access the disk sequentially. The rows then need to be properly formatted for the output system.

When the RI is not used for export, rows may be constructed from, for example, the BI, AI, and MI. For efficiency, a large chunk of data is read from each column of the BI, AI, and MI at a time. To generate output rows, data will be read from each of the output columns for a given row before any of the rows can be generated.

With enough RAM, N megabyte chunks of each column can be read into RAM, and then the rows can be output. If the columns are compressed, the column may be kept compressed to the extent possible in order to conserve memory. In addition, as data is written out, memory may be deallocated in real-time. An N megabyte chunk of one column will likely not have the same number of tuples as an N megabyte chunk of another column (especially when using compression). Therefore, the chunks for each column may need to be fetched independently, as the tuples of one column will be exhausted before the tuples of another column. To minimize disk wait time, prefetching can be employed, although prefetching and partial decompression may both increase the memory requirements of conversion.

Example pseudocode for bulk exporting rows from the BI, AI, and MI:

```
create a cache for each column,
    this cache caches data for a tid with a
    replacement policy geared towards streaming
    and implements prefetching.
for tid in output_tuple_ids:
    start building new tuple
    for each column of this tuple:
        lookup tid in cache
        if tid present
            evict tid to optimize for streaming
            check for free space in this cache,
                if ample free space,
                prefetch the next block
        if tid not present,
            fetch the block of data containing the tid
            from the AI,
        if necessary,
            decompress chunk containing datum
            add datum to tuple
    add tuple to output buffer
    if output buffer is full,
        send output to destination
```

If the system has limited RAM, then the conversion can be done in multiple passes, where each pass reads as many column chunks as possible and generates partial row output chunks that are stored on disk. The partial row output chunks can then be treated like columns and the process can be repeated until full rows are output.

Figure 15:
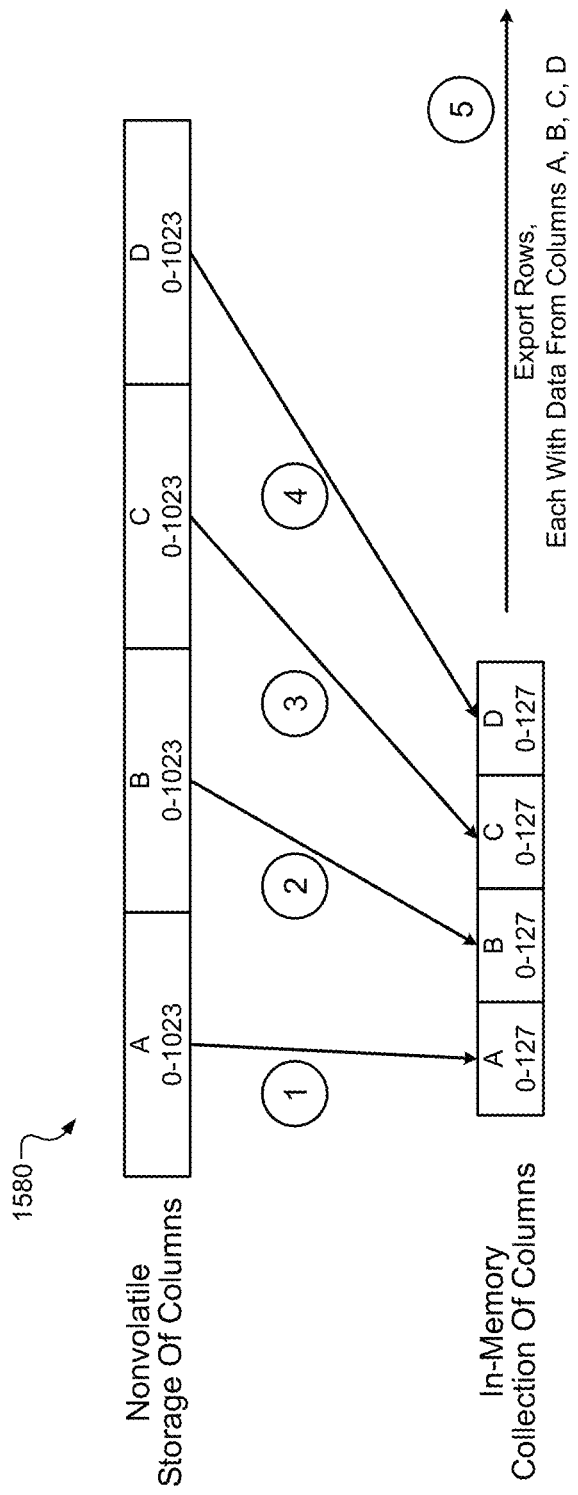
FIG. 15 is a graphical illustration of bulk row export from a column-oriented repository.

For example, see FIG. 15, where an example arrangement of nonvolatile storage 1580 (such as on a hard disk drive) of an index including columns A, B, C, and D is shown. In order to export, a row, data from each of columns A, B, C, and D is required. Instead of reading a single column value from each column in the nonvolatile storage 1580, which may impose significant penalties from seek and access times, chunks of each column can be read into memory. In this simplified illustration, there are 1024 entries in each of the columns in the nonvolatile storage 1580. There is room in memory 1584 (which may be volatile dynamic random access memory) for 512 entries, so 128 entries of each of columns A, B, C, and D are read in turn from the nonvolatile storage 1580 into the memory 1584.

Once each of the four reads are completed, 128 rows can be exported, each including an entry from each of the four columns A, B, C, and D. In various implementations, the size of the entries in each of the columns may be different. Therefore, the storage space in the memory 1584 may be divided up unequally between the columns, with columns storing larger entries receiving more space. This allows for approximately the same number of entries of each column to be stored. Alternatively, the memory 1584 may allocate storage equally between the columns, resulting in the columns storing larger entries having fewer entries stored at a time in the memory 1584. As rows are being exported, new data from these columns will therefore need to be loaded into the memory 1584 earlier than columns whose entries are smaller.

Index Store Management

The index store may be configured to support various management functions such as: snapshotting, recovery, resizing, and migration. These features can be implemented by proper orchestration of index-store writes and leveraging underlying system technologies such as the Linux logical volume manager (LVM).

Snapshotting the index store can be used for backup, to clone an index store, or to aid in recovery. Snapshotting can be achieved by beginning to buffer writes, flushing the index store to disk, using the underlying snapshotting facility in the filesystem or volume manager, and then applying the writes. Additionally, for a system based on an architecture such as LevelDB, instead of buffering writes the system could compact the data, mark the lower levels as part of a snapshot, prevent further compaction of those lower levels, copy the files that comprise the lower levels, and then re-enable compaction.

Recovery is accomplished by restoring the backup data according to the underlying system, starting an index storage service, and updating the metadata service to point to the restored data. The set of stored tuple IDs is recorded in the metadata service at the time that a snapshot is taken, and restored when the snapshot is restored. After restoring from a snapshot, missing data can be determined by comparing the set of all tuple IDs to the set of tuple IDs stored in the recovered index store.

Shrinking the index store may be accomplished by compacting all of the data in the store, reducing the filesystem size, then reducing the logical volume size. If there is enough free space to remove a disk (or virtual disk), the data on that disk can be migrated to other free space in the volume group, the disk can be removed from the volume group, and then removed from the system. Growing the index store may be performed by, if necessary, adding a disk or virtual disk. If a disk was added, the disk can be included in the volume group, increasing the logical volume size, and then the size of the filesystem can be increased. In some implementations of the index store, a filesystem may not be used, in which case the index store might implement a resize operation instead of relying on the filesystem. In some implementations, the index store might not use LVM and could manage disks directly itself.

In a cloud environment, or in the course of server maintenance, it may be desirable to migrate an index store from one machine to another. The simplest case is doing this offline. This could be done by blocking reads and writes, shutting down the index storage service, unmounting the filesystem, disabling the logical volume, moving the disk (or virtual disks) to the new machine, re-enabling the logical volume, mounting the filesystem, restarting the index storage service, and updating the metadata service so that it knows where a given index store lives.

To migrate an index store that is online, the system may buffer writes and perform reads from the old index store while a new index store is brought up. The data is then copied from the old index store to the new, and the new index store is marked as active. Reads are then directed to the new index store, and finally buffered writes are applied. To optimize this migration, the new index store could be restored from a snapshot. In such a scenario, writes are buffered, and a delta can be calculated between the present state of the index store and the snapshot. The delta can be applied to bring the snapshot in the new system up to date. The new index store is then marked active and the buffered writes are applied to the new index store. Multiple deltas can be calculated and applied before writes are buffered to minimize the buffering time.

Index Store Extensions

Lineage

When moving data from one datastore to another, it may be desirable to be able to trace the lineage of each datum as it moves through the system. As an example, consider a collection of files containing JSON records with each record separated by newlines. The data from those files may be loaded into the index store, and, from the index store, loaded into a data warehouse. To maintain the lineage of the records, each record can be tracked by, for example, recording the source filename and line number of each record. The lineage information can be stored in the index store as an extra column (or set of columns).

These extra column(s) may be also be loaded into the data warehouse. This would allow the end user to be able to find the original source of a record. The user might want to do this to try to understand if there is an error, or to find other data that may have been deleted or was chosen not to be loaded. The system can use that information to determine if there is any data missing. (e.g., sort by files and rows and find out if there are any files or rows missing). Similarly, and potentially having similar benefits, when data is loaded from the index store into the data warehouse, an extra column can be created to record the index store's tuple ID in the data warehouse. This may allow for the system to recover from certain errors, and allows for comparison of data between the index store and the warehouse.

Temporal/Bitemporal Support

Time is a fundamental variable in many systems. Some analysis is improved, or even made possible, by systems that comprehend the meaning of time fields. Databases that keep multiple versions of objects and use time to differentiate those versions are often referred to as temporal databases. There are multiple concepts of time as applied to objects. Two common notions of time are the transaction time (TT) and the valid time (VT). Transaction time is the time that a transaction was committed by the system. Valid time is a point in time or a time range over which a piece of data is valid. For example, a particular address that a person has lived at has associated with it a specific period of time (VT) that the person lived there. The time when the address is recorded in the system is the TT.

In many environments, being able to take a historical view of data is beneficial. One mechanism for querying historical data is to define a query AS OF a particular point in time. One might ask the system to answer a question based on all the information that was available on (AS OF) Jan. 31, 2014. These queries may review objects with a maximum TT less than or equal to the AS OF time.

In other environments, a user might like to know about how a fact about an object changed over time. There might be many versions of a person's home address recorded in a database, each with different valid times. A database user might like to perform a query of the person's address AS AT a specific time. This query may review objects whose VT encompasses the AS AT time.

Databases that primarily have support for only one concept of time (often transaction time) are considered monotemporal. A database that supports two concepts of time, such as both transaction time and valid time, is considered bitemporal. A bitemporal database supports a two-dimensional space of versions of an object, and supports narrowing down a version by asking queries both AS OF a particular TT and AS AT a particular VT.

Spatial index methods, such as R-Trees, kd-trees, and Z-ordering, can be used to build an index along multiple dimensions such that objects close to each other in an N-dimensional space are close to each other in the index.

To support temporality in the index store, another index can be created for the time dimension. This index could be a temporal time index (TTI) that maps transaction times to tuple ids. Another index could be a valid time index (VTI) that maps valid times to tuple ids. A bitemporal system may include a spatial index to map both valid time and temporal time in a bitemporal index (BTI) to tuple id.

Updates

The index store as described above can, in various implementations, efficiently process bulk inserts or bulk appends. This works well for querying and extraction on a system with hard disk drives. Efficiently handling updates and deletes (an update happens when an existing tuple is modified in some way) may require some modification to the index store. These updates may arrive as an ordered list of changes made by some sort of transactional store, such as MongoDB and its oplog.

One method of handling updates is to apply the updates to the in-place values of an object. Because single row updates may be expensive in the index store, those updates are buffered in a write-optimized store (e.g., a row store). See FIG. 14, where a write-optimized store 1552 is shown. Queries first look for values in the write-optimized store and then look into the index store. When enough data is present in the write-optimized store, the data can be organized into a package to perform bulk updates in the index store.

Another method for handling updates is to take the records/objects from the input and convert them into different versions of the records/objects based on some key and the transaction time recorded in the transaction register. The converted records/objects can then be appended to the index store as new records. If the destination store is temporal, then AS OF queries can be used to make queries in the past.

Data Transformations

When an intermediate store is present, transformations can be performed when exporting data from the intermediate store. This allows for different transformations for different destinations and may support creating a single well-defined representation of the source data before applying any transformations. When no intermediate store is used, transformations may be applied when converting each column to relations.

Type Transformations

One common transformation is to convert values from one type to another. For instance, since JSON does not define a date type, it is common to store dates as either strings (e.g., according to ISO 8601) or numeric values (e.g., in seconds since the UNIX epoch). If the destination supports a date type (which most relational database do), then we can add a casting directive to convert values to dates. Similar directives can be used to cast appropriate strings to numbers. These casting directives can either be manually specified using foreknowledge of the data or can be automatically inferred using statistics collected during schema inference.

Data Cleaning

A variety of other data cleaning operations can be performed during export. For example, if an attribute is known to be in a certain domain (e.g., strings representing state codes or numbers representing zip codes), then values can be omitted or converted to defaults.

Splitting and Joining Data

As described above, the system may split data from arrays and maps into separate tables, but in some cases users may want additional control over the relational schema. For instance, they may have multiple sources that they want to combine into the same destination, or vice versa. To combine tables, users may specify a join key and the join can be done in the index store before export.

To split data, a set of columns is identified for placement into a separate table. A globally unique record id can be used as the join key and the tables are exported separately. These columns can either be specified manually or using statistical methods, such as those described above, to identify related sets of attributes.

An operation called shredding partitions data into tables based on the value of a single attribute. This is particularly useful for event-like data sources where the value of a single attribute determines the type of the record. Statistics can be collected, specifying which columns are associated with each id, and a separate table can be exported for each record type.

Ingestion Targets

Data Warehouses

One possible output destination (or, target) for the ETL process is a data warehouse. A data warehouse may be loaded by creating a set of output files in a row format (for example, CSV) along with a corresponding series of ALTER TABLE/COLUMN commands to adapt the data warehouse according to changes in the dynamic schema.

Some data warehouses designed for analytics, including products from Vertica, Greenplum, Aster/Teradata, and Amazon Redshift, use column-oriented storage that stores different columns separately. In these systems, adding a new column does not require modifying existing data, and may be more efficient. Loading of files to such a data warehouse may be performed using commands supported by the data warehouse. Feeding a destination that can accept multiple parallel loads is described below.

Non-Relational Object Stores

A user may choose to load an object store instead of a relational store. One way of loading data into an object store is to serialize the objects using the cumulative JSON schema according to a desired output format.

Orchestration

Individual components of an ETL process can be scheduled and executed in a distributed computing environment—either in the cloud or inside a private data center. The scheduling may depend on the nature of the data source(s), destination(s), whether or not the index store is being used, and the degree of parallelism desired. The status of each stage of the pipeline may be stored in a metadata service to support recovery, statistics, and lineage.

An example ETL process may be segmented into the following components: detecting new data (D); extracting data from source (S); inferring schema of source (I); optionally loading index store (L); generating cumulative schema (G); generate alter table statements (A); optionally exporting data in intermediate format (E); and copying data to destination (C).

An example of the detection (D) process is described using the following pseudocode:

```
old_metadata = None
while True:
    metadata = source.get_metadata( )
    if old_metadata == metadata:
        # nothing new here
        sleep if necessary to prevent overwhelming source
        continue
    # find new stuff
    new_stuff = metadata - old_metadata
    # build chunks of appropriate size
    chunk = new Chunk( )
    for item in new_stuff:
        chunk.add_data(item)
        if chunk.big_enough( ):
            mds.record_chunk(chunk)
            chunk = new Chunk( )
```

An ingestion process using an index store may encompass extracting data (S), inferring schema (I), and loading the index store (L), together referred to as SIL. Pseudocode for an example SIL process is shown here, where the index store is referred to by "ISS":

```
while True:
    # Get any unprocessed chunk of source data
    chunk = mds.get_any_unprocessed_chunk( )
    # code below can be in an asynchronous task
    cumulative = new Schema( )
    for record in chunk.read( ):
        schema = get_schema(record)
        cumulative.update(schema)
        iss.write(record)
    iss.commit_chunk( )
    mds.save_chunk_schema(chunk, cumulative)
```

Pseudocode for an example generate schema process (G) is shown here:

```
parent = None
while True:
    # get a few committed chunks such that they form a
    # reasonable copy size
    chunks = mds.get_committed_chunks( )
    # generate a cumulative schema across loads
    cumulative = Schema( )
    for chunk in chunks:
        cumulative.update(mds.get_schema(chunk))
    parent = mds.store_new_cumulative(cumulative,
        chunks, parent)
```

Pseudocode for an example export process (E) from an index store is shown here:

```
while True:
    cumulative, chunks = mds.get_unexported_schema( )
    # code below can be in an asynchronous task
    # export the new chunks according to the
    # cumulative schema
    intermediate = new Intermediate( )
    for record in iss.get_chunks(chunks):
        export_data = prepare_output(record, cumulative)
        intermediate.append(export_data)
    mds.record_schema_export(cumulative, intermediate)
```

Pseudocode for an example process including alter table elements (A) and copy elements (C), cumulatively referred to as AC, is shown here:

```
while True:
    schema, output = mds.get_uncopied_output( )
    previous = mds.get_parent_schema(schema)
    # generate alter table statements
    if schema != previous:
        difference = schema - previous
        warehouse.alter_table(difference)
    warehouse.copy_from(output)
```

When an index store is not used, and data is streamed from the data source to the target, the overall process may be referred to as SIEGCA, which encompasses extracting data (S), inferring schema (I), exporting data (E), copying (C), and altering the tables of the target (A). Pseudocode for an example SIEGCA process is shown here:

```
cumulative = new Schema( )
intermediate = new Intermediate( )
while True:
    # Get any unprocessed chunk of source data
    chunk = mds.get_any_unprocessed_chunk( )
    # code below can be in an asynchronous task
    for record in chunk.read( ):
        schema = get_schema(record)
        if schema != cumulative:
            mds.record_schema_export(cumulative,
            intermediate)
                cumulative.update(schema)
                intermediate = new Intermediate( )
        intermediate.append(record)
        iss.write(record)
    mds.save_chunk_schema(chunk, cumulative)
```

Figure 16A:
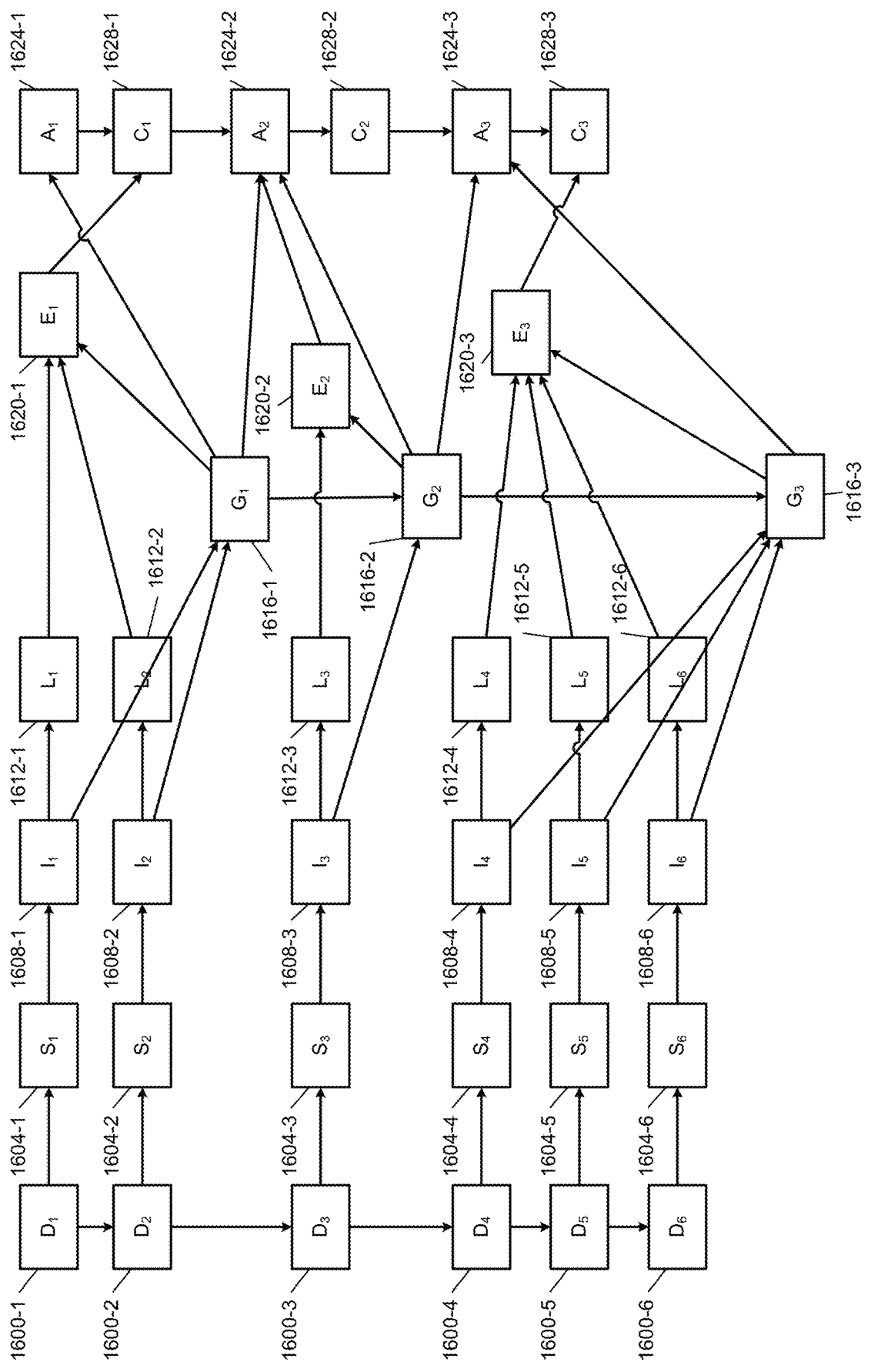
FIGS. 16A-16B are dependency diagrams for parallelizing components of extract, transform, load processes according to the principles of the present disclosure.
Figure 16B:
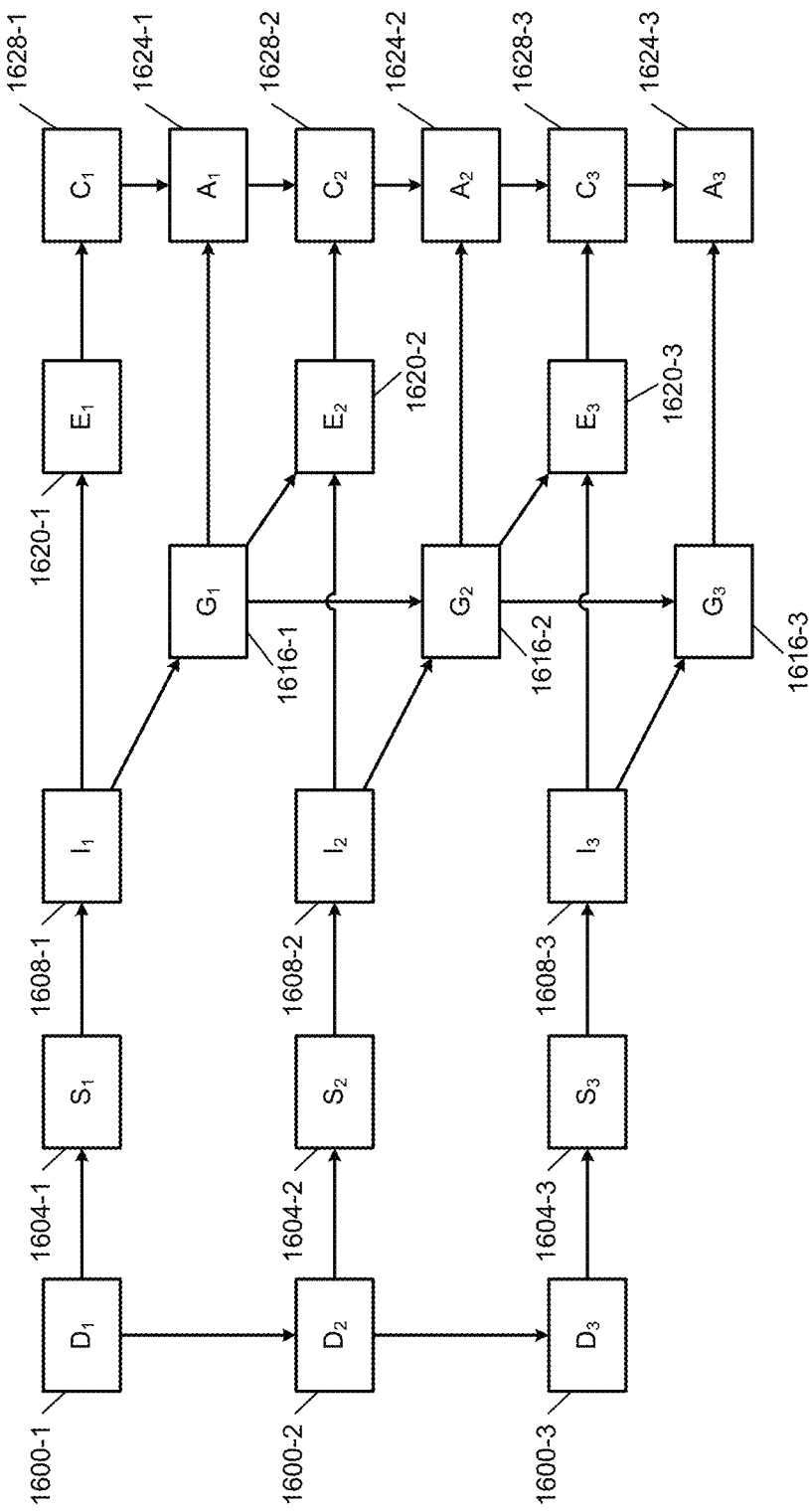

In FIGS. 16A-16B, dependency diagrams are shown for parallelizing components of ETL processes according to the principles of the present disclosure. FIG. 16A depicts the use of an intermediate index store. A detection process (D) is shown broken into 6 sub-processes 1600-1 . . . 1600-6. Dependencies are shown with arrows, where $D_2$ 1600-2 depends on $D_1$ 1600-1, etc. In other words, $D_2$ cannot complete before $D_1$ has completed. When the dependency is strict, as will be described here for ease of illustration, $D_2$ cannot even begin until $D_1$ has completed. This may be the case because $D_2$ does not know where to start detecting new data until $D_1$ has finished, leaving $D_2$ with a starting point. For example only, the detection sub-process $D_1$ may be configured to acquire the first 10,000 new objects. Sub-process $D_2$ picks up where sub-process $D_1$ left off, and identifies the next 10,000 new objects.

The dependencies shown in FIGS. 16A-16B may be broken in certain circumstances. For example, if $D_1$ and $D_2$ are looking at separate data sources, or at distinct portions of a data source, $D_2$ may begin without waiting for $D_1$ to complete.

An extraction process (S) includes sub-processes 1604-1 . . . 1604-6. Each extraction sub-process 1604 depends on the respective detection step 1600. This dependency results from the fact that the files/objects/records to be extracted from the source are identified during the detecting sub-process.

Each inference sub-process (I), shown at 1608-1 . . . 1608-6, depends on the respective extraction sub-process (S), as the schema inference is performed on the records extracted in S. For each record that is inferred (I), that record is loaded (L) into intermediate storage, so each of the loading sub-processes 1612-1 . . . 1612-6 depends from the respective inference sub-process.

The generate schema sub-process (G), shown at 1616-1 . . . 1616-3 takes a previous schema and adds new inferred schemas from one or more I sub-processes to generate a new cumulative schema. A heuristic may be used to determine how many inference sub-processes are fed into a single generate schema sub-process. As seen in FIG. 16A, the number may be variable.

Extract sub-processes 1620-1 . . . 1620-3 receive a generated schema from a respective generate sub-process and extracts data from the loading sub-processes corresponding to the generate sub-process. The extract sub-processes 1620 may build a set of intermediate files for loading into a target, such as a data warehouse. Each sub-process, including the extract sub-process, may be optimized to take advantage of internal parallelization.

Based on the generate sub-processes, alter table sub-processes 1624-1 . . . 1624-3 generate commands for the target to accommodate any new objects in the schema determined by the schema sub-processes 1616. For example, $A_2$ determines whether any additional objects have been added by $G_2$ to the cumulative schema compared to what was already present after $G_1$. The commands for the target may take the form of Data Definition Language (DDL) statements. Although labeled as alter table sub-processes, the actual language or statements may not use the specific statement "alter table." Once the cumulative schema has been reflected to the target by the alter table sub-processes 1624, data is copied into the target in copy sub-processes 1628-1 . . . 1628-3.

In FIG. 16B, a streaming approach is shown where there is no intermediate store, such as a column or index store. Instead, the data is ingested directly into the target, and the 1612 loading sub-processes are omitted. As a result, the extract sub-processes 1620 depend directly on the schema inference sub-processes 1608. Note also that in this implementation, the alter table sub-processes 1624 depend on the copy sub-processes 1628, which is opposite to the dependencies of FIG. 16A.

Scheduling Jobs Elastically

When using the index store, the ingestion tasks (SIL) and the exporting task (E) may be compute-intensive. The tasks can be parallelized internally. Additionally, provided that their dependencies are met, they can also be issued asynchronously via a job scheduling system (e.g., PBS, LSF, YARN, MESOS, etc.). Many of these job scheduling systems can also encode the dependencies between the steps as well. By knowing the dependence graph (such as is shown in FIG. 16A), a scheduling module can issue old jobs in the graph to ensure that all nodes are busy, but at the same time, that there are not too many outstanding jobs.

Error Recovery

For error recovery purposes, some or all sub-processes record metadata about the state of the system and the mutation that sub-process intends to perform on the system. If a step fails, then recovery code can use this metadata to either finish the broken operation or back out the incomplete operation so it can be retried. For example, the load sub-process records the set of tuple IDs that it is loading. If the load sub-process fails, then a command may be issued to the index store instructing all records with tuple IDs matching the set to be purged. The load can then be retried.

Optimizing Export

Some relational stores have a mechanism for directly loading data without an intermediate file. Postgres, for example, supports the COPY FROM STDIN command, where the data can be directly fed to the database. The export process can use this interface to write data directly to the output system, thus merging the export (E) and copy (C) steps. Some systems, such as Amazon's Redshift have a mechanism for pulling the data via a remote procedure call directly from the warehouse to the index store. In this case, the user creates a manifest file and lists a set of secure shell (ssh) commands to issue to do the copy. Each ssh command specifies a host and a command to run on that host. By specifying a command to extract a set of tuple IDs from the index store, the destination database can pull the necessary records/objects out of the index store for export.

Monitoring

Resource Monitoring

A monitoring system tracks hardware and software resources used by the system, which may include compute and storage resources used by the collectors, the ingestion pipeline, the metadata store, the (optional) index store, and the data warehouse. The monitoring system tracks metrics including, but not limited to, CPU, memory, and disk utilization, as well as responsiveness to network requests.

If the service is deployed in the cloud (either public or private) or on another system with programmatically allocated resources, the monitoring system can be used to automatically scale-up or scale-down the system as necessary. For example, if the monitoring service detects that the index store is low on storage space (which may take the form of a virtualized hard disk using a service such as Amazon EBS), the monitoring service can trigger a request to automatically provision additional storage without intervention from the user. Similarly, if worker machines used by the ingest pipeline routinely have low CPU utilization, then the monitoring service can shut down the machine.

The resource monitoring functionality may rely on monitoring frameworks such as Nagios.

Ingest Monitoring

In addition to basic resource monitoring, additional monitoring can be performed specifically on the ingestion pipeline. Metadata about each stage of the ingestion process (schema inference, loading the index store, computing the schema, etc.) can be stored in a central metadata store during ingestion and can be used to interrogate metrics about the system. At the most basic level, this mechanism can be used to identify processes that have stopped or are functioning incorrectly.

The monitoring system can also track which stages automatically restart and how long each stage takes. This may help identify service problems. Further, historical data from the monitoring system may indicate anomalies in user data. For example, if the time it takes to load a fixed amount of source data changes dramatically, that data can be flagged for the user to study what characteristics of the data may have changed.

Query Monitoring

The monitoring system can monitor the runtime of queries made against the index store or data warehouse. By observing how the runtime of similar queries change, potential problems with the system as well as changes in the characteristics of the source data can be identified. This information can inform the use of indices in a data warehouse or query planning in the index store. For example, columns that are rarely queried may not need to have dedicated indices, while columns that are often sorted in a certain way upon querying may benefit from having a new index sorted according to the frequent query.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

The invention claimed is:

1. A system, comprising:
one or more computing devices comprising one or more hardware processors and a memory, the one or more computing devices configured to implement:
a schema inference module configured to:
infer a schema from one or more objects received from a data source, wherein each of the one or more objects includes data and metadata;
create a cumulative schema based on the inferred schema from the one or more objects, wherein the cumulative schema identifies different combinations of individual attributes and corresponding type of data that exist for the one or more objects received from the data source;
collect statistics on occurrences of the types of the data of the one or more objects received from the data source; and
modify the cumulative schema based on the statistics, wherein to modify the cumulative schema, the schema inference module is configured to incorporate into the cumulative schema a number of occurrences of the different combinations of individual attributes and corresponding type of data.

2. The system of claim 1, wherein the schema inference module is further configured to determine whether the types of the data are typed correctly based on the statistics.

3. The system of claim 1, wherein the one or more computing devices are further configured to implement:
an export module configured to output the data of the one or more objects to a data destination according to the cumulative schema.

4. The system of claim 3, wherein the export module is further configured to:
convert the cumulative schema to a relational schema; and
output the data of the one or more objects to the data destination according to the relational schema.

5. The system of claim 3, wherein the schema inference module is configured to infer the schema in a first pass through the one or more objects, and wherein the export module is configured to output the data of the one or more objects in a second pass through the one or more objects.

6. The system of claim 3, wherein the one or more computing devices are further configured to implement an index store, wherein the schema inference module is configured to store the data of the one or more objects to the index storage service, and wherein the export module is further configured to retrieve the data of the one or more objects from the index store prior to outputting the data to the data destination.

7. A method, comprising:
performing with one or more computing devices:
inferring a schema from one or more objects received from a data source, wherein each of the one or more objects includes data and metadata;
creating a cumulative schema based on the inferred schema from the one or more objects, wherein the cumulative schema identifies different combinations of individual attributes and corresponding type of data that exist for the one or more objects received from the data source;
collecting statistics on occurrences of types of the data of the one or more objects received from the data source; and
modifying the cumulative schema based on the statistics, wherein the modifying of the cumulative schema comprises incorporating into the cumulative schema a number of occurrences of the different combinations of individual attributes and corresponding type of data.

8. The method of claim 7, further comprising collecting additional statistics on the metadata of the one or more objects.

9. The method of claim 7, further comprising, in response to the statistics, recasting a type of the data of at least one object of the one or more objects.

10. The method of claim 7, further comprising collecting additional statistics on values of the data having a particular type.

11. The method of claim 10, wherein the additional statistics comprise a minimum value of the values, a maximum value of the values, an average of the values, a standard deviation of the values, or any combination thereof.

12. The method of claim 10, further comprising updating the cumulative schema based on the additional statistics.

13. The method of claim 12, wherein the cumulative schema comprises a metadata store, wherein the method further comprises storing the additional statistics to the metadata store.

14. The method of claim 7, wherein collecting the statistics occurs subsequent to receiving all of the one or more objects.

15. The method of claim 7, wherein collecting the statistics occurs in response to receiving each of the one or more objects.

16. A non-transitory computer-readable storage medium storing instructions that, when executed by one or more processors, cause the one or more processors to:
infer a schema from one or more objects received from a data source, wherein each of the one or more objects includes data and metadata;
create a cumulative schema based on the inferred schema from the one or more objects, wherein the cumulative schema identifies different combinations of individual attributes and corresponding type of data that exist for the one or more objects received from the data source;
collect statistics on occurrences of types of the data of the one or more objects received from the data source; and
modify the cumulative schema based on the statistics, wherein to modify the cumulative schema, the instructions further cause the one or more processors to incorporate into the cumulative schema a number of occurrences of the different combinations of individual attributes and corresponding type of data.

17. The non-transitory computer-readable storage medium of claim 16, wherein the instructions further cause the one or more processors to:
determine a casting directive configured to recast a particular object from a first type to a second type based on the statistics;
determine that the particular object is of the first type; and
recast the particular object to the second type based on the casting directive.

18. The non-transitory computer-readable storage medium of claim 16, wherein the instructions further cause the one or more processors to:
transform the one or more objects based on the cumulative schema; and
store the transformed one or more objects to an index store.

19. The non-transitory computer-readable storage medium of claim 16, wherein the instructions further cause the one or more processors to:
determine that an error has occurred with the one or more objects; and
collect statistics on the error.

20. The non-transitory computer-readable storage medium of claim 19, wherein the error comprises a decompression error, a formatting error, a parsing error, a string encoding error, a locked file error, a network access error, or any combination thereof.

* * * * *